(12) United States Patent
Hortig et al.

(10) Patent No.: US 8,713,899 B2
(45) Date of Patent: May 6, 2014

(54) GOODS-TO-PERSON PICKING STATION AND PICKING METHOD

(75) Inventors: Philipp J. Hortig, Rockford, MI (US); Matthew A. Steenwyk, Grandville, MI (US); Aaron J. Hayden, Alto, MI (US); Raffaele Destro, Brugherio (IT); Beat Losenegger, Muri (CH)

(73) Assignee: Dematic Corp., Grand Rapids, MI (US)

( * ) Notice: Subject to any disclaimer, the term of this patent is extended or adjusted under 35 U.S.C. 154(b) by 478 days.

(21) Appl. No.: 13/030,650

(22) Filed: Feb. 18, 2011

(65) Prior Publication Data

US 2011/0203231 A1 Aug. 25, 2011

Related U.S. Application Data

(60) Provisional application No. 61/306,124, filed on Feb. 19, 2010.

(51) Int. Cl.
*B65B 67/02* (2006.01)
*B65G 1/137* (2006.01)

(52) U.S. Cl.
CPC .............. *B65B 67/02* (2013.01); *B65G 1/1378* (2013.01)
USPC ................. 53/473; 53/251; 53/391; 198/346; 414/280

(58) Field of Classification Search
CPC .. B65G 47/967; B65G 47/962; B65G 1/1376; B65G 1/137; B65G 1/1378; B65B 67/02
USPC ................... 53/473, 235, 249–251, 390, 391; 186/55, 56; 198/345.1, 346, 346.3; 414/280
See application file for complete search history.

(56) References Cited

U.S. PATENT DOCUMENTS 1,558,014 A * 10/1925 Jaenicke ........................ 53/390
RE16,392 E * 7/1926 Wilhelm ........................ 53/390

(Continued)

FOREIGN PATENT DOCUMENTS

DE          3909139 A1     9/1990
DE   202004008679 U1    10/2004

(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US11/25407, mailed May 2, 2011, 13 pages.

(Continued)

*Primary Examiner* — Stephen F Gerrity
(74) *Attorney, Agent, or Firm* — Gardner, Linn, Burkhart & Flory, LLP

(57) ABSTRACT

A goods-to-person picking station and method of picking goods from a product container and placing the goods in at least one order container includes a product container-handling mechanism and at least one order container-handling mechanism juxtaposed with the product container-handling mechanism. The product container-handling mechanism supplies a product container to a pick area. The at least one order container-handling mechanism supplies at least one order container to the pick area. In this manner, an operator can pick goods from a product container at the pick area and place the goods selectively to the at least one order container at the pick area. The product container-handling mechanism includes a product container elevator assembly and a product container extractor assembly. The elevator assembly elevates a product container from the feed area to the pick area. The extractor assembly transfers a product container from the pick area. The elevator assembly and the extractor assembly may be operated from a common drive assembly.

35 Claims, 59 Drawing Sheets

(56) References Cited

U.S. PATENT DOCUMENTS

| | | | |
|---|---|---|---|
| 3,149,736 A | 9/1964 | Austin et al. | |
| 4,561,060 A | 12/1985 | Hemond | |
| 4,909,697 A | 3/1990 | Bernard, II et al. | |
| 4,987,992 A | 1/1991 | Pfleger | |
| 5,472,309 A * | 12/1995 | Bernard, II et al. | 414/807 |
| 5,601,395 A | 2/1997 | Lichti, Sr. et al. | |
| 5,672,039 A * | 9/1997 | Perry et al. | 414/280 |
| 6,134,862 A * | 10/2000 | Francois | 53/390 |
| 6,468,015 B1 * | 10/2002 | Konstant | 414/276 |
| 7,011,206 B2 | 3/2006 | Hornhofer | |
| 7,428,957 B2 | 9/2008 | Schaefer | |
| 7,809,467 B2 | 10/2010 | Schaefer | |
| 8,186,501 B2 | 5/2012 | Wolkerstorfer | |
| 8,327,609 B2 * | 12/2012 | Krizmanic et al. | 53/473 |
| 2004/0139692 A1 | 7/2004 | Jacobsen et al. | |
| 2004/0253082 A1* | 12/2004 | Mathys et al. | 414/280 |
| 2006/0182543 A1 | 8/2006 | Schaefer | |
| 2009/0129902 A1 | 5/2009 | Schafer | |
| 2009/0136328 A1 | 5/2009 | Schafer | |
| 2009/0139188 A1 | 6/2009 | Schafer | |
| 2010/0198391 A1 | 8/2010 | Schafer | |

FOREIGN PATENT DOCUMENTS

| | | | |
|---|---|---|---|
| DE | 102008012877 A1 | 9/2009 | |
| EP | 0406268 B1 | 9/1996 | |
| EP | 0849193 A1 | 6/1998 | |
| EP | 0860382 B1 | 4/2004 | |
| EP | 1443002 B1 | 8/2007 | |
| EP | 2050695 A1 | 4/2009 | |
| JP | 59149210 A | 8/1984 | |
| WO | WO 8300478 A1 * | 2/1983 | 198/346 |
| WO | 95/34491 A1 | 12/1995 | |
| WO | 2010090515 A1 | 8/2010 | |

OTHER PUBLICATIONS

International Preliminary Report on Patentability from corresponding Patent Cooperation Treaty Patent Application No. PCT/US2011/025407 mailed Feb. 18, 2011, 11 pages.

* cited by examiner

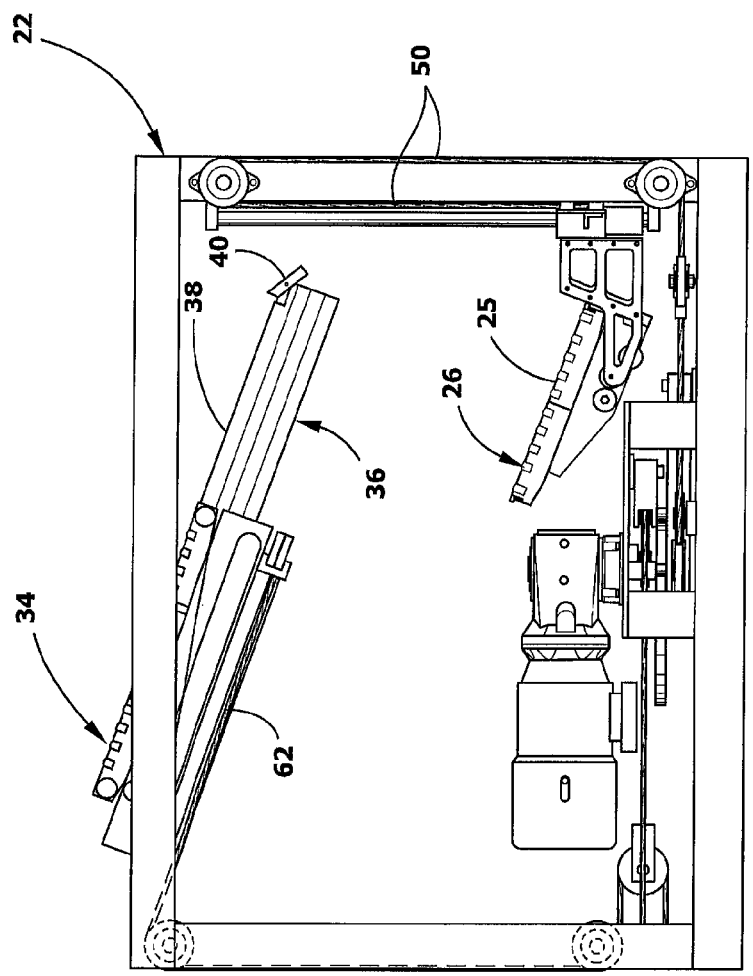

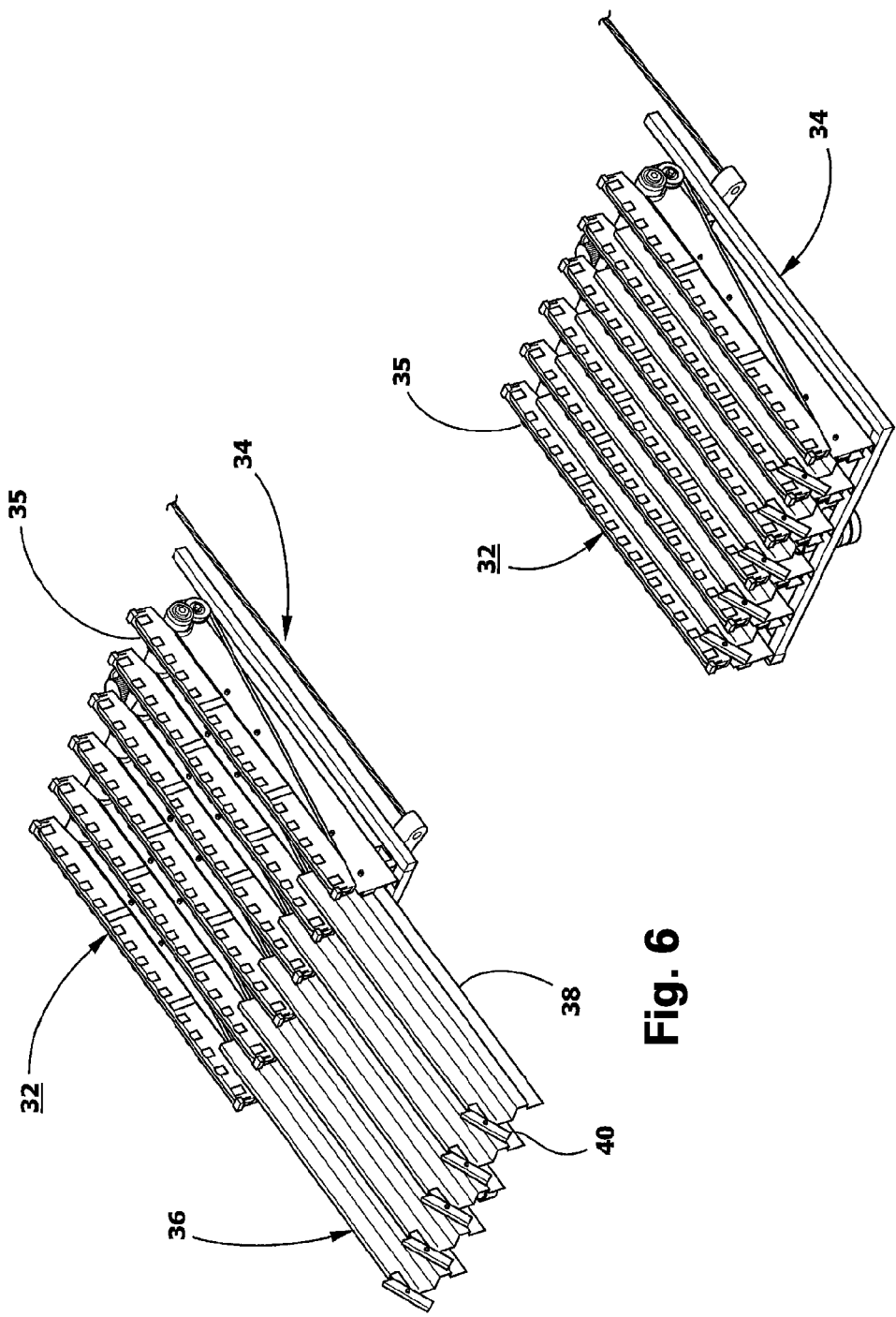

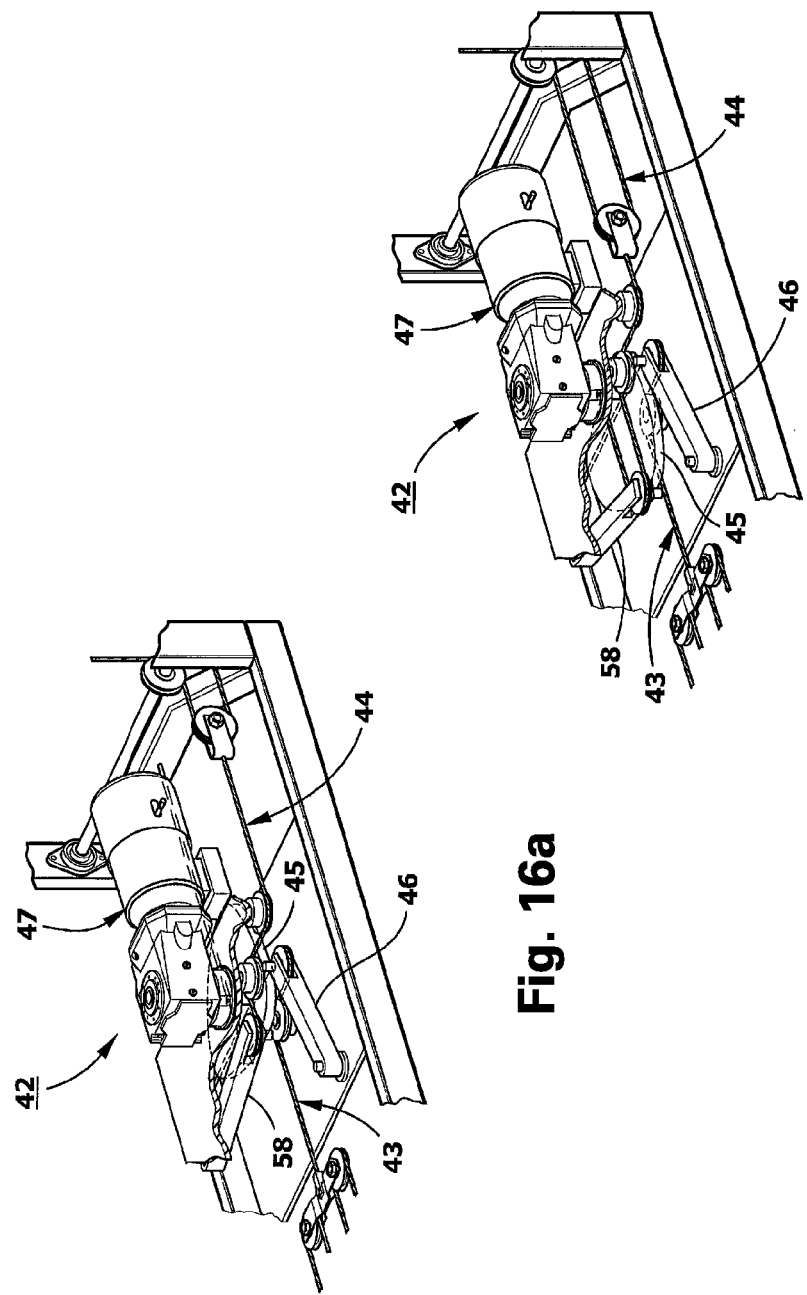

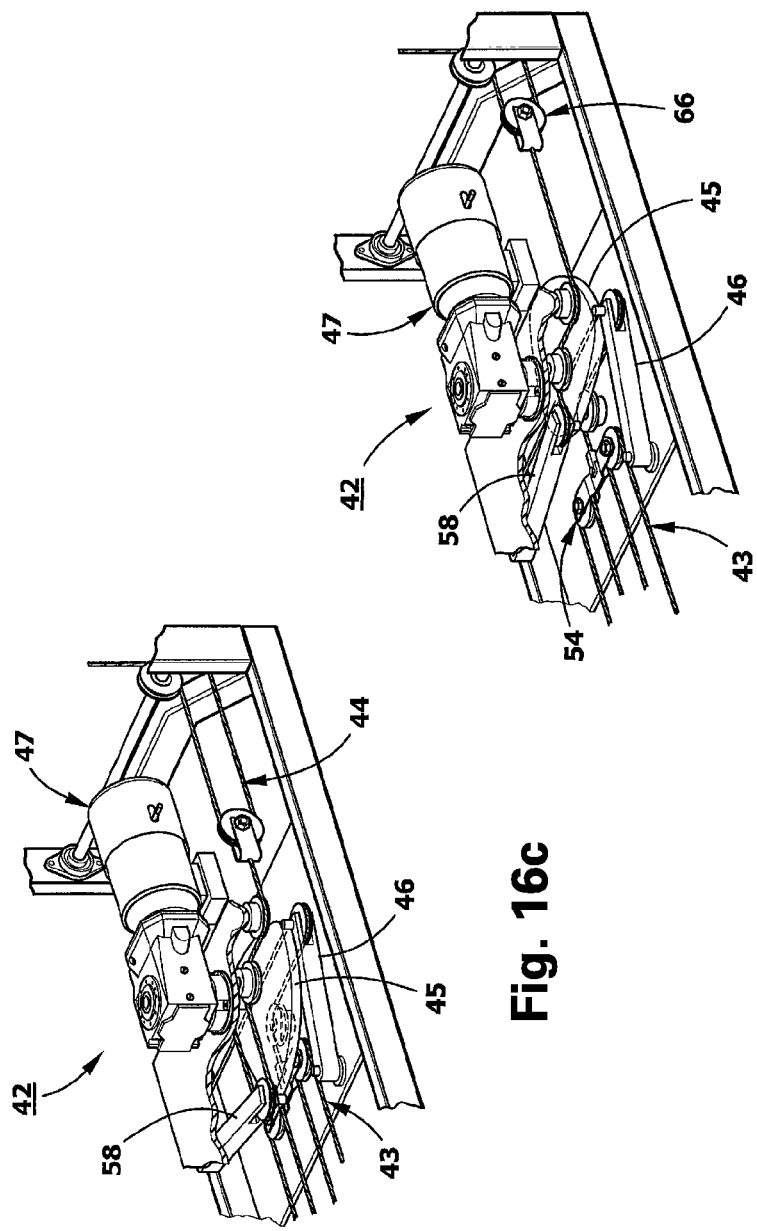

GOODS-TO-PERSON PICKING STATION AND PICKING METHOD

CROSS-REFERENCE TO RELATED APPLICATION

This application claims priority from U.S. provisional patent application Ser. No. 61/306,124, filed on Feb. 19, 2010, the disclosure of which is hereby incorporated herein by reference in its entirety.

BACKGROUND OF THE INVENTION

The present invention pertains to order fulfillment systems and methods and, in particular, to such systems and methods which supply both a product container and one or more order containers to an operator for the operator to transfer goods from the product container to the order container. Such systems and methods are referred to as goods-to-person picking systems and methods.

Goods-to-person picking systems and methods typically include one or more pick stations. While the picking is typically carried out by a human operator, the operator is guided in the picking. Such guidance may be by wireless headsets generating pick commands, known as pick-to-voice systems. Alternatively, the guidance may be by a display system which provides visual displays of how many articles from a donor container are to be transferred to the order container, as well as confirmation buttons, and the like, known as pick-to-light systems.

In addition to the pick station(s), the goods-to-person picking system may include a container storage system which stores and retrieves product containers, as well as full or partially complete order containers. Also systems are provided to remove empty donor containers and supply empty order containers. Transportation links, such as conveyors or automated guided vehicles, interconnect the storage system, the pick stations, shipping areas, and the like. While the container storage system may take various forms, an example of such a system is disclosed in commonly assigned U.S. Pat. Application Publication No. 2011/0008138 A1 entitled TRANSFERRING SHUTTLE FOR THREE DIMENSIONAL AUTOMATED WAREHOUSE and U.S. Pat. Application Publication No. 2011/0008137 A1 entitled AUTOMATED THREE DIMENSIONAL WAREHOUSE, the disclosures of which are hereby incorporated herein by reference in their entirety.

SUMMARY OF INVENTION

A goods-to-person picking station and method of picking goods from a product container and placing the goods in at least one order container, according to the various embodiments of the invention, are capable of increasing operator efficiency by minimizing downtime between completion of a step in the picking process and replacement of the containers from which product is picked or to which product is placed.

A goods-to-person picking station and method of picking goods from a product container and placing the goods in at least one order, according to an aspect of the invention, utilizes a product container-handling mechanism adapted to supply a product container to a pick area and at least one order container-handling mechanisms juxtaposed with the product container-handling mechanism. The order container-handling mechanism(s) is adapted to supply an order container to the pick area, whereby an operator can pick goods from a product container at the pick area and place the goods selectively to the order container(s) at the pick area. The product container-handling mechanism is in the form of a high-speed exchange having a product container elevator assembly and a product container extractor assembly. The elevator assembly has a lift mechanism that is adapted to elevate a product container from a feed area to the pick area. The extractor assembly is adapted to transfer a product container from the pick area. The extractor assembly includes a transfer mechanism and an extractor mechanism. The extractor mechanism is adapted to extracting a product container from the pick area to the transfer mechanism.

The order container-handling mechanism(s) may also include a high-speed exchange mechanism in the form of an order container elevator assembly and an order container extractor assembly. The order container elevator assembly has an order container lift mechanism that is adapted to elevate an order container from the feed area to the pick area. The order container extractor assembly is adapted to transfer an order container from the pick area and includes an order container transfer mechanism and an order container extractor mechanism. The order container extractor mechanism is adapted to extracting an order container from the pick area to the order container transfer mechanism.

A goods-to-person container-handling mechanism, according to an aspect of the invention, includes a container elevator assembly and a container extractor assembly. The elevator assembly is adapted to elevate a container from a feed area to a pick area. The extractor assembly is adapted to transfer a container from the pick area. The extractor assembly includes a transfer mechanism and an extractor mechanism with the extractor mechanism adapted to extract a container from the pick area to the transfer mechanism.

The extractor mechanism for any of the above may be made up of a plurality of arms that are selectively extendable to the pick area and retractable to the transfer mechanism. The lift mechanism may include another plurality of arms that are interleaved with the plurality of arms on the extractor mechanism when the lift mechanism and the extractor mechanism are at the pick area. The extractor mechanism may include a catch at an end of the arms on the extractor mechanism opposite the transfer mechanism, with the catch(s) providing unidirectional engagement with a product container at the pick area.

The transfer mechanism for any of the above may be adapted to transfer a product container to a takeaway line at a same general elevation as the pick area. The extractor mechanism may be adapted to approach a product container from below when approaching the pick area and to approach the transfer mechanism from above when moving toward the transfer mechanism. To accomplish this motion, the extractor mechanism may be guided by at least one track assembly that defines a first path when the extractor mechanism moves toward the pick area and a second path when the extractor mechanism moves toward the transfer mechanism.

The elevator assembly and extractor assembly for any of the above may be coordinated in a manner that the elevator mechanism supports a product container while the extractor mechanism is extending to the pick area and the extractor mechanism supports the product container while the elevator assembly retrieves another product container from the feed area. The elevator assembly and extractor assembly may be operated from a common drive assembly. The common drive assembly may include at least one cam, a motor rotating the cam(s) and a pair of cam followers coordinated in operation from the cam(s). One of said cam followers is adapted to operate the elevator assembly and the other of said cam followers is adapted to operate the extractor assembly. The at least one cam may be a pair of coupled cams with the elevator cam follower adapted to follow one of the cams and the extractor cam follower adapted to follow the other of the cams. Each of the cams may define a cam surface formed as a groove in a rotating disc.

An elevator linkage may be provided for any of the above between the elevator cam follower and the elevator assembly and adapted to transfer motion of the elevator cam follower to the elevator assembly. An extractor linkage may be provided between the extractor cam follower and the extractor assembly and adapted to transfer motion of the extractor cam follower to the extractor assembly. The elevator linkage may include an elevator segment gear moving in unison with the elevator cam follower and a circular gear engaging the elevator segment gear. The extractor linkage may include an extractor segment gear moving in unison with the extractor cam follower and another circular gear engaging the extractor segment gear. The elevator linkage and/or the extractor linkage may include a motion-multiplying mechanism. The motion-multiplying mechanism may be in the form of a speed increase gear set.

A goods-to-person picking system and method of picking goods from a product container and placing the goods in an order container, according to yet another aspect of the invention, includes a product container-handling line adapted to supply a product container to a product container-handling mechanism, wherein the product container-handling mechanism is adapted to supply a product container to a pick area and an order container-handling line is adapted to supply an order container to an order container-handling mechanism, wherein the order container-handling mechanism is adapted to supply an order container to the pick area. The order container supply system includes an order container sequencer that is adapted to arrange order containers in a particular sequence prior to supplying the order containers to the order container-handling mechanism.

The product container-handling mechanism may include a high-speed exchange in the form of a product container elevator assembly and a product container extractor assembly with the elevator assembly having a lift mechanism that is adapted to elevate a product container from a feed area to the pick area and the extractor assembly adapted to transfer a product container from the pick area. The extractor assembly includes a transfer mechanism and an extractor mechanism, with the extractor mechanism being adapted to extracting a product container from the pick area to the transfer mechanism.

The order container-handling mechanism may include an order container elevator assembly and an order container extractor assembly with the order container elevator assembly having an order container lift mechanism that is adapted to elevate an order container from the feed area to the pick area and the order container extractor assembly being adapted to transfer an order container from the pick area. The order container extractor assembly includes an order container transfer mechanism and an order container extractor mechanism, with the order container extractor mechanism is adapted to extracting an order container from the pick area to the order container transfer mechanism.

These and other objects, advantages and features of this invention will become apparent upon review of the following specification in conjunction with the drawings.

BRIEF DESCRIPTION OF THE DRAWINGS

FIG. 5 is a left side elevation of the container-handling mechanism in FIG. 2;

FIG. 6 is a perspective view of a container transfer mechanism in one state of operation;

FIG. 7 is the same view as FIG. 6 with the container transfer mechanism in another state of operation;

FIGS. 16a through 16d illustrate operation of the drive assembly in FIG. 14;

DESCRIPTION OF THE PREFERRED EMBODIMENT

Figure 1:
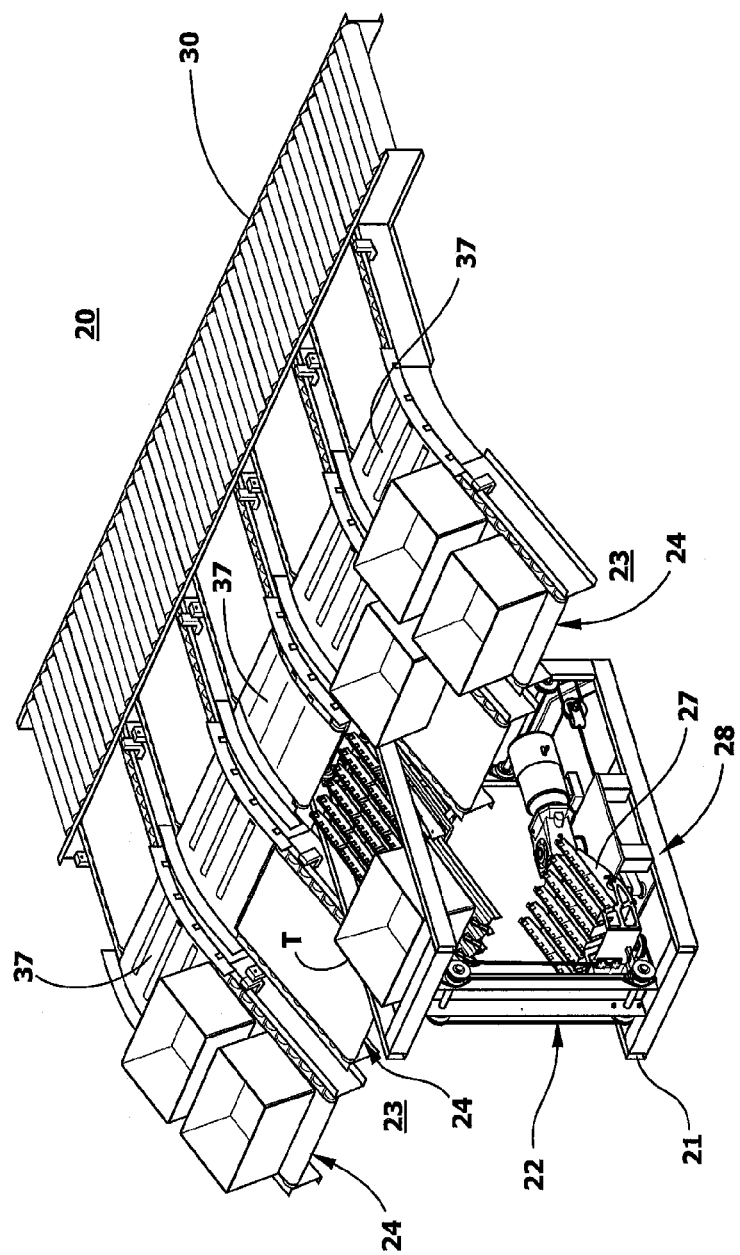
FIG. 1 is a perspective view taken from the front, top and right side thereof of a one-to-many goods-to-person picking station, according to an embodiment of the invention.
Figure 2:
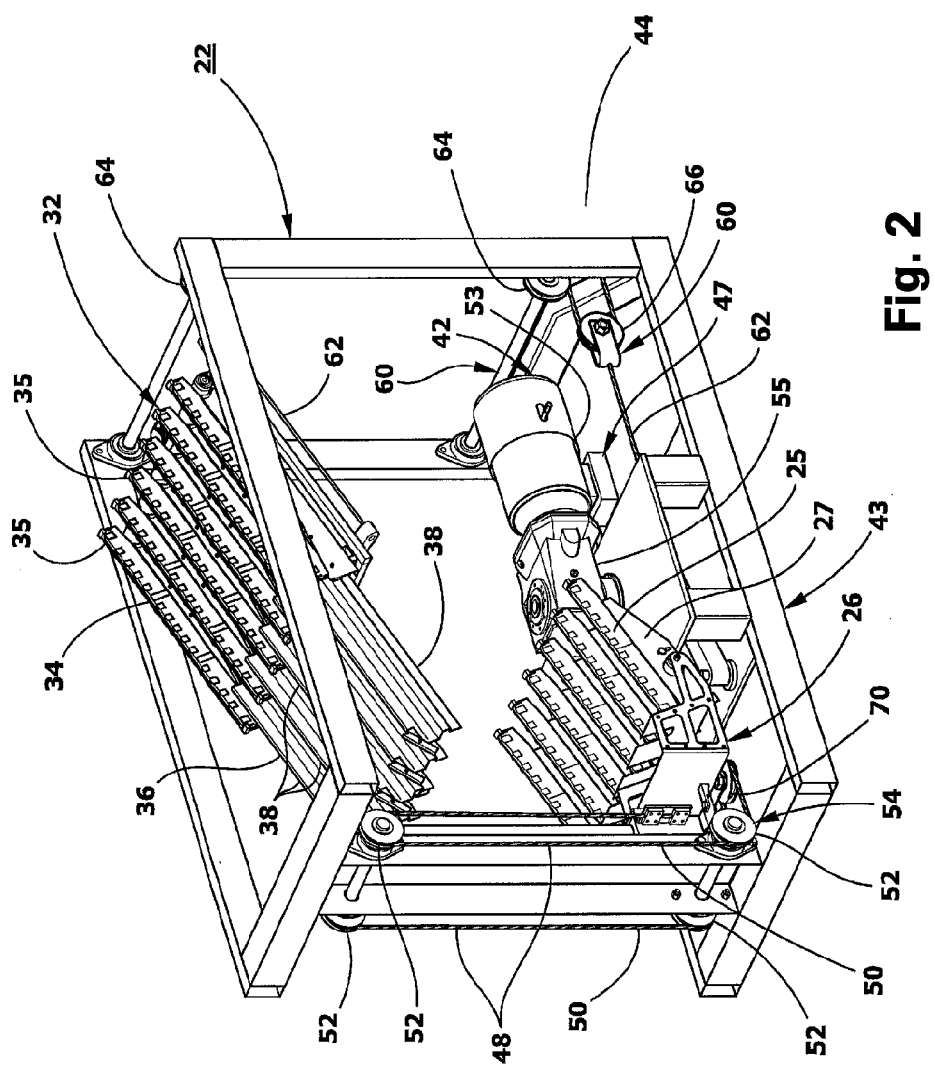
FIG. 2 is a perspective view of a container-handling mechanism or high-speed exchange.
Figure 3:
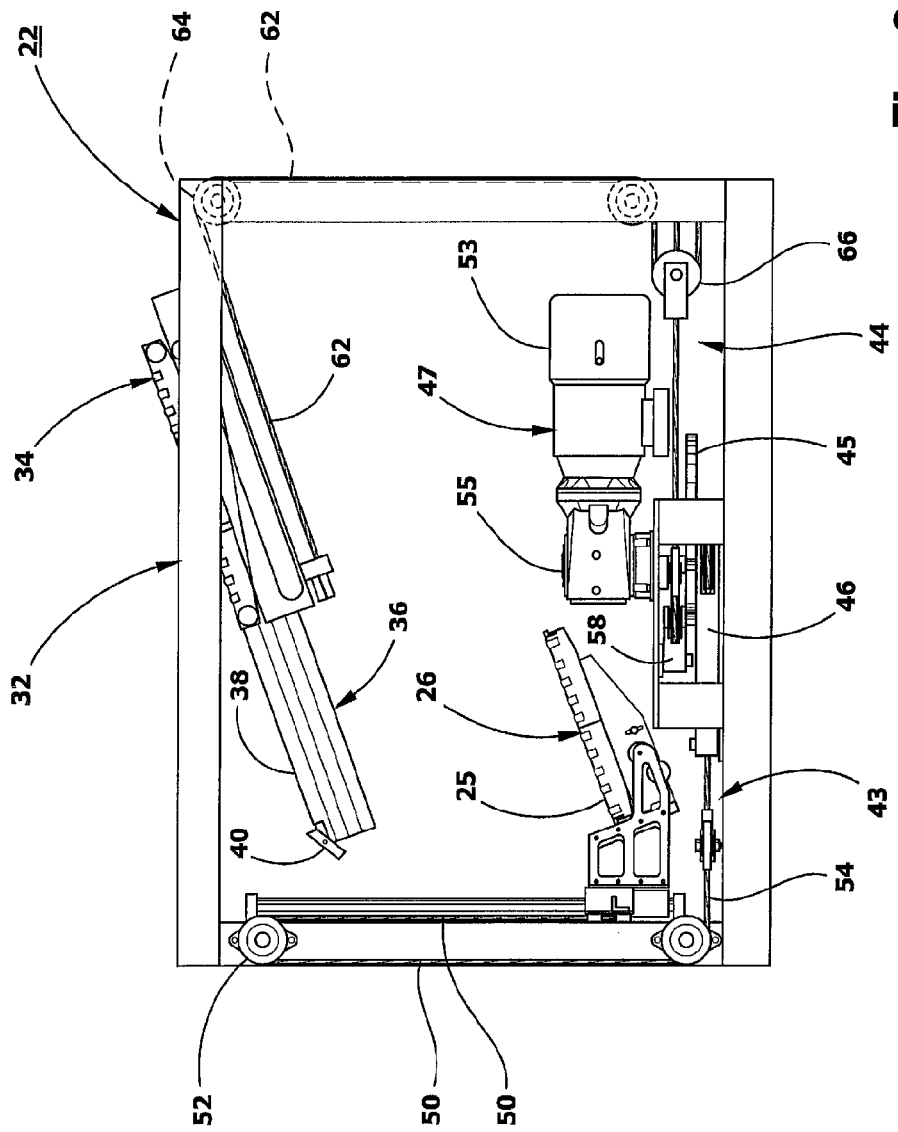
FIG. 3 is a right side elevation of the container-handling mechanism in FIG. 2.

Referring now to the drawings and the illustrative embodiments depicted therein, a goods-to-person picking station 20 and method of picking includes a container-handling mechanism 22 made up of a high-speed exchange 21 for supplying a container, such as a product container T to a pick area, generally shown at 23, and a plurality of order container-handling mechanisms 24 juxtaposed with container-handling mechanism 22 at pick area 23 (FIGS. 1-16d). A container may include a tote, a carton, a unit load carrier, a tray, and the like. It should also be understood that containers are not necessarily of uniform dimensions.

Because of the greater number of order container-handling mechanisms 24 than product container-handling mechanism 22, goods-to person picking station 20 is referred to a one-to-many picking station. Each order container-handling mechanism 24 supplies an empty or partially filled order container to pick area 23, whereby an operator can pick goods from a product container T at the pick area and place the goods selectively to order containers positioned at the order container-handling mechanisms 24 at the pick area. Such picking may be controlled from a computer display screen (not shown) or a pick-to-light display of the type disclosed in commonly assigned U.S. Pat. No. 7,322,848 entitled Paperless Picking System, the disclosure of which is hereby incorporated herein by reference. Such pick-to-light display also provides an operator button that can be actuated in order to indicate that a particular picking step has been completed.

Container-handling mechanism 22 includes a container lift or elevator assembly 26 having a generally vertically reciprocating lift mechanism 27 for elevating a product container T bearing product and a container extractor assembly 32 for extracting the product container after some or all of the product has been removed and placed in the order container(s). Elevator assembly 26 elevates a product container T from a feed area 28 to pick area 23. The product containers T may be supplied to feed area 28 by a conveyor (not shown) entering from the left side, right side or back side of feed area 28, as generally viewed in FIG. 1. The operator stands in front of feed area 28, such as on a platform (not shown). Appropriate shrouding (not shown) would cover container-handling mechanism 22 to separate the operator from the moving mechanisms. A takeaway conveyor line 30 may be provided to supply and remove order containers to/from order container-handling mechanisms 24 and to remove product containers T after they have been processed (picked) by the operator.

Lift mechanism 27 may be made up of a series of parallel tines 25 that are capable of supporting a container and entering into the spaces between conveyor rollers (not shown) in order to receive a container supported by the rollers. While tines 25 are illustrated as supporting individual drivable belt strips to assist in receiving a container from the back side of feed area 28, such belt strips are optional and not necessary for receiving containers from the left side or right side of the feed area.

Figure 4:
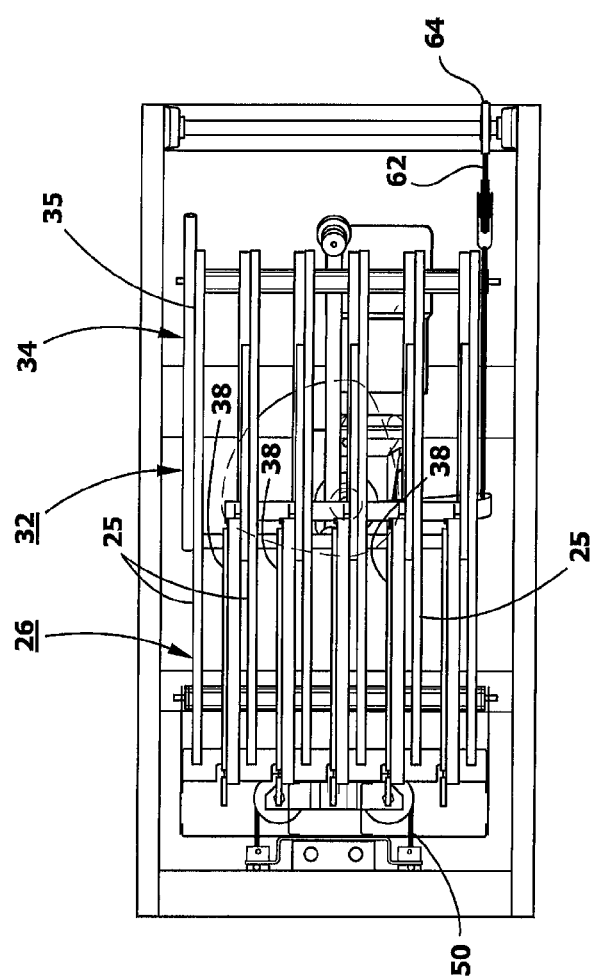
FIG. 4 is a top plan view of the container-handling mechanism in FIG. 2.

Extractor assembly 32 transfers a product container from the pick area. As will be set forth in more detail below, extractor assembly 32 also supports a product container while product is being removed from the container by the operator. Extractor assembly 32 is made up of a transfer mechanism 34 and an extractor mechanism 36. Extractor mechanism 36 extracts a container from pick area 23 and deposits the extracted container to transfer mechanism 34. Extractor mechanism 36 may be made up of a plurality of arms 38 that are selectively extendable to pick area 23 and retractable to transfer mechanism 34. In this manner, arms 38 extend in order to support a container, such as during the pick operation, and retract in order to deposit the container to transfer mechanism 34. In the illustrated embodiments, transfer mechanism 34 includes a series of drivable strip belts 35 to transfer the extracted container to a takeaway conveyor 37 where they are deposited on takeaway conveyor line 30. Arms 38 of extractor mechanism 36 and the tines 25 of lift mechanism 27 are interleaved when extractor mechanism 36 is extended to pick area 23 and are interleaved with strip belts 35 of transfer mechanism 34 when extractor mechanism 36 is retracted to transfer mechanism 34, as best seen in FIG. 4. In this manner, transfer mechanism 34 transfers a container T to a takeaway line at a same general elevation as the pick area. However, transfer mechanism 34 could, alternatively, supply the depleted donor container to a subjacent conveyor utilizing the structure similar to container elevator assembly 26. This would allow extracted containers to be removed from a separate line than that handling order containers.

In the illustrated embodiments, extractor mechanism 36 includes a plurality of container retainers, or catches, such as dogs 40, each at an end of one of arms 38 opposite transfer mechanism 34. Dogs 40 provide unidirectional engagement with a container T. In the embodiment illustrated in FIG. 1, container retainer 40 is gravity operated. In this manner, extractor mechanism 36 engages a container automatically by the bottom of the container depressing each retainer 40 as the arms extend by the action of the arms sliding under the container. Once past the container, container retainers pop up by gravity or a return spring in order to retrieve the container to transfer mechanism 34 as the retainers engage the container and the arms retract. More particularly, operation of elevator assembly 26 and extractor assembly 32 are coordinated in a manner that lift mechanism 27 of the elevator mechanism supports a container T while arms 38 are extending to the pick area and the arms support the container while the elevator assembly lift mechanism retrieves another container from the feed area. This may be accomplished in the illustrated embodiment by elevator assembly 26 and extractor assembly 32 being operated from a common drive assembly 42, as will be described in more detail below. It should be understood, however, that certain embodiments may utilize separate drive assemblies to operate the elevator assembly and extractor assembly, as will be described in more detail below.

Drive assembly 42 includes a container elevator drive portion 43 and an extractor drive portion 44 that are operated in unison. The drive assembly includes one or more control cams 45 and a motor assembly 47 for rotating the control cam(s). Motor assembly 47 includes an electric motor 53 and a gear reducer 55, both of which are commercially available. In the illustrated embodiment, both container elevator drive portion 43 and extractor drive portion 44 are operated from a common control cam 45. This not only more closely coordinates operation of the drives, but also reduces part count and material cost from having separate but coordinated control cams. However, it should be understood that separate but coordinated control cams can be operated from motor 47 for operating container elevator drive portion 43 and extractor drive portion 44.

Elevator drive portion 43 includes an elevator cam follower 46 following cam 45 for operating elevator assembly 26. In particular, elevator drive portion 43 elevates elevator assembly 26. Elevator assembly 26 is lowered by gravity or spring bias or a combination of both in response to slack in cable 50. Extractor drive portion 44 includes an extractor cam follower 58 following cam 45 for operating extractor assembly 32. In particular, extractor drive portion 44 retracts extractor mechanism 36. The extractor mechanism extends from transfer mechanism 34 by gravity or spring bias or a combination of both in response to slack in cable 62. In the illustrated embodiment, elevator cam follower 46 and extractor cam follower 58 are arranged in drive assembly 42 approximately 90° out of phase with respect to control cam 45 for reasons that will be set forth in more detail below.

Elevator drive portion 43 further includes an elevator linkage 48 between elevator cam follower 46 and elevator assembly 26 for transferring motion of the elevator cam follower to the elevator assembly. This may be in the form of an elongated member, such as aircraft cable 50, and one or more direction transferring pulleys 52. In a similar fashion, extractor drive portion 44 includes an extractor linkage 60 between extractor cam follower 58 and extractor assembly 32 for transferring motion of the extractor cam follower to the extractor assembly. This may be in the form of an elongated member, such as an aircraft cable 62, and one or more direction transferring pulleys 64. In order to enhance the motion transfer elevator linkage 48 includes one or more motion-multiplying mechanisms 54 for multiplying movement of elevator assembly 26 with respect to movement of elevator cam follower 46. Extractor linkage 60 may include one or more motion-multiplying mechanisms 66 for multiplying movement of extractor assembly 32 with respect to movement of extractor cam follower 58. Motion-multiplying mechanisms 54, 66 may each be in the form of an inverse hoist mechanism, as will be described in more detail below. In particular, the inverse hoist mechanism includes a drive pulley 70 that produces a 2 to 1 multiplier effect on an output cable so that for every unit of travel of the drive pulley 70, the output cable travels two units. So, by having two motion-multiplying mechanisms in each of the elevator linkages 48 and the extractor linkage 60, for every unit of travel of the respective cam follower, the elevator assembly or the extractor assembly moves four (4) units of travel.

Figure 8:
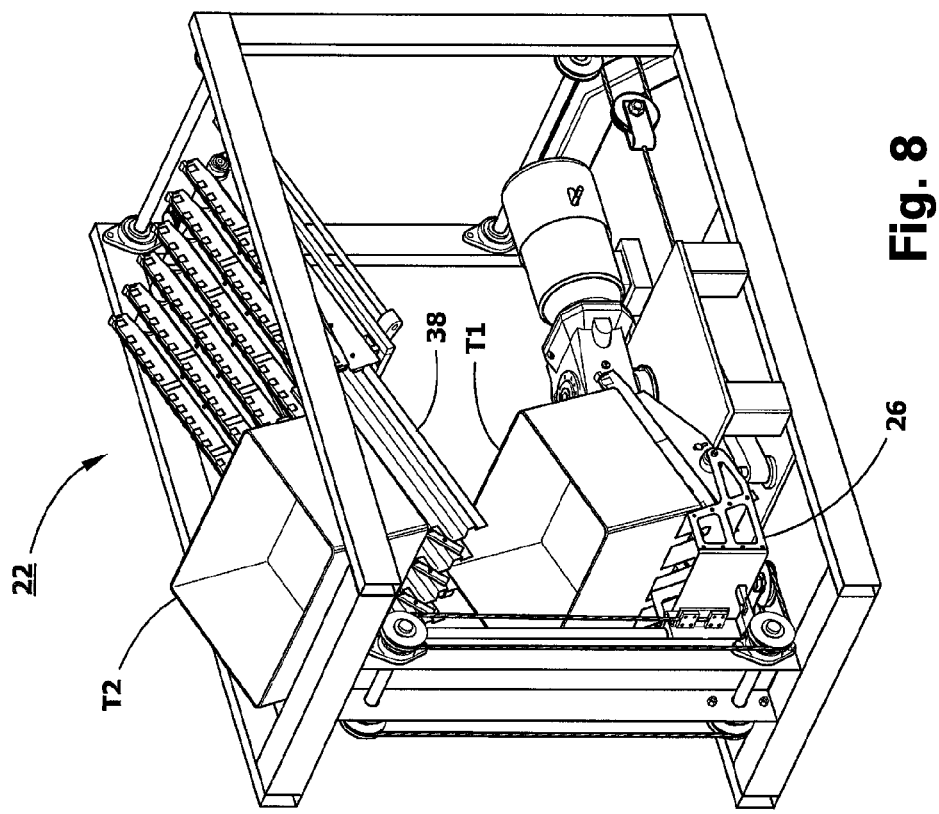
FIG. 8 is the same view as FIG. 2 illustrating a state of operation of the container-handling mechanism.
Figure 9:
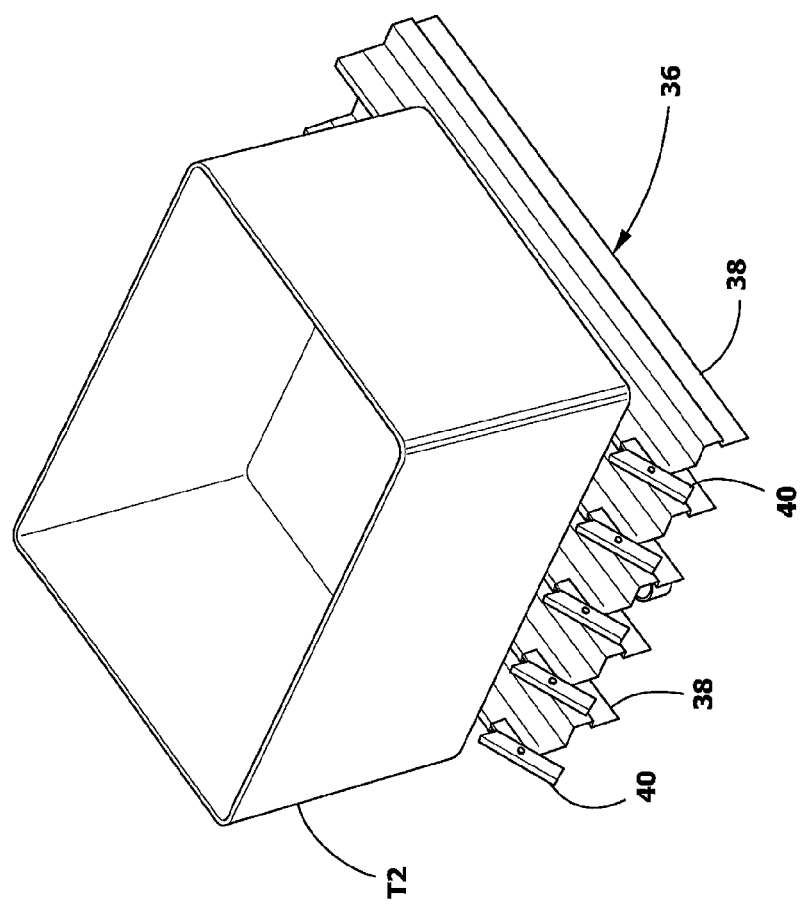
FIG. 9 is an enlarged perspective view of the extractor mechanism supporting a container.

Operation of goods-to-person pick station 20 is illustrated within FIGS. 8-13. When a container, such as a product container, T1 is presented to feed area 28 by a conveyor (not shown), lift mechanism 27 of elevator assembly 26 is in a lowered position to receive the container, as illustrated in FIG. 8. This may occur while a previously presented container T2 is at the pick 23 where product is being transferred between that container and one or more other containers (not shown). While container T2 is being wholly or partially emptied or filled, it is being supported by arms 38 that are in their extended position, as illustrated in FIGS. 8 and 9. With arms 38 supporting container T2, dogs 40 are raised in order to facilitate transferring of the container to transfer mechanism 34, as will be described in more detail below.

Figure 10:
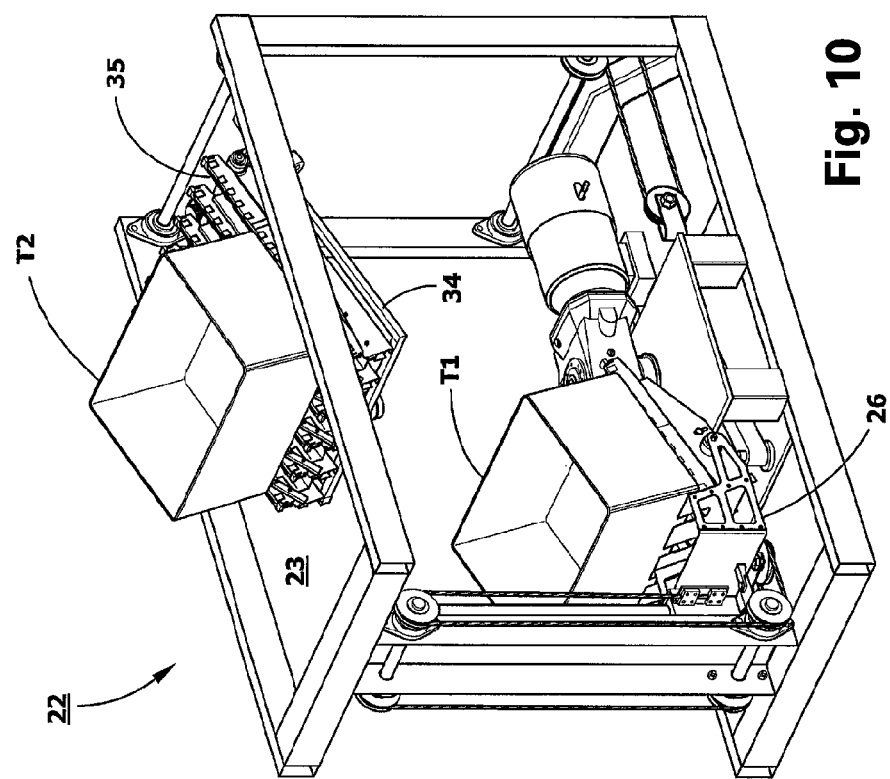
FIG. 10 is the same view as FIG. 2 illustrating another state of operation of the container-handling mechanism.

When the operator is finished with container T2, the operator indicates this to the system control, such as by actuating a switch or speaking a command, or the like. This causes motor assembly 47 to operate elevator drive portion 43 to raise a new container T1 with elevator assembly 26 and to operate extractor drive portion 44 to cause arms 38 to be retracted to transfer container T2 to transfer mechanism 34, as illustrated in FIG. 10. Once container T2 is on transfer mechanism 34, drivable strip belts 35 may be driven to transfer container T2 to a takeaway 37.

Figure 11:
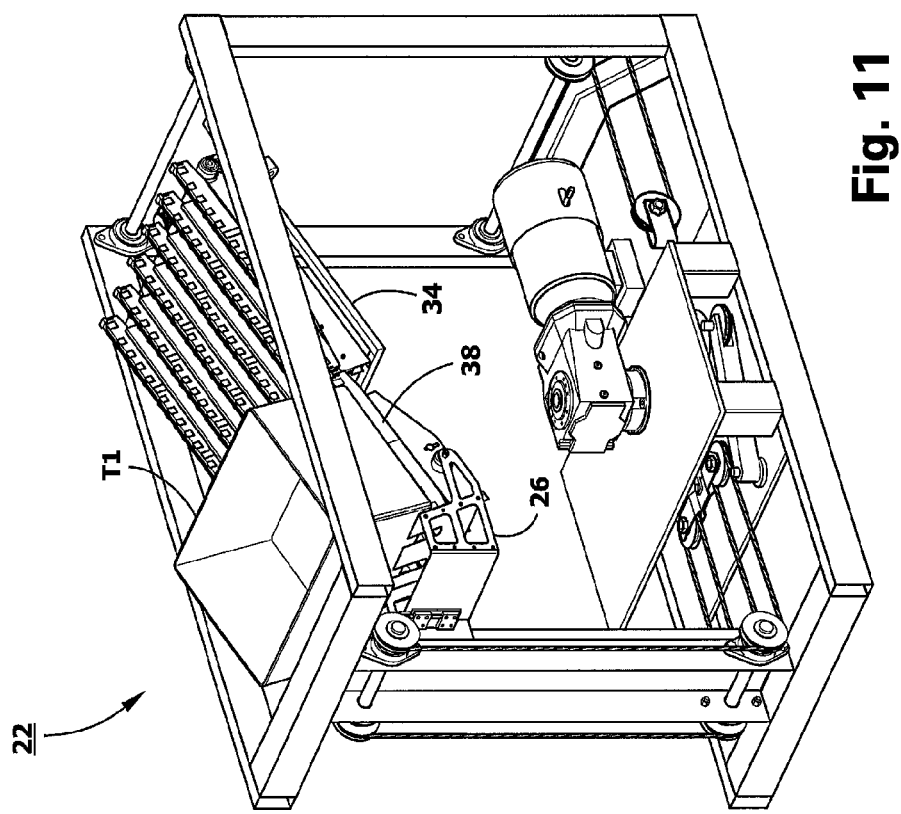
FIG. 11 is the same view as FIG. 2 illustrating yet another state of operation of the container-handling mechanism.
Figure 12:
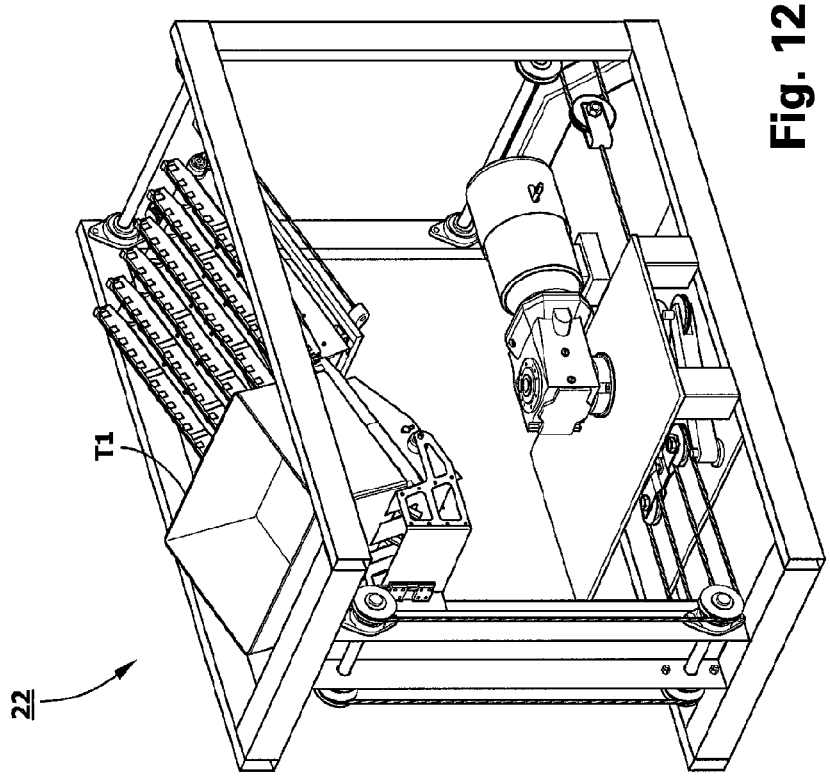
FIG. 12 is the same view as FIG. 2 illustrating yet another state of operation of the container-handling mechanism.
Figure 13:
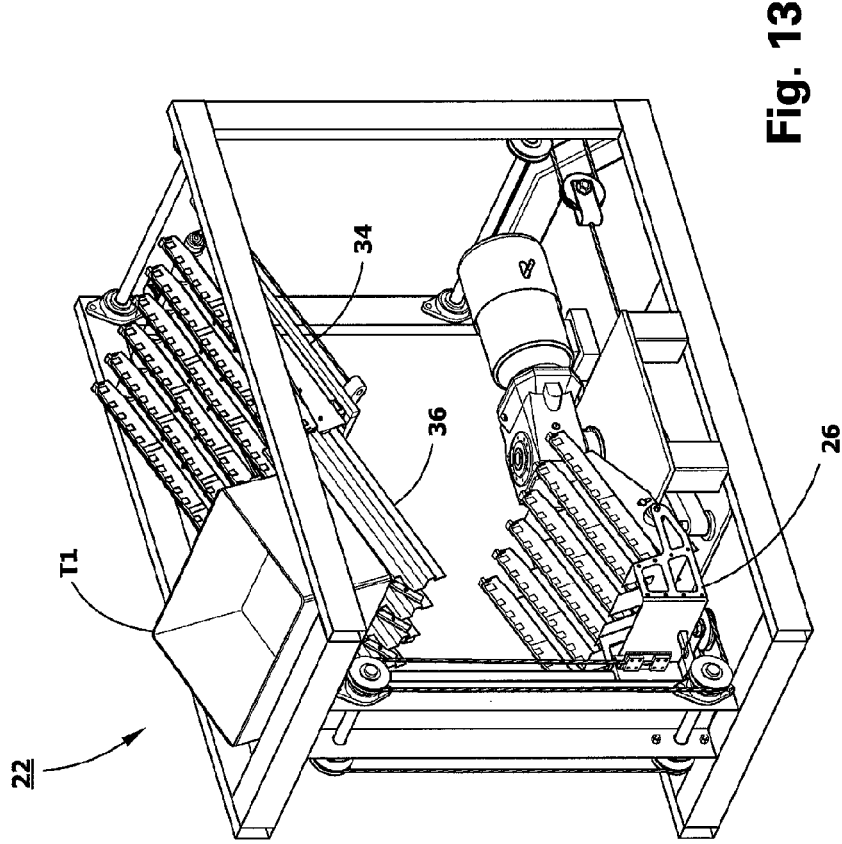
FIG. 13 is the same view as FIG. 2 illustrating yet another state of operation of the container-handling mechanism.
Figure 14:
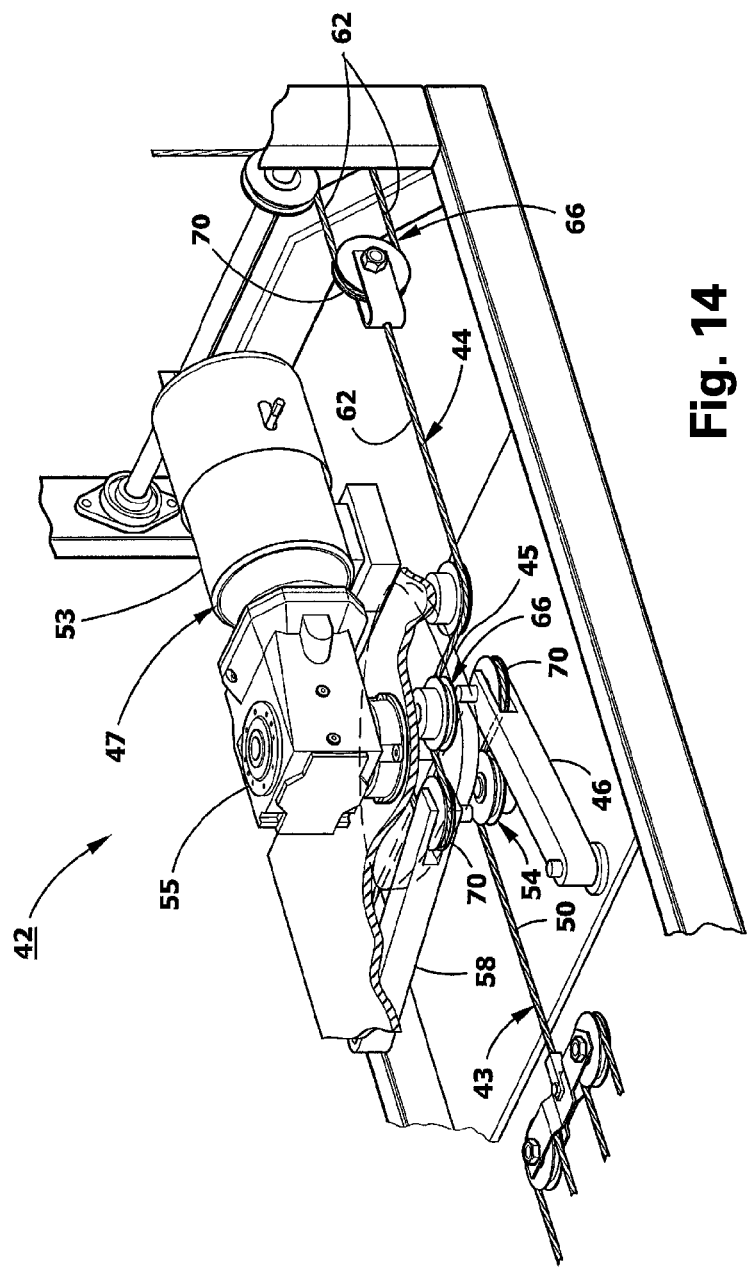
FIG. 14 is an enlarged perspective view of a drive assembly.

When lift mechanism 27 of elevator assembly 26 reaches pick area 23, as illustrated in FIG. 11, the elevator assembly dwells in that position supporting container T1 while operation of extractor drive portion 44 causes arms 38 to extend under the container. As the arms are extended, dogs 40 are compressed under the container and extend outwardly once they clear the bottom of the container. With the arms of extractor mechanism 36 now supporting the container T1, elevator assembly 26 is lowered to retrieve another container, as seen by comparing FIGS. 12 and 13.

Because elevator assembly 26 and extractor assembly 32 are operated by a common drive assembly 42 in the illustrated embodiment, their operations may be closely coordinated. Moreover, elevator cam follower 46, which operates elevator drive portion 43, and extractor cam follower 58, which operates extractor drive portion 44, goes through the same general motion but 90° out of phase. This allows elevator cam follower 46 and extractor cam follower 58 to follow a common cam, or two coupled cams, while being positioned approximately 90° apart. The coordination of elevator drive portion 43 and extractor drive portion 44 can best be further understood by reference to FIGS. 15 and 16*a*-16*d*.

Figure 15:
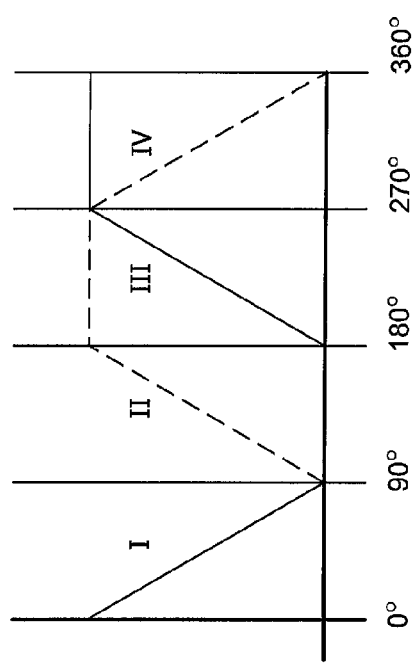
FIG. 15 is a diagram illustrating operation of the container-handling mechanism.
Figure 17:
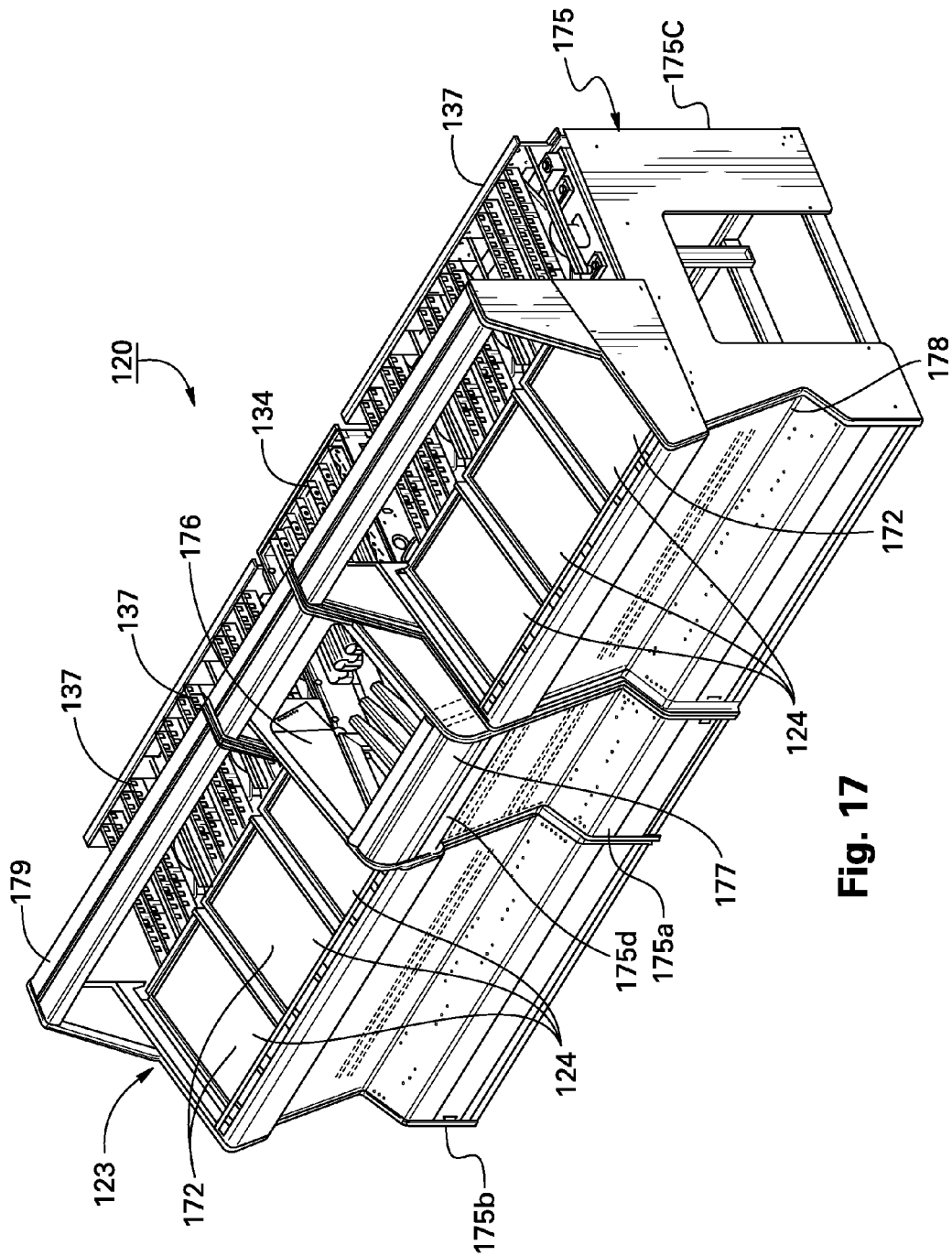
FIG. 17 is the same view as FIG. 1 of an alternative embodiment of a one-to-many goods-to-person picking station.
Figure 18:
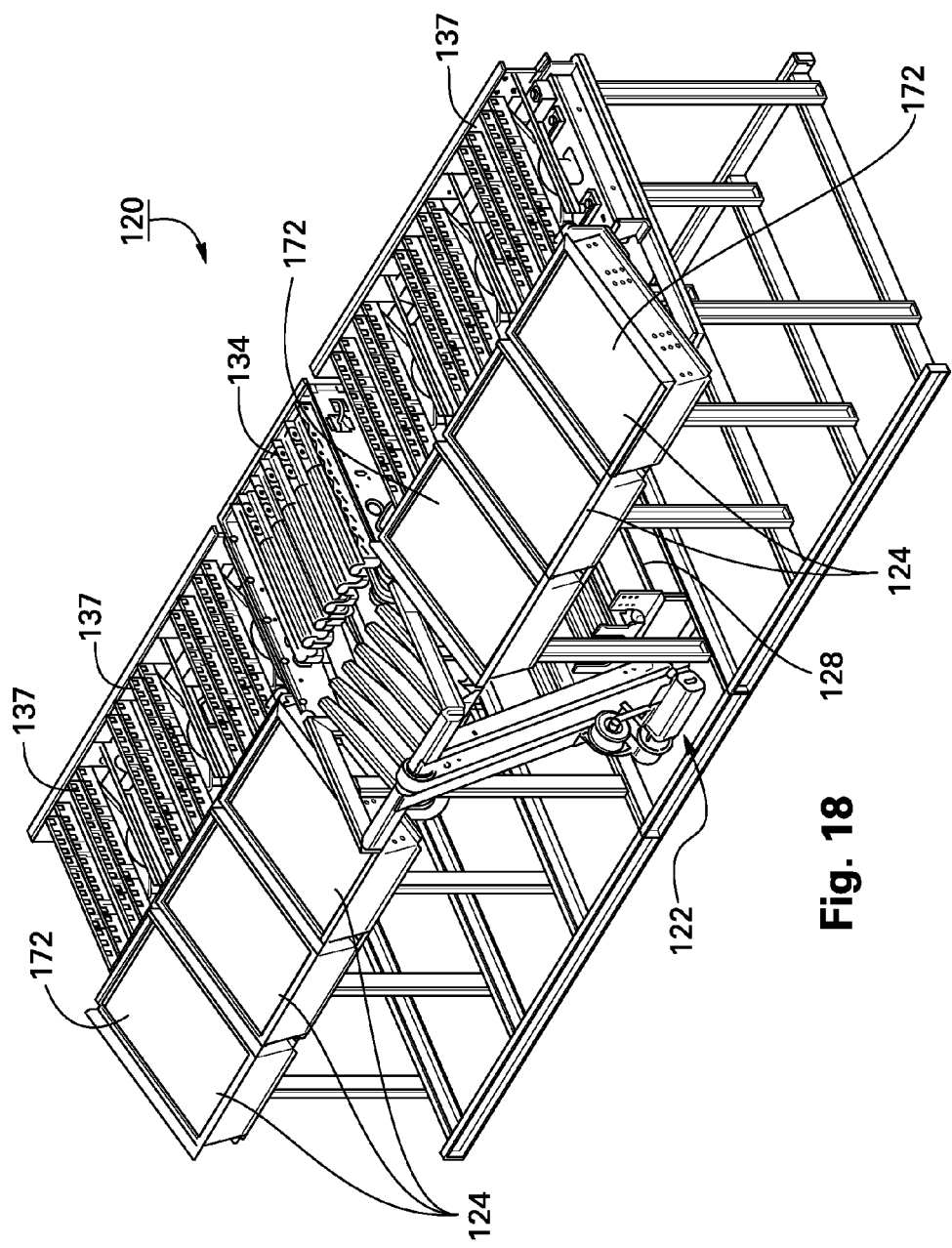
FIG. 18 is the same view as FIG. 17 with the cover removed to reveal internal details thereof.
Figure 19:
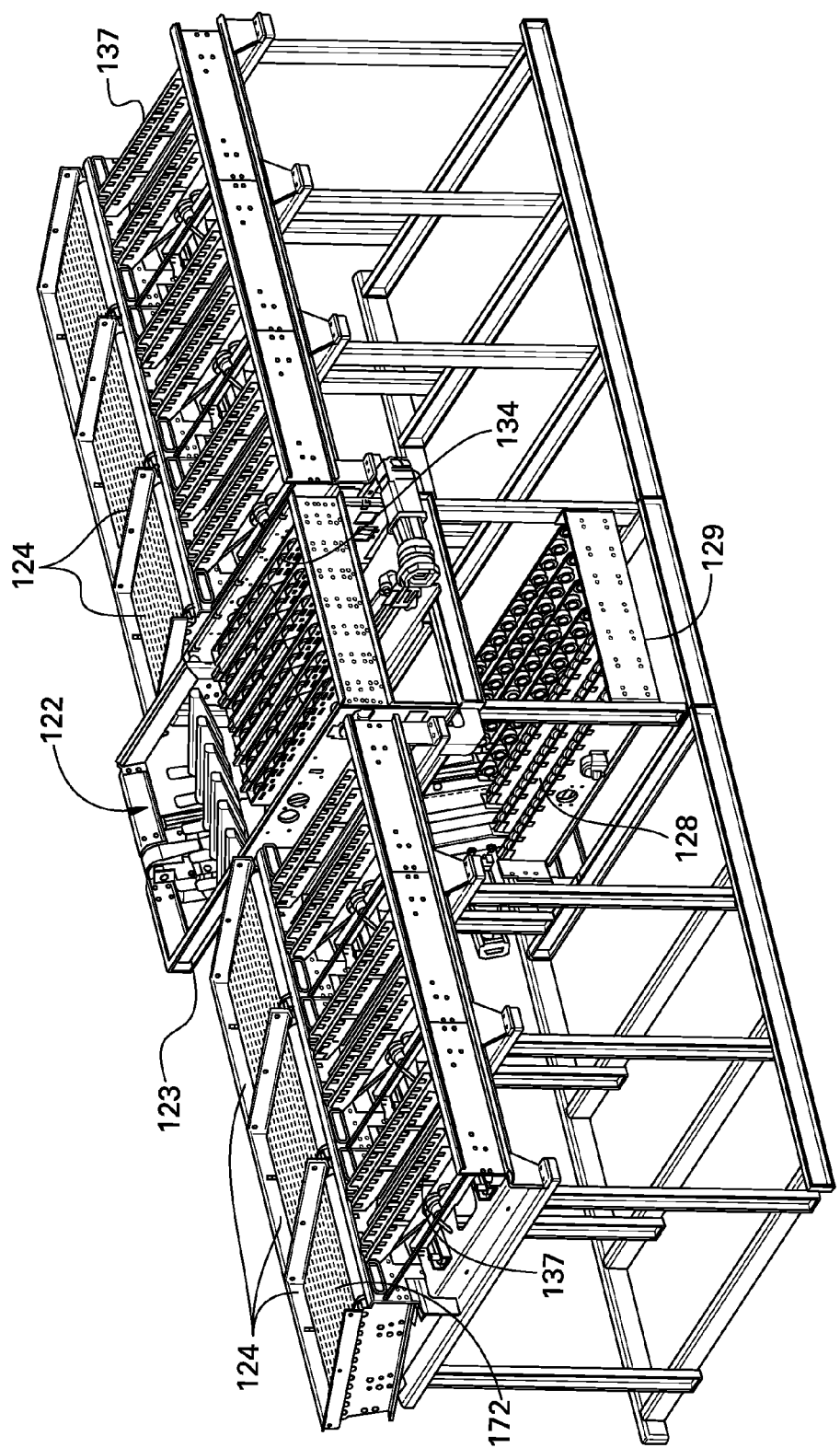
FIG. 19 is a perspective view taken from the rear, top and right side thereof of the goods-to-person picking station in FIG. 17.
Figure 20:
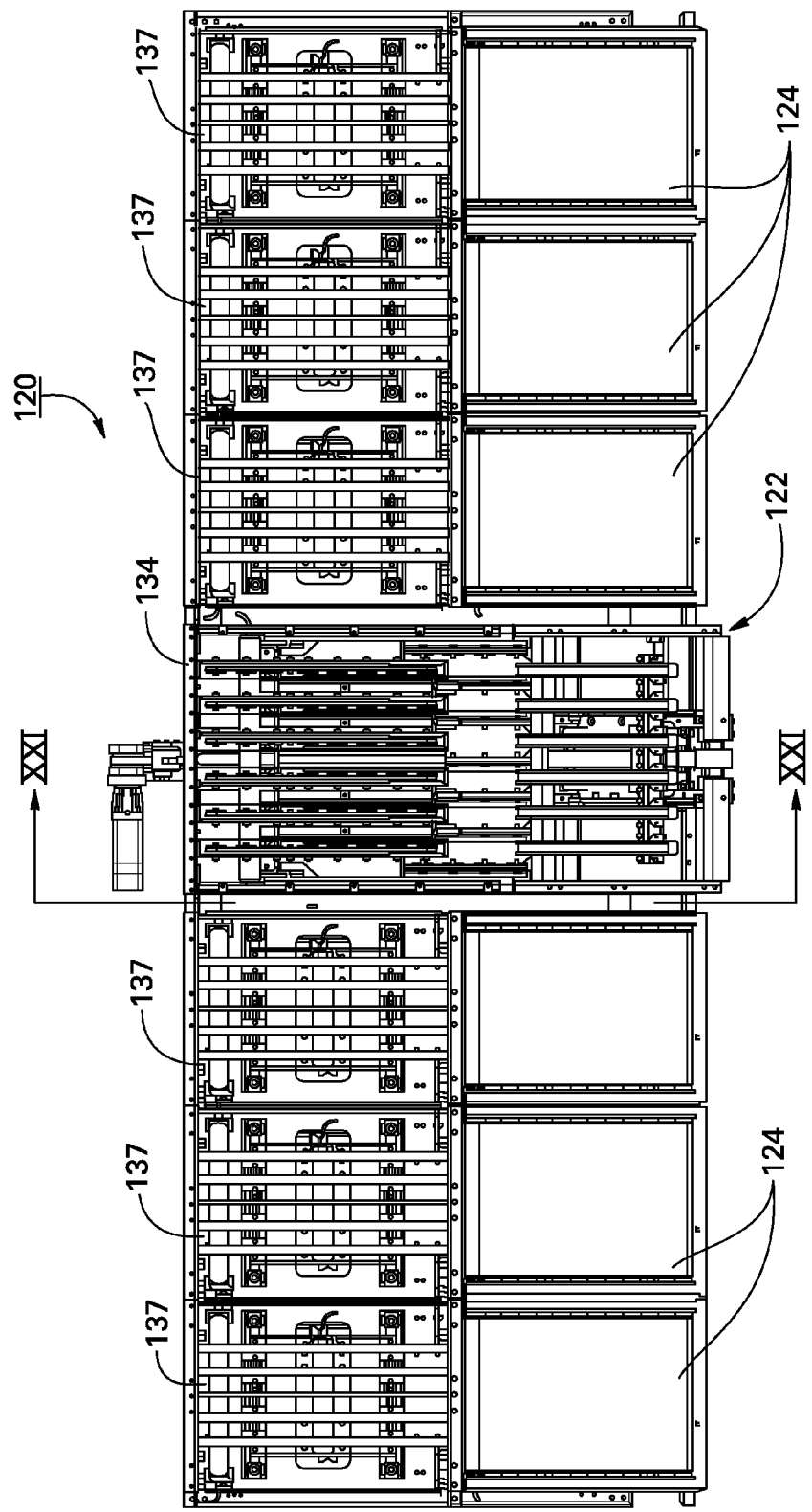
FIG. 20 is a top plan view of the goods-to-person picking station in FIG. 17.
Figure 21:
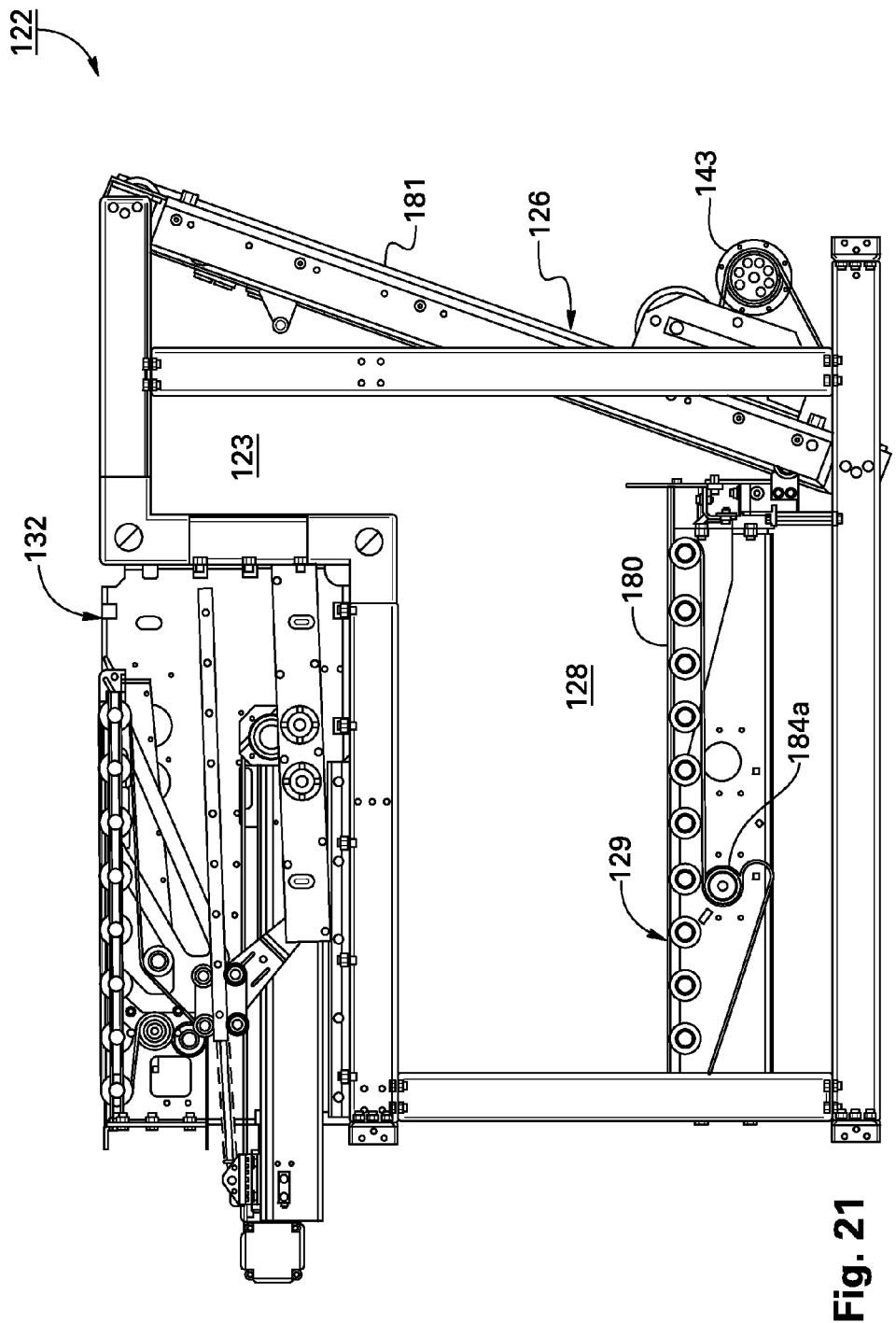
FIG. 21 is a sectional view of the container transfer mechanism or high-speed exchange taken along the lines XXI-XXI in FIG. 20 with the lift in a lowered position.

During a first quadrant, or phase, I of revolution of cam 45 from 0° to 90°, extractor mechanism 36 is being retracted to transfer the donor container to transfer mechanism 34 by movement of extractor cam follower 58 inwardly as seen by the downwardly sloping solid line in FIG. 15 and by comparison of FIGS. 16*a* and 16*b*. Extractor mechanism 36 stays in the retracted position during phase II. During phase II, revolution of cam 45 from 90° to 180°, lift mechanism 27 of elevator assembly 26 elevates a container in response to elevator cam follower 46 moving outwardly as seen by the broken line in FIG. 15 and by comparison of FIGS. 16*b* and 16*c*. In phase III, revolution of cam 45 from 180° to 270°, lift mechanism 27 of elevator assembly 26 dwells in its elevated position while arms 38 of extractor mechanism 36 extend outwardly as a result of extractor cam follower 58 moving inwardly as seen by comparison of FIGS. 16*c* and 16*d*. In phase IV, revolution of cam 45 from 270° to 360°, elevator assembly 26 moves downwardly by elevator cam follower 46 moving inwardly as seen by the downwardly sloping broken line in FIG. 15 while extractor mechanism 36 remains extended as seen by comparison of FIGS. 16*d* and 16*a*.

During phases I, II, III, and IV, motor assembly 47 rotates cam 45 continuously without stopping from one phase to the next. At the end of phase IV, motor assembly 47 stops rotating of cam 45 until the operator indicates that the container in the pick area has been processed and is ready for the next container. When the operator gives the indication, such as by operating a switch or speaking a command, the control causes motor assembly 47 to be energized again which causes drive assembly 42 to enter phase I to retract the extractor mechanism to remove the processed container. This results in a high-speed exchange of containers at pick area 23 to improve operator productively by reducing wait time between pick steps.

Thus, it is seen that operation of elevator assembly 26 and extractor assembly 32 is closely coordinated. Moreover, in the illustrated embodiment, only one of the assemblies is moving at any time. This allows an overall reduction in the amount of power needed to operate container-handling mechanism, or high-speed exchange, 22 because the same motor assembly can be used to operate both mechanisms one at a time. However, in some applications, it may be desirable to have the movements of the elevator and extractor assemblies overlap to decrease cycle time. Also, the ability to utilize a common cam or two coupled cams ensures that the elevator drive portion and the extractor drive portion will remain in synchronism and will reduce overall cost.

Another embodiment, a goods-to person picking station 120, and method of picking, includes a product container-handling mechanism 122, a plurality of order container-handling mechanisms 124 and takeaway conveyors 137 for removing processed order containers displaced from order container-handling mechanisms 124 (FIGS. 17-32). Takeaway conveyors 137 may be belt conveyors, live-roller conveyors, or the like. A similar takeaway conveyor (not shown) may be provided to remove processed product containers from transfer mechanism 134 of product container-handling mechanism 122. In the illustrated embodiment, order container-handling mechanisms 124 are made up of bi-directionally driven belt conveyors 172 that receive unprocessed order containers (containers that are empty or only partially filled) from takeaway conveyors 137. Processed containers are transferred to takeaway conveyor 137 by operating conveyors 174 in a reverse direction toward takeaway conveyors 137. Alternatively, order container-handling mechanisms may be manual, in which case conveyors 172 would be gravity roller conveyors, skate wheel conveyors, sheet metal pans, or the like, requiring the operator to shove processed order containers onto takeaway conveyor 137. Empty order containers would be manually supplied from a stack of empty containers behind the operator from an overhead conveyor, or the like.

Picking station 120 further includes a shroud 175 having shroud portion 175*a* covering product container-handling mechanism 122 and shroud portions 175*b* and 175*c* each covering the order container-handling mechanisms 124 on one side of the product container-handling mechanism. Shroud 175*a* around product container-handling mechanism 122 has a hood 175*d* that can be pivoted rearward on pivot pins (not shown) in order to allow maintenance access to the container-handling mechanism. Also, the pins supporting hood 175*d* can be adjusted in elevation thereby allowing product container-handling mechanism 122 to be adjusted to accommodate different container heights while supplying the containers at a height just below a window 176 in hood 175*d*. This, in combination with an adjustable height support platform (not shown), allows the operator to work at a comfortable position. A light curtain (not shown) around window 176 provides a safety interlock to stop operation of product container-handling mechanism 122 if the operator's hands penetrate window 176. A padded cushion 177 is provided at shroud portion 175*a* to allow the operator to lean against the shroud and a toe kick 178 at the nominal elevation of the operator platform further add to operator comfort. A mounting rail 179 allows mounting of a computer monitor, clipboard, signage, lighting, or the like (none of which are shown). As such, mounting rail 179 may supply electrical power and data or only provide for mechanical support.

Figure 22:
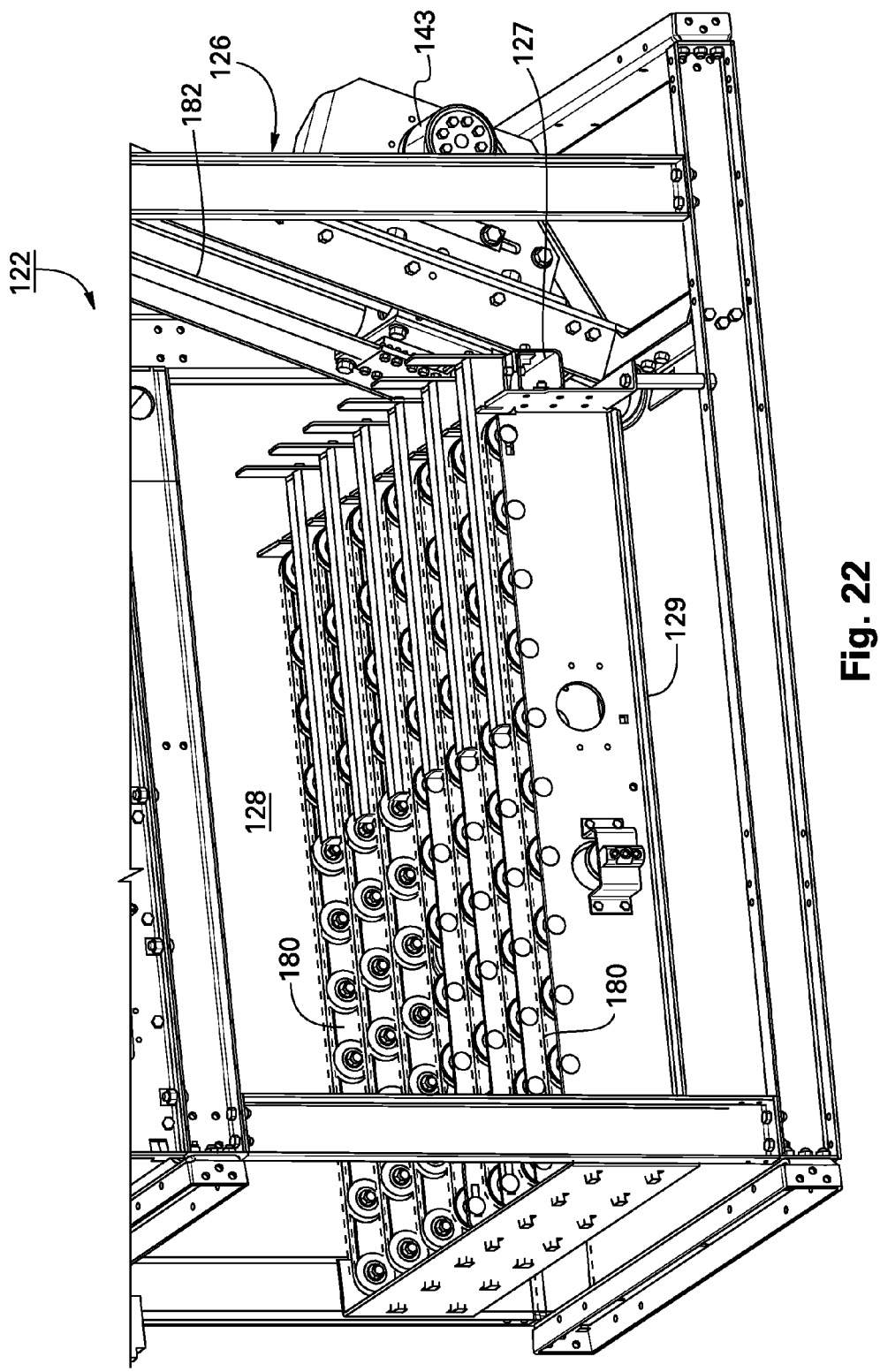
FIG. 22 is a perspective view taken from the rear, top, and left side of the container feed area in FIG. 21.
Figure 23:
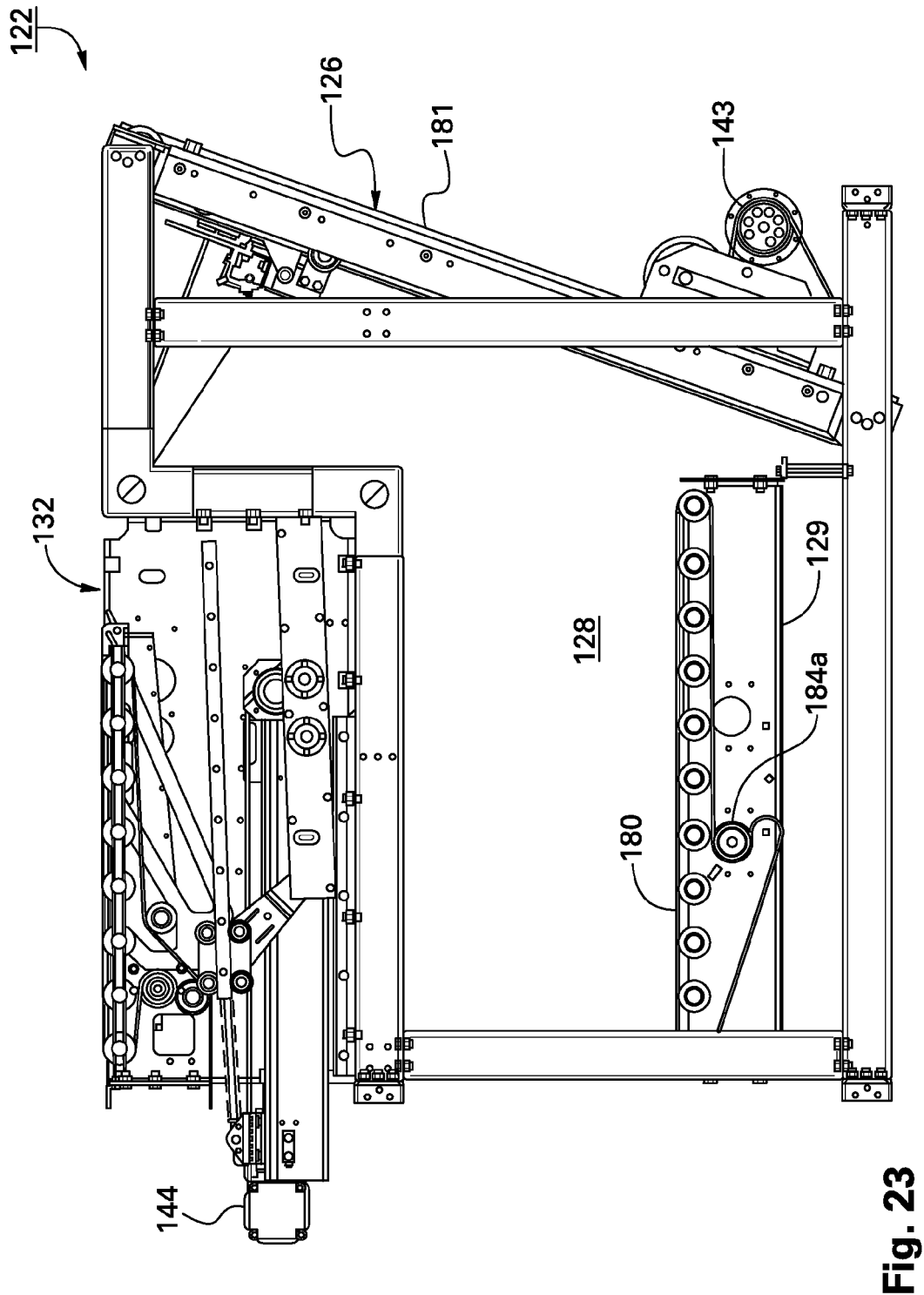
FIG. 23 is the same view as FIG. 21 with the lift in a raised position.
Figure 24:
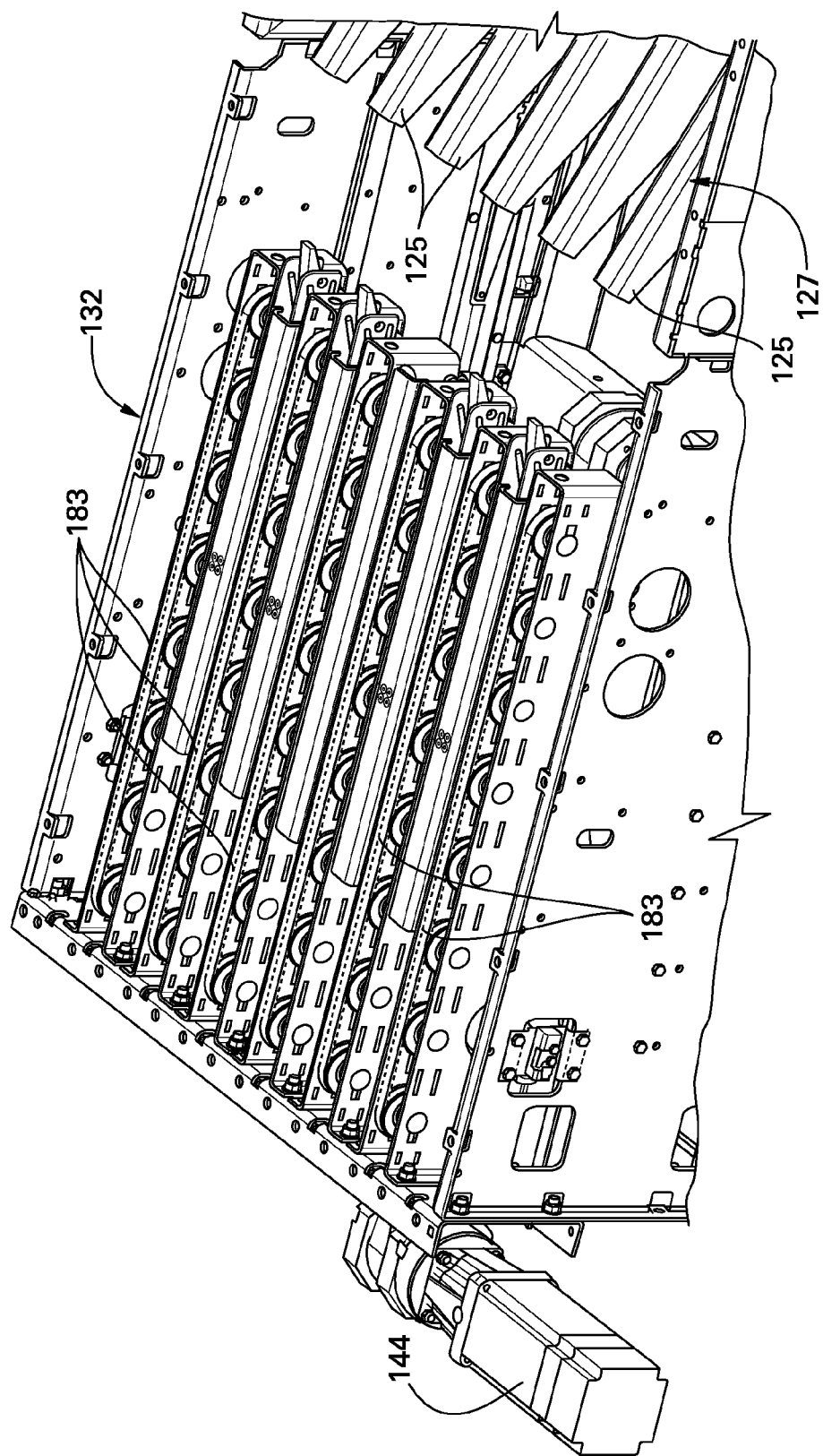
FIG. 24 is a perspective view taken from the front, top, and left side of an extractor assembly and lift.
Figure 25:
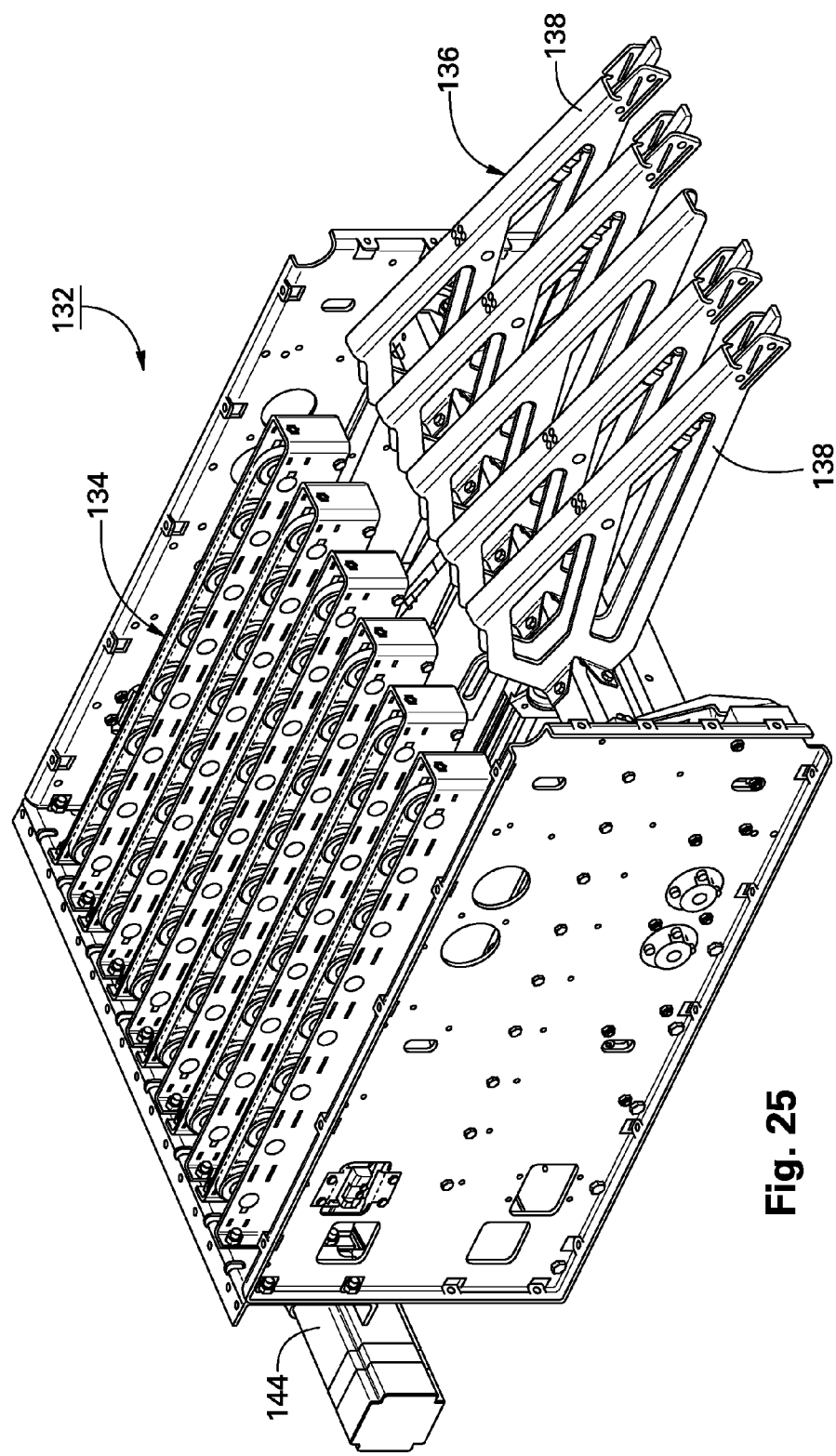
FIG. 25 is a perspective view taken from the front, top, and left side of the extractor assembly in FIG. 24 with the extractor mechanism in the extended position.
Figure 26:
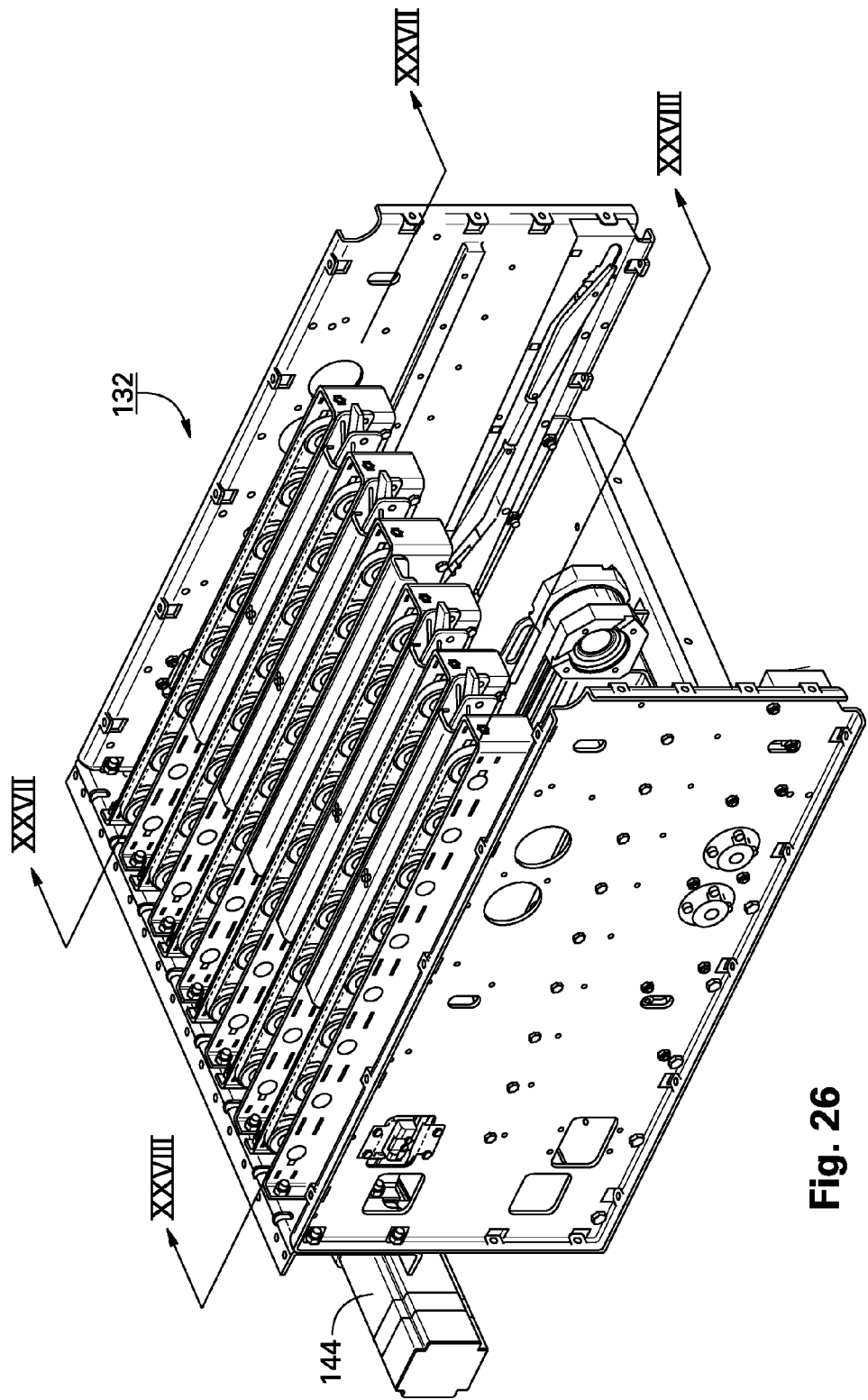
FIG. 26 is the same view as FIG. 25 with the extractor mechanism in the retracted position.
Figure 27:
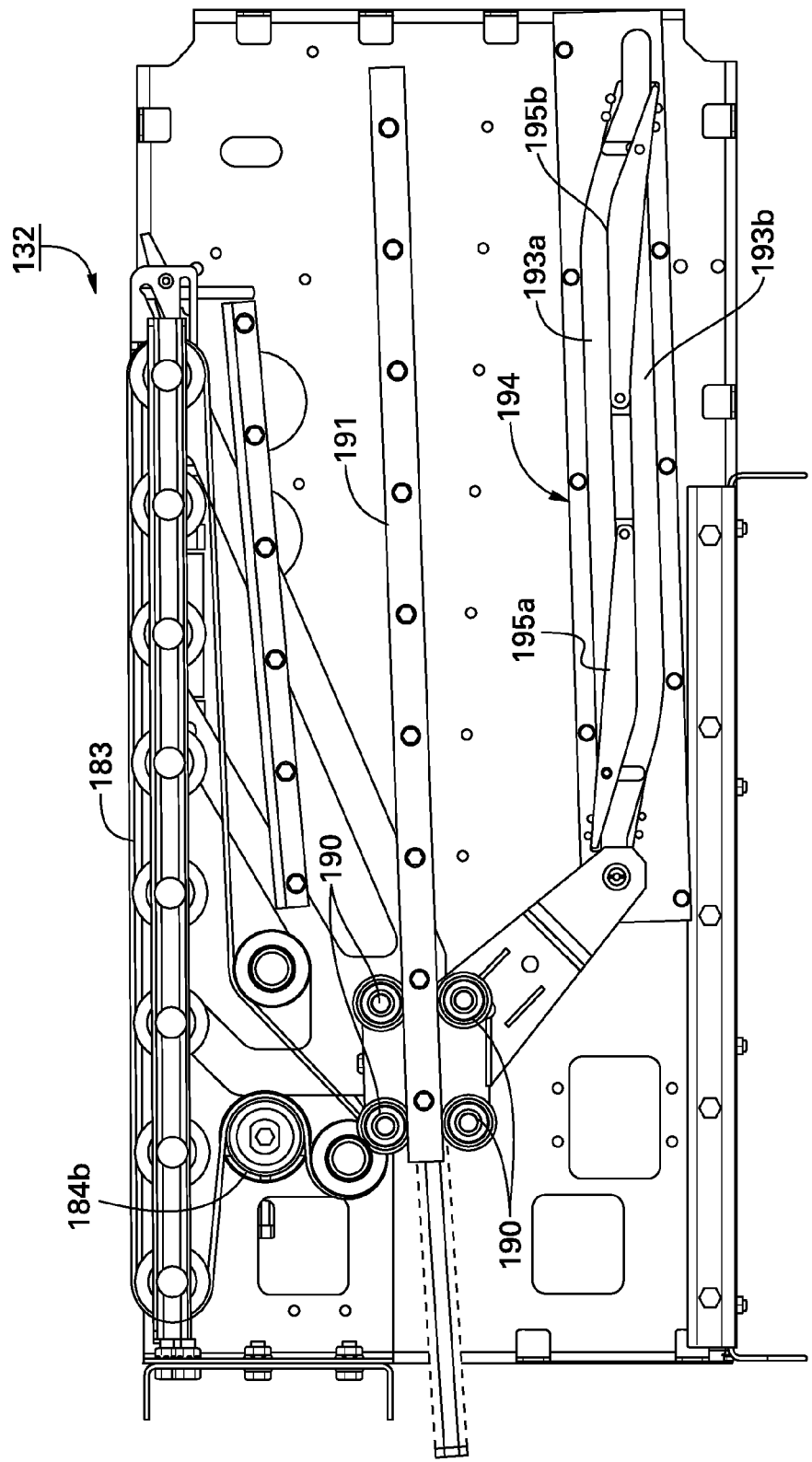
FIG. 27 is a sectional view taken along the lines XXVII-XXVII in FIG. 26.

Product container-handling mechanism 122 includes a feed bed 129 that received product containers at a feed area 128 (FIG. 22). Feed bed 129 includes a series of strip belts 180 that are commonly driven from a motorized roller 184. Strip belts 180 allow product containers to be supplied from behind goods-to-person pick station 120, which is to the left, as viewed in FIG. 22. In other embodiments that will be described below, product containers can be supplied laterally from either direction. Strip belts 180 are spaced apart in a manner that allows tines 125 of lift mechanism 127 to pass between the strip belts so that the tines can engage an order container on feed bed 129 from below. Lift mechanism 127 is a component of a product container elevator assembly 126 that includes an inclined rail 181 and an elevator drive portion 143. In the illustrated embodiment, elevator drive portion 143 is a direct current (DC) servo motor that is positioned from an electronic servo drive (not shown). Elevator drive portion 143 is coupled to lift mechanism 127 by a cog belt, or timing belt, 182, that is commercially available from various sources, such as Brechoflex Corporation.

Lift mechanism 127 may be kept at a fixed angle, such as, for example, 20 degrees, to present the product container to the operator at a conveniently angled orientation to allow easy access to the container. In such configuration, lift mechanism 127 must extend sufficiently below strip belts 180*a* to avoid interference between tines 125 and a product container being fed to bed 129. In order to avoid abrupt contact between tines 125 and the container when lift mechanism 127 is raised, the servo drive may be programmed to operate at a slower speed when engaging the container from below and at a higher speed to elevate the container to a pick area 123. Alternatively, lift mechanism 127 may be mounted to rail 181 with different tilt angles depending on the elevation of mechanism 127. This may be accomplished by providing a cam rail (not shown) adjacent rail 181 and a cam follower (not shown) on lift mechanism 127 that follows the cam rail. With lift mechanism 127 pivotally supported and with suitable configuration of the cam rail, lift mechanism 127 may be horizontally oriented when in feed area 128 to receive the product container and pivot to the illustrated angled orientation by the time it arrives at pick area 123. While adjustable tilt angle to lift mechanism 127 requires additional components to carry out the tilting, it may be elevated at a constant speed profile because tines 125 can be positioned just below the level of strip belts 180.

Product container-handling mechanism 122 further includes a product container extractor assembly 132 for supporting product containers in pick area 123 while the operator is picking from that product container and while elevator assembly 126 is retrieving the next product container. Extractor assembly 132 includes a transfer mechanism 134 for transferring processed product containers to a take-away conveyor (not shown) and an extractor mechanism 136. Extractor mechanism 136 extends away from transfer mechanism 134 into pick area 123 where arms 138 thereof interleave with tines 125 to support a product container while it is being picked and to retrieve the processed product container onto transfer mechanism 134. Transfer mechanism 134 includes a plurality of strip belts 183 that are spaced apart sufficiently to receive arms 138 between the strip belts and a motorized roller 184b that is coupled to the sheaves supporting strip belts 183 to drive the strip belts. Strip belts 183 discharge a processed product container retrieved by extractor mechanism 134 to a take-away conveyor (not shown) that extends rearward out the back of picking station 120 to the left as viewed in FIG. 28.

Figure 28:
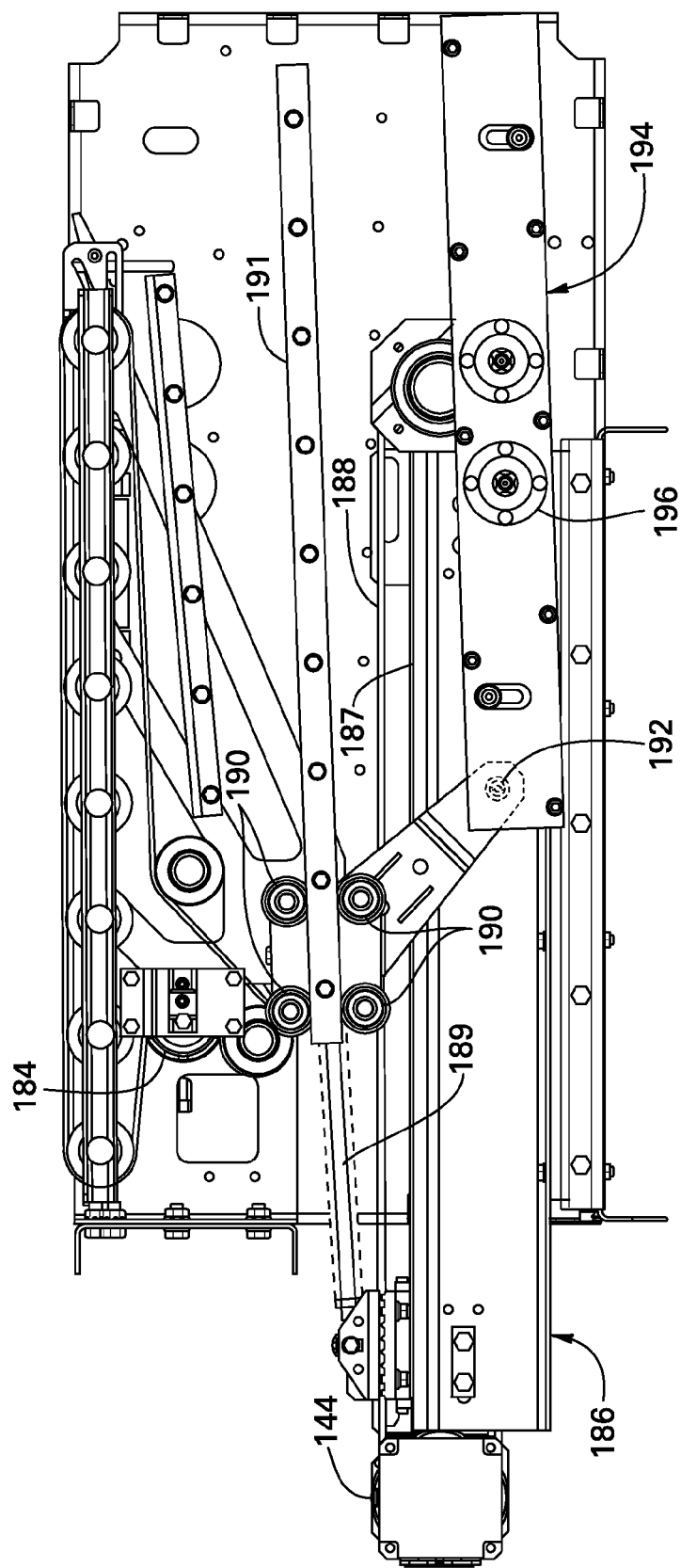
FIG. 28 is a sectional view taken along the lines XXVIII-XXVIII in FIG. 26.
Figure 29:
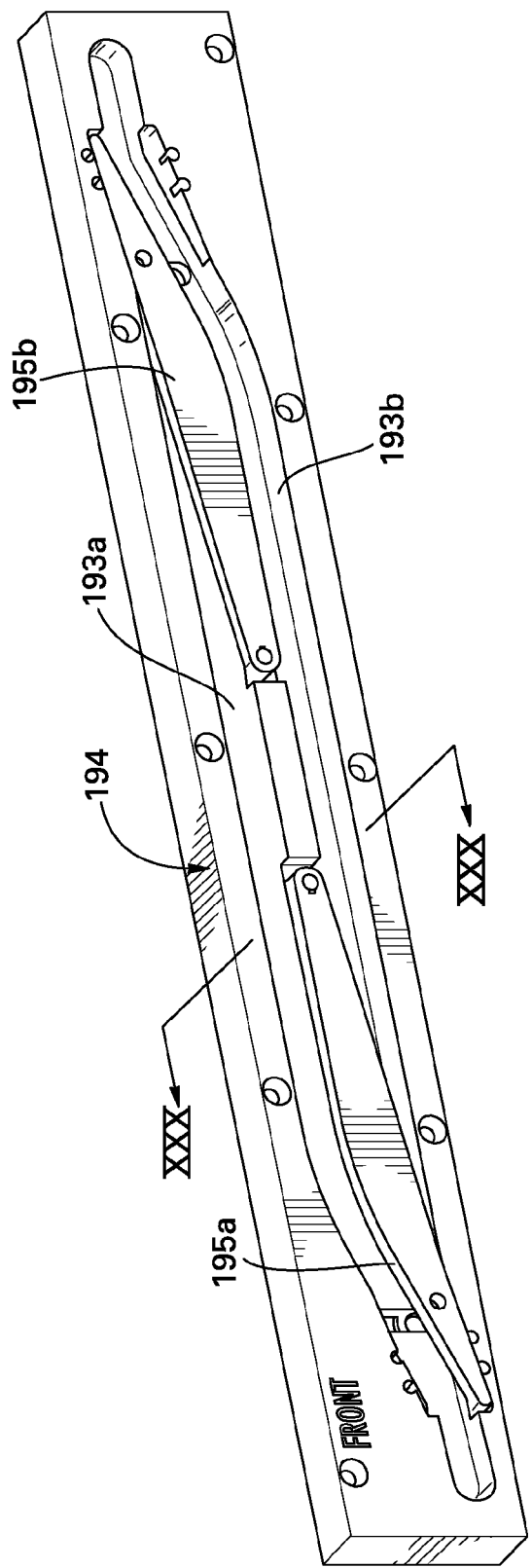
FIG. 29 is a perspective view taken from the top, side and front of an extractor track.
Figure 30:
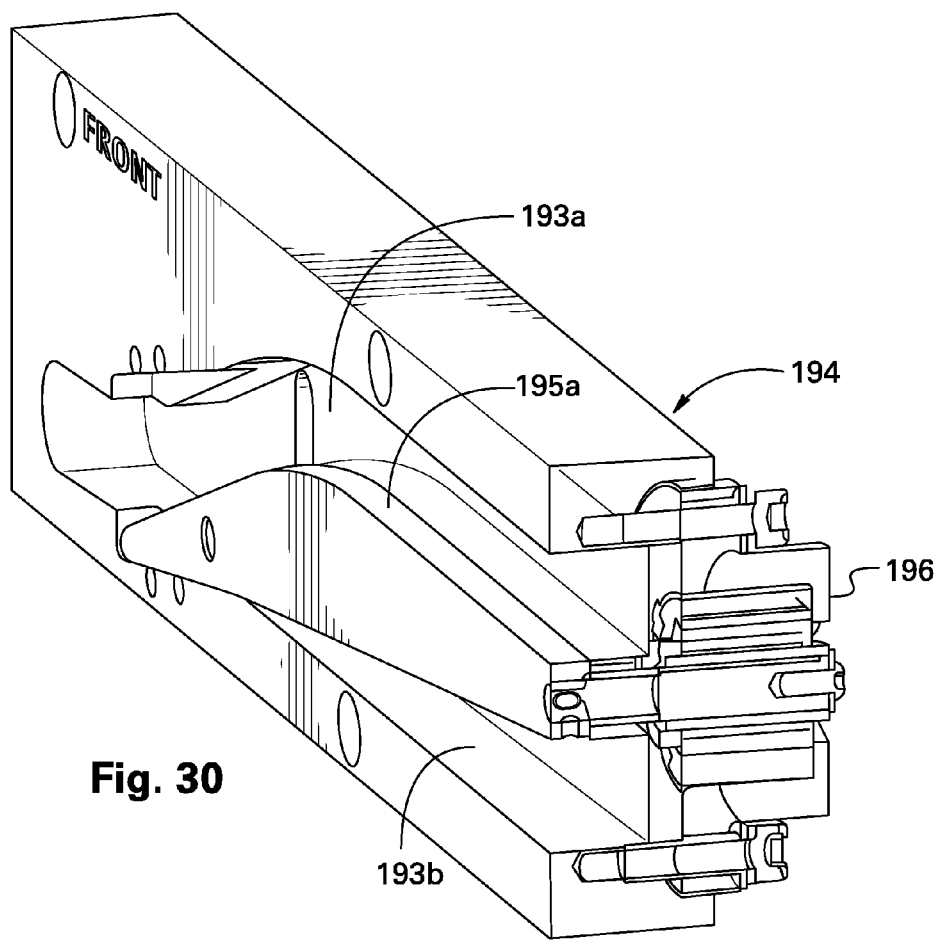
FIG. 30 is a perspective/sectional view taken along the lines XXX-XXX in FIG. 29.

Extractor assembly 132 includes an extractor drive portion 144, which is a DC servo motor that is operated from an electronic servo drive (not shown) and which causes extractor mechanism 136 to extend and retract. Extractor drive portion 144 is coupled to extractor mechanism 136 by a linear actuator 186 including a rail 187 and a cog belt 188 that is coupled to transfer mechanism 134 by a pivotable linkage 189 (FIG. 28). Pivotable linkage 189 allows extractor mechanism 136 to follow a complex path, as will be described in more detail below. Such linear actuator is commercially available from various sources, such as Rollon Corporation.

Extractor mechanism 136 is pivotally supported by a set of opposing wheels 190 which travel along a generally linear rail 191. Mechanism 136 is pivotally mounted at 102 and further includes a cam follower 192 which travels in upper and lower grooves 193a, 193b of a track assembly 194 in order to pivot the extractor mechanism about pivot 102. Grooves 193a, 193b define separate travel paths for cam follower 192 depending upon whether extractor mechanism 136 is being extended or retracted. Grooves 193a, 193b are separated closest to the operator by a gate 195a and away from the operator by a gate 195b. Gates 195a, 195b are each biased into the positions illustrated in FIG. 29 by a respective rotary spring 196. Rotary spring 196 is commercially available, such as from Rosta Swiss Company. This arrangement also allows extractor mechanism 136 to approach pick area 123 from below as cam follower 192 travels in lower groove 193b. This allows arms 138 to approach a container in pick area 123 from below to avoid colliding with the container. This arrangement allows extractor mechanism 136 to approach transfer mechanism 134 from above to ensure that the container is properly deposited onto strip belts 183 without colliding with the front face of the transfer mechanism. This is accomplished by cam follower 192 traveling in upper groove 193a when retracting to raise arms 138. Cam follower 192 switches from lower groove 193b to upper groove 193a as the extractor moves into the pick area by the cam follower moving gate 195a out of the way against the force of rotary spring 196 and allowing the spring to return the gate to the positions shown in FIG. 29 so that the cam follower can move along upper track 193a. In a similar fashion, cam follower 192 causes gate 195 to move out of the way as extractor mechanism 136 is retracted so that cam follower 192 can move to lower track 193b for extending to lower arms 138. While only one cam follower and track assembly 194 are illustrated, a mirror image set is used on both sides of extractor mechanism 136.

Extractor mechanism 136 includes a catch, such as a dog 140, at the end of at least some of the arms 138. Each dog 140 is guided in travel by a pair of pins 197a, 197b riding in respective slots 198a, 198b and is propelled by an actuator, such as a pneumatic cylinder 199, that is operated by a pneumatic valve (not shown). When extractor mechanism 136 is extended to pick area 123, actuator 199 is extended which causes dog 140 to flip upward in order to engage the face of the container facing the operator so that the container stays positioned on arms 138 when the extractor mechanism is retracted. When the container has been positioned on transfer mechanism 134, actuator 199 is retracted to move dogs 140 downward to the position shown in FIG. 32 in order to pass under the next container being supported in the pick area by lift mechanism 127.

Other mechanisms may be used to move dogs 140. For example, a strike plate in pick area 123 could raise the dogs when extractor mechanism 136 is fully extended and another mechanism at transfer mechanism 134 could lower the dogs when the extractor mechanism 136 is retracted.

Figure 31:
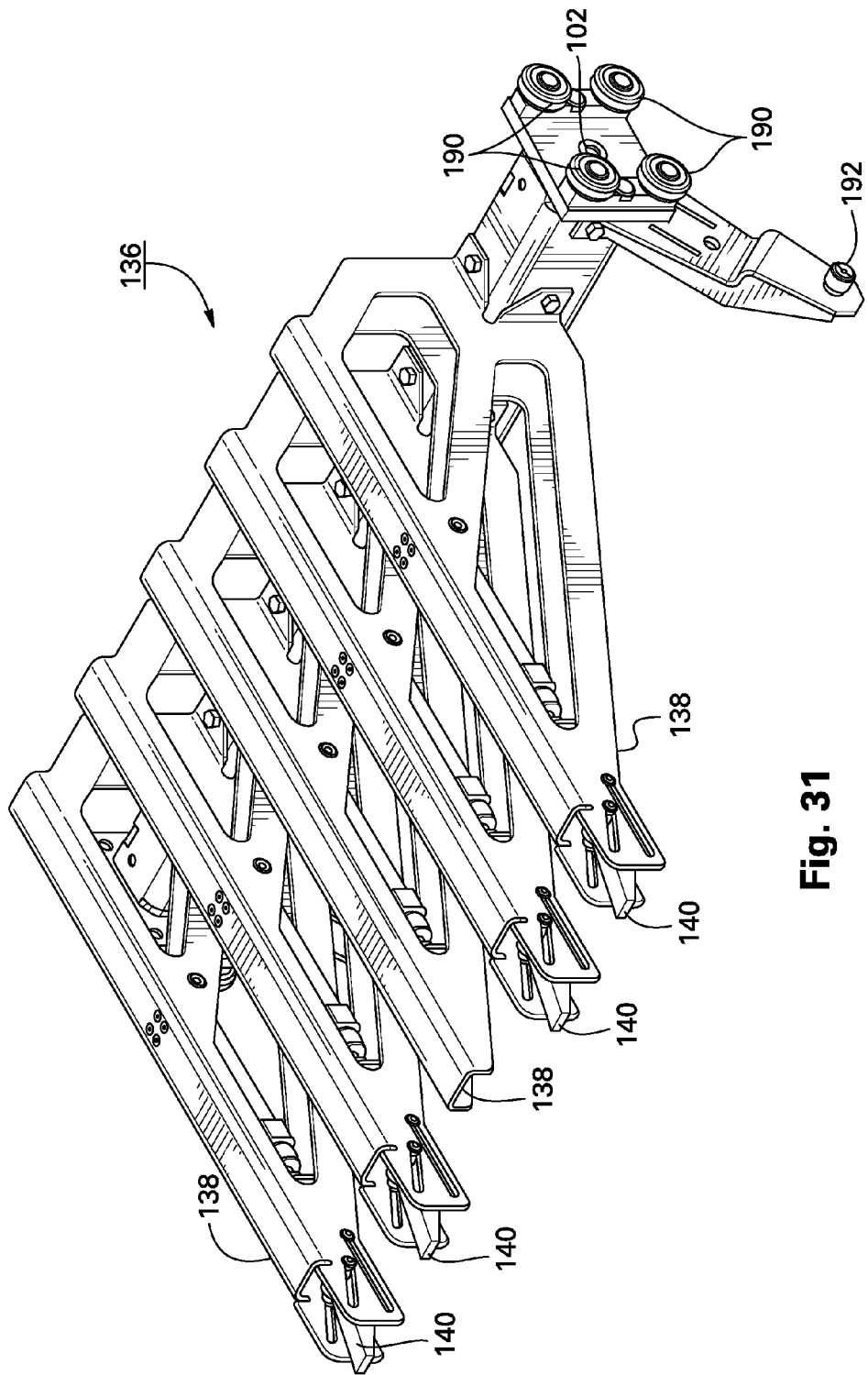
FIG. 31 is a perspective view taken from the front, top and right side of an extractor mechanism.
Figure 31A:
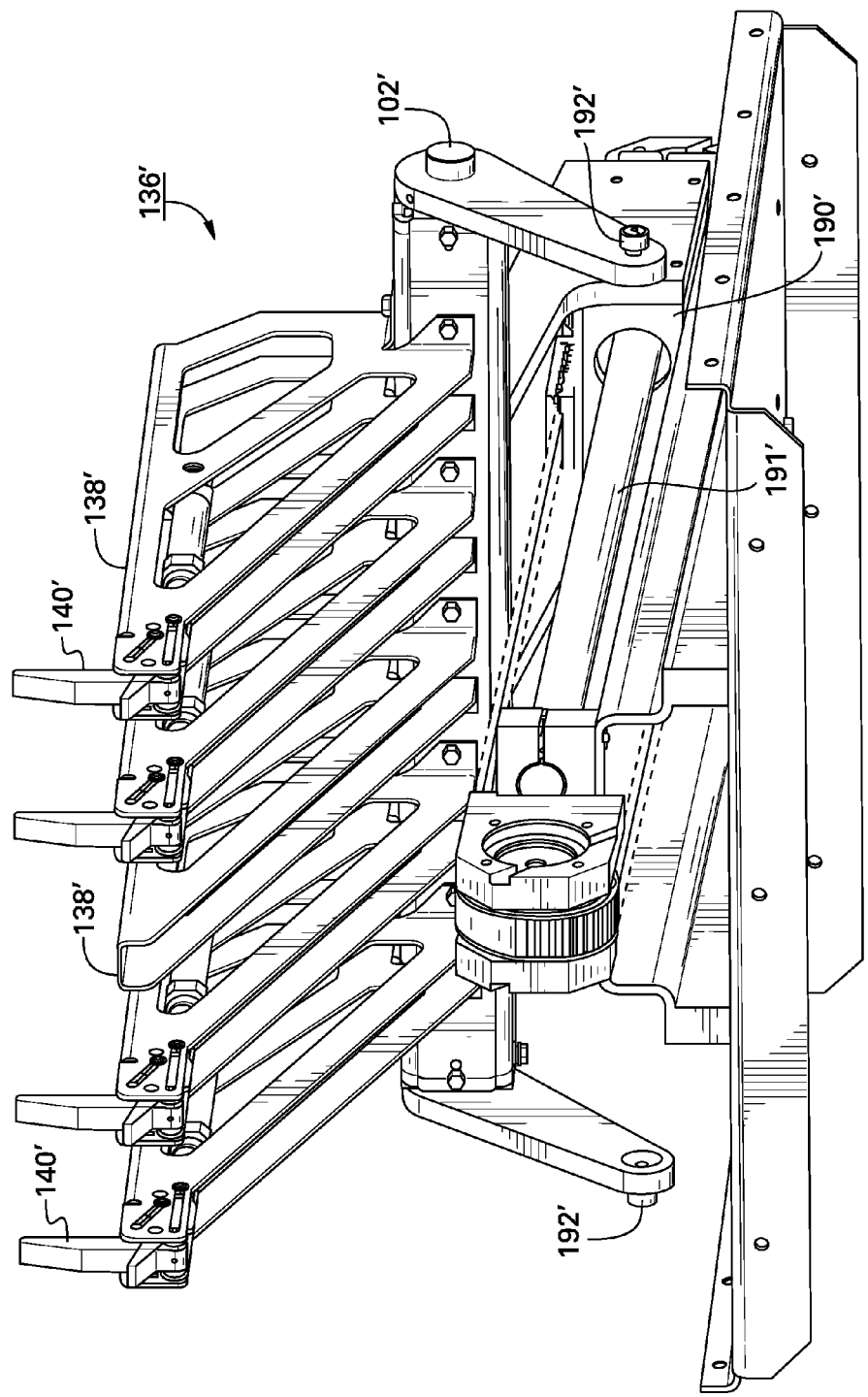
FIG. 31a is the same view as FIG. 31 of an alternative embodiment thereof.
Figure 32:
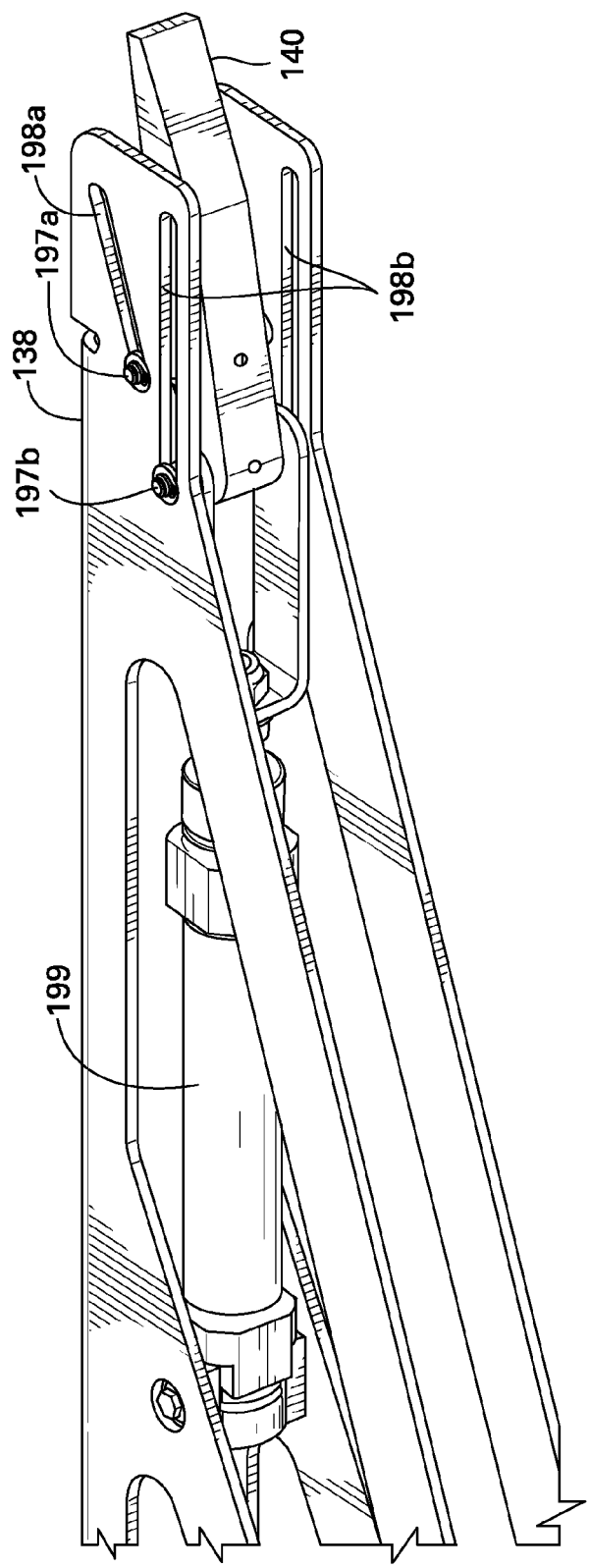
FIG. 32 is a perspective view taken from the front, bottom and left side of the tip of an extractor mechanism arm.

Alternatively, an extractor mechanism 136' is moveably mounted to tubular rails 191' by linear bearing 190' (FIG. 31a). Not only does this provide support for extending and retraction of extractor mechanism 136', it also avoids the need for rail 187. Extractor mechanism 136' is pivotably mounted at 102' by a rod (shown at 102') passing through at least two rotary bushings (not shown). Cam followers 192' extend into track assemblies 194 (not shown) in the same manner as previously described.

Figure 33:
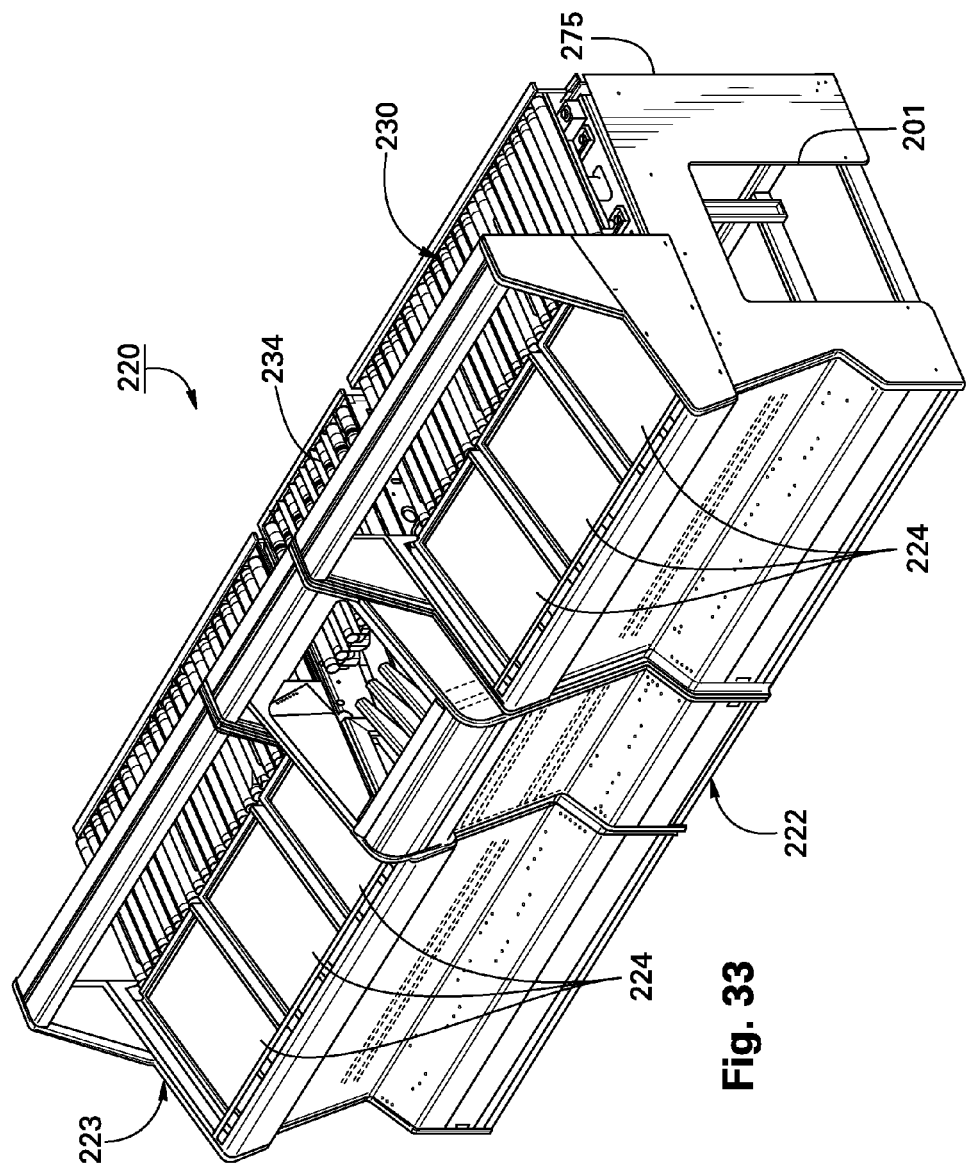
FIG. 33 is the same view as FIG. 1 of another alternative embodiment of a one-to-many goods-to-person picking station.
Figure 34:
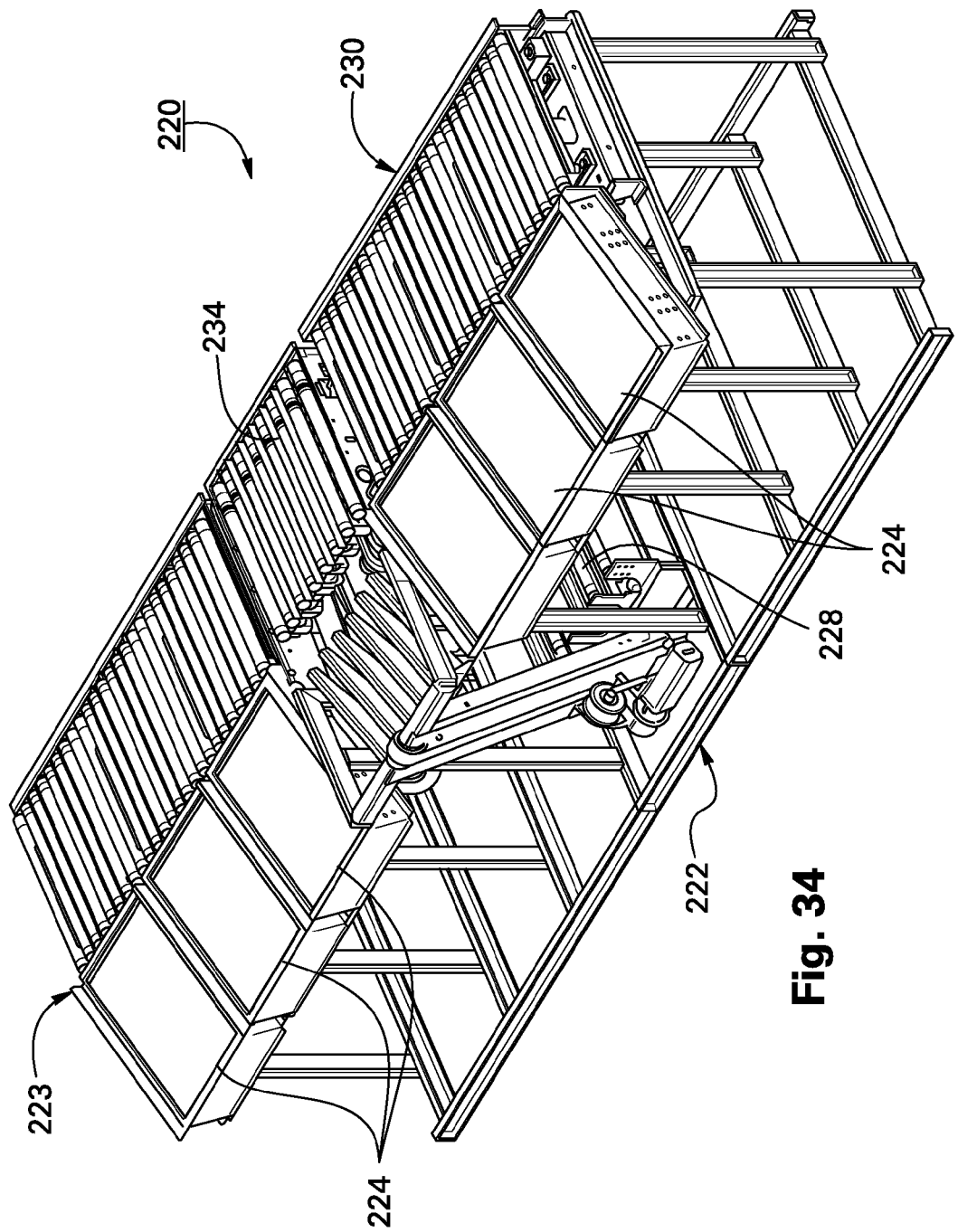
FIG. 34 is the same view as FIG. 18 of the picking station in FIG. 33.
Figure 35:
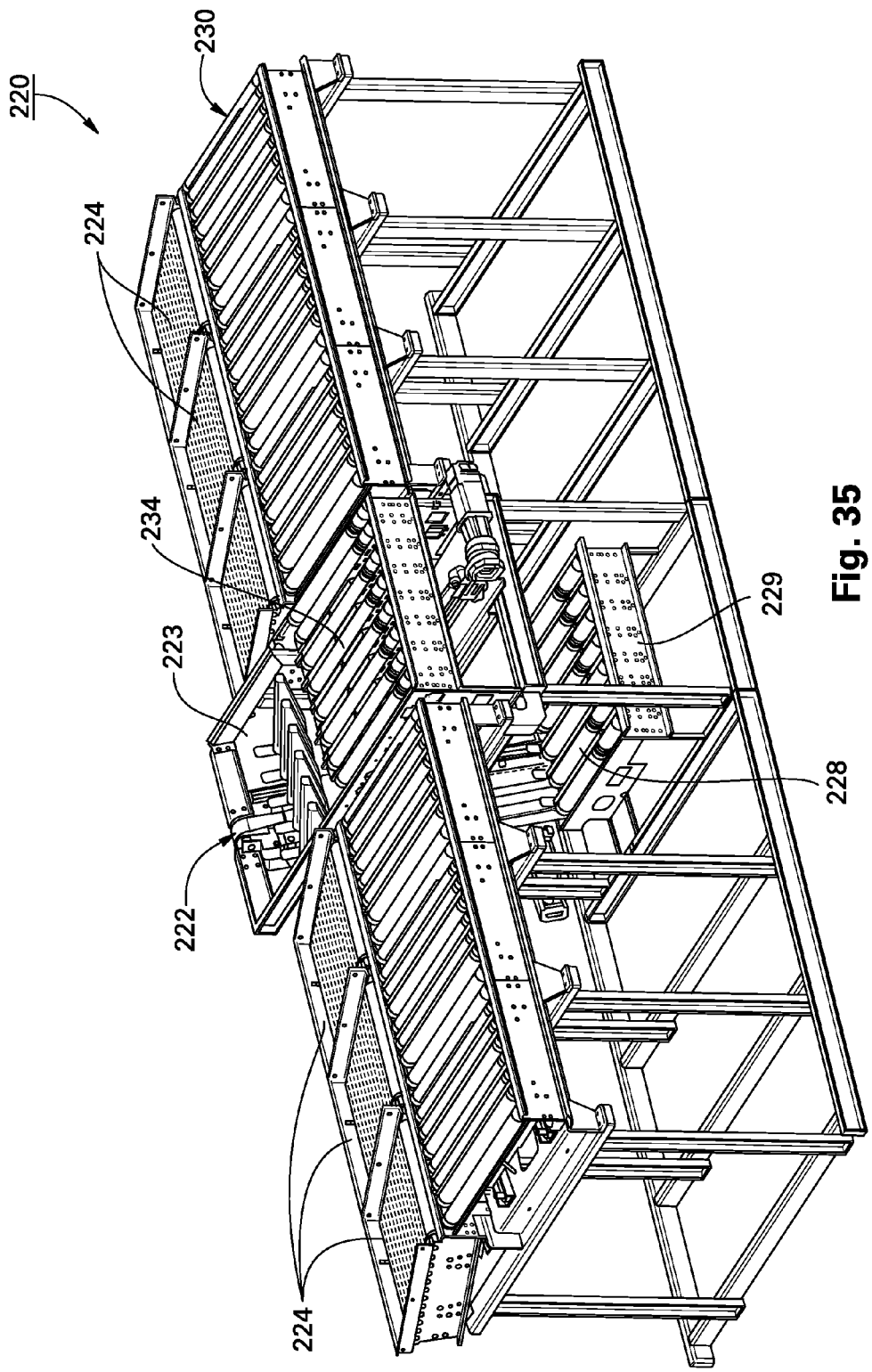
FIG. 35 is the same view as FIG. 19 of the picking station in FIG. 33.
Figure 36:
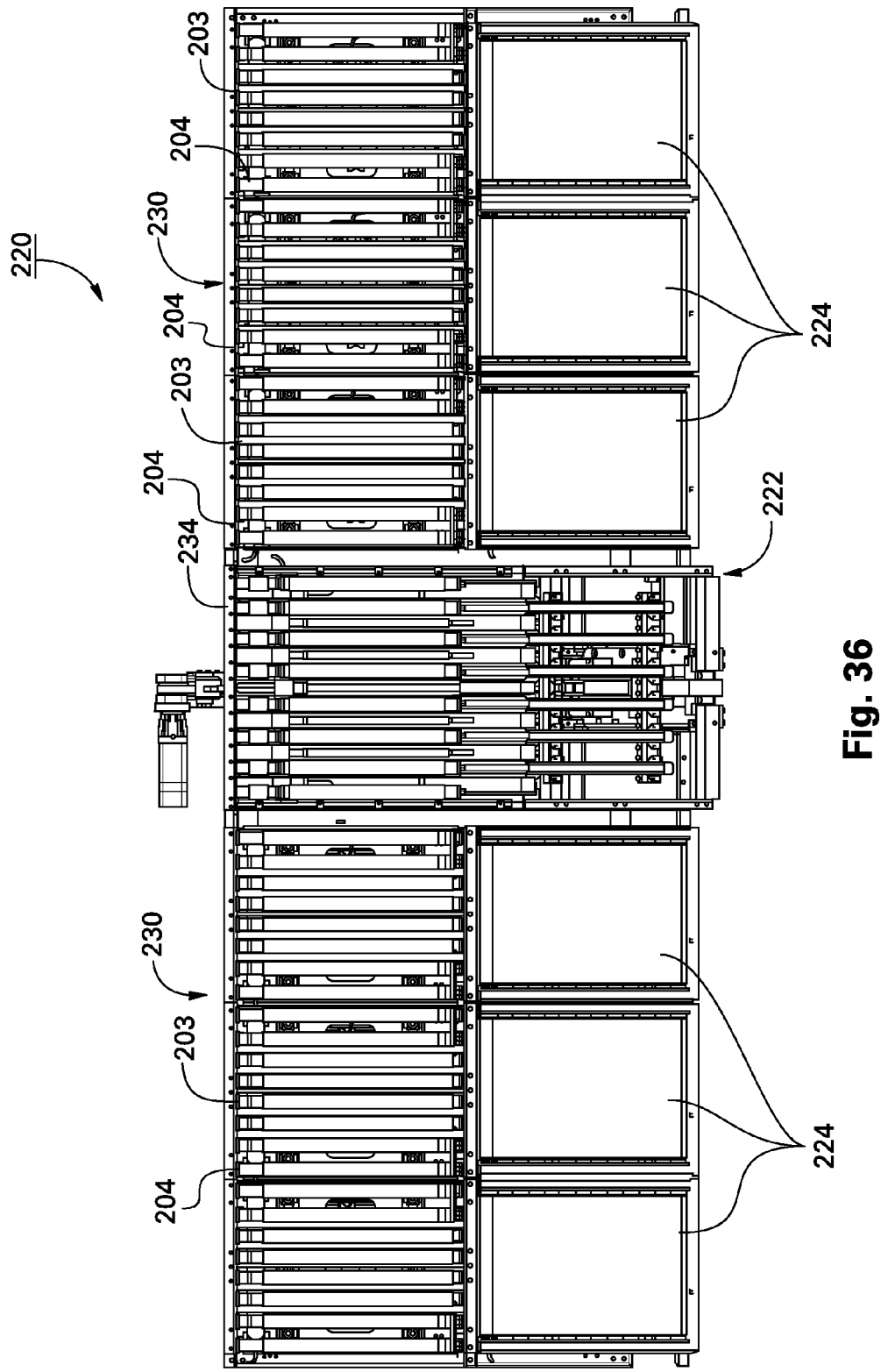
FIG. 36 is the same view as FIG. 20 of the picking station in FIG. 33.
Figure 40:
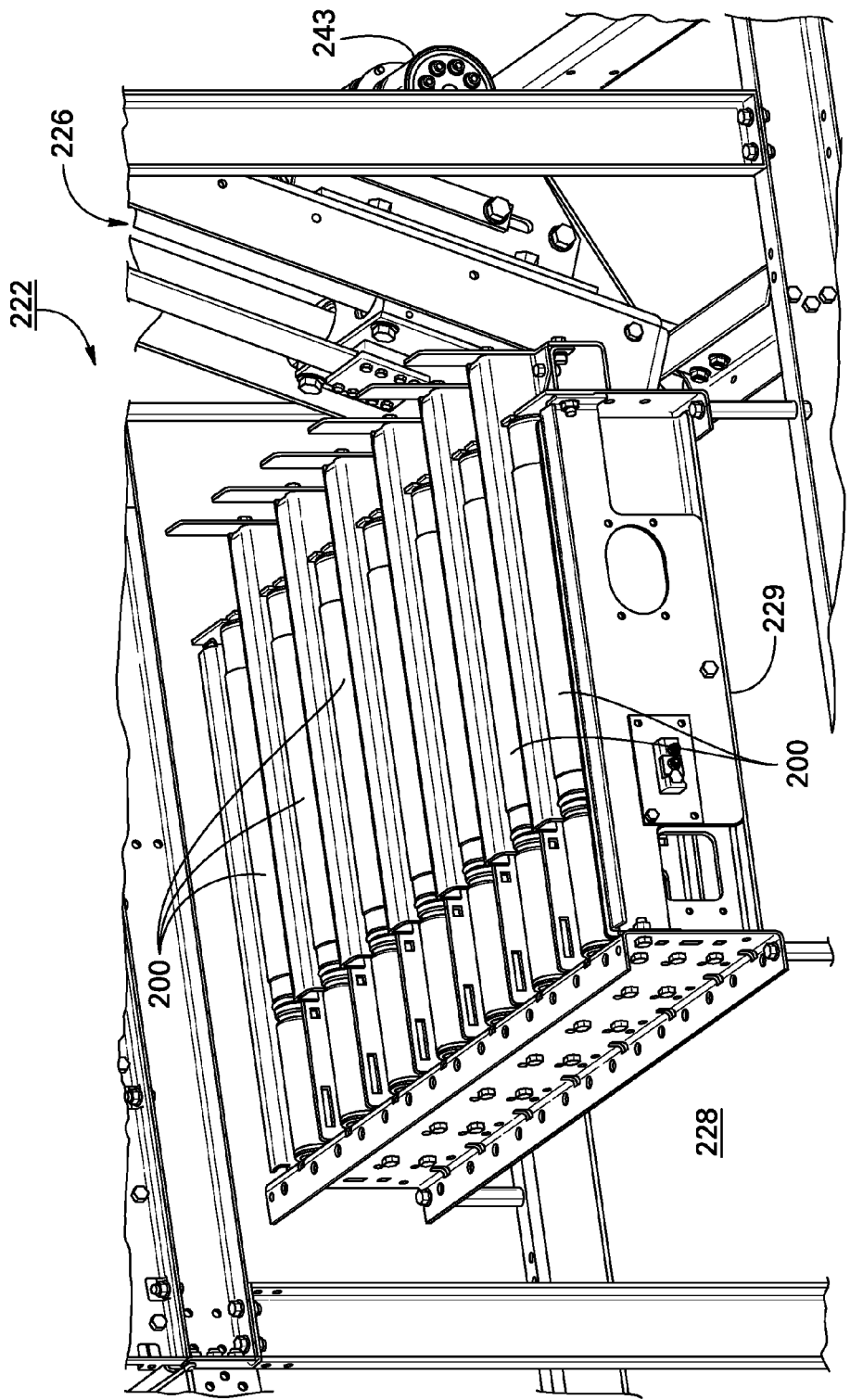
FIG. 40 is the same view as FIG. 22 of the picking station in FIG. 33.

In another embodiment, a goods-to person picking station 220 includes a product container-handling mechanism 222, a plurality of order container-handling mechanisms 224 and a takeaway line 230 (FIGS. 33-44). Picking station 220 is the same as picking station 120 except that product containers may be supplied to the feed area 228 laterally rather than from the rear of the picking station and processed product containers are discharged by a transfer mechanism 234 laterally onto takeaway line 230. To accomplish the former difference, picking station 220 includes a feed bed 229 at feed area 228 that includes a series of driven rollers 200 that are spaced apart to accommodate tines 225 of a lift mechanism 227 (FIG. 40). Rollers 200 may be driven by interconnection of the rollers with each other and with a motorized roller which defines one of the rollers, as is conventional with driven roller beds. Alternatively, rollers 200 may be driven by a separate motor. In the illustrated embodiment, rollers 200 are driven by a motorized roller (not shown) that is mounted transverse to and below rollers 200 using the principle disclosed in commonly assigned U.S. Pat. No. 7,383,935 B2 entitled Motorized Roller Transverse Drive, the disclosure of which is hereby incorporated herein by reference. Also, picking station 220 includes a shroud 275 defining a lateral opening 201 on one or both lateral ends thereof that accepts a conveyor (not shown) to convey product containers to feed bed 229 (FIG. 33).

Figure 37:
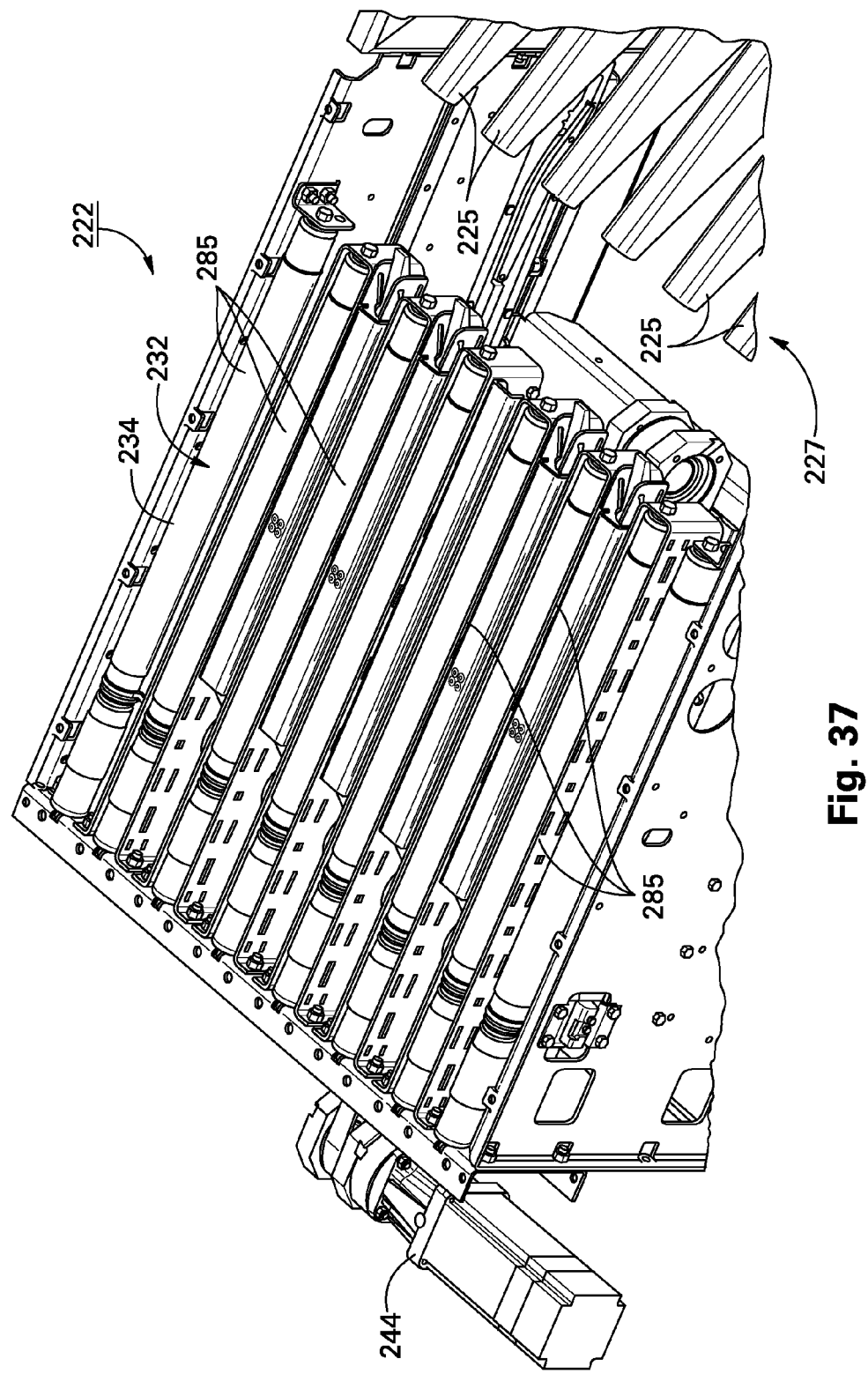
FIG. 37 is the same view as FIG. 24 of the picking station in FIG. 33.
Figure 38:
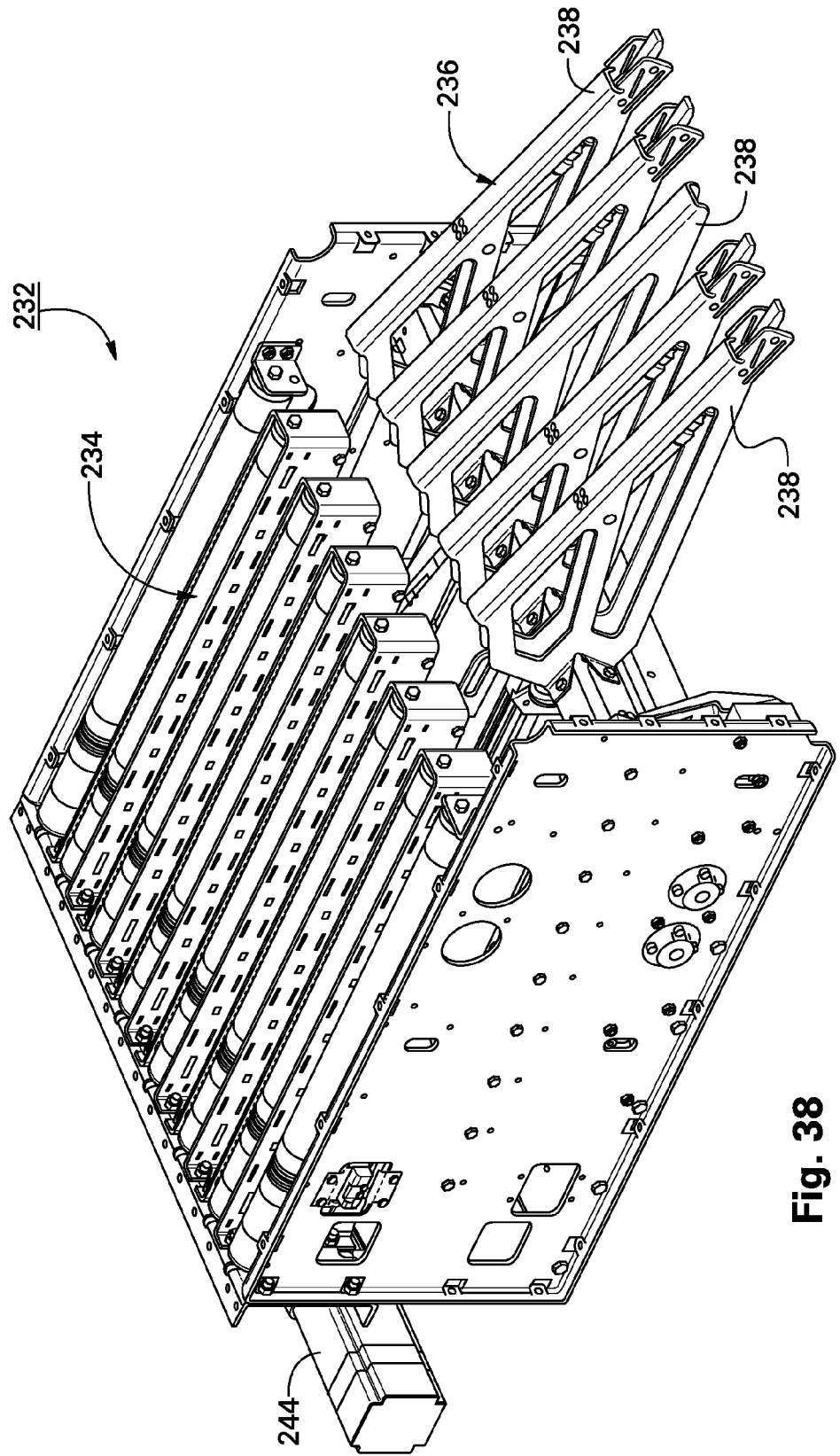
FIG. 38 is the same view as FIG. 25 of the picking station in FIG. 33.
Figure 39:
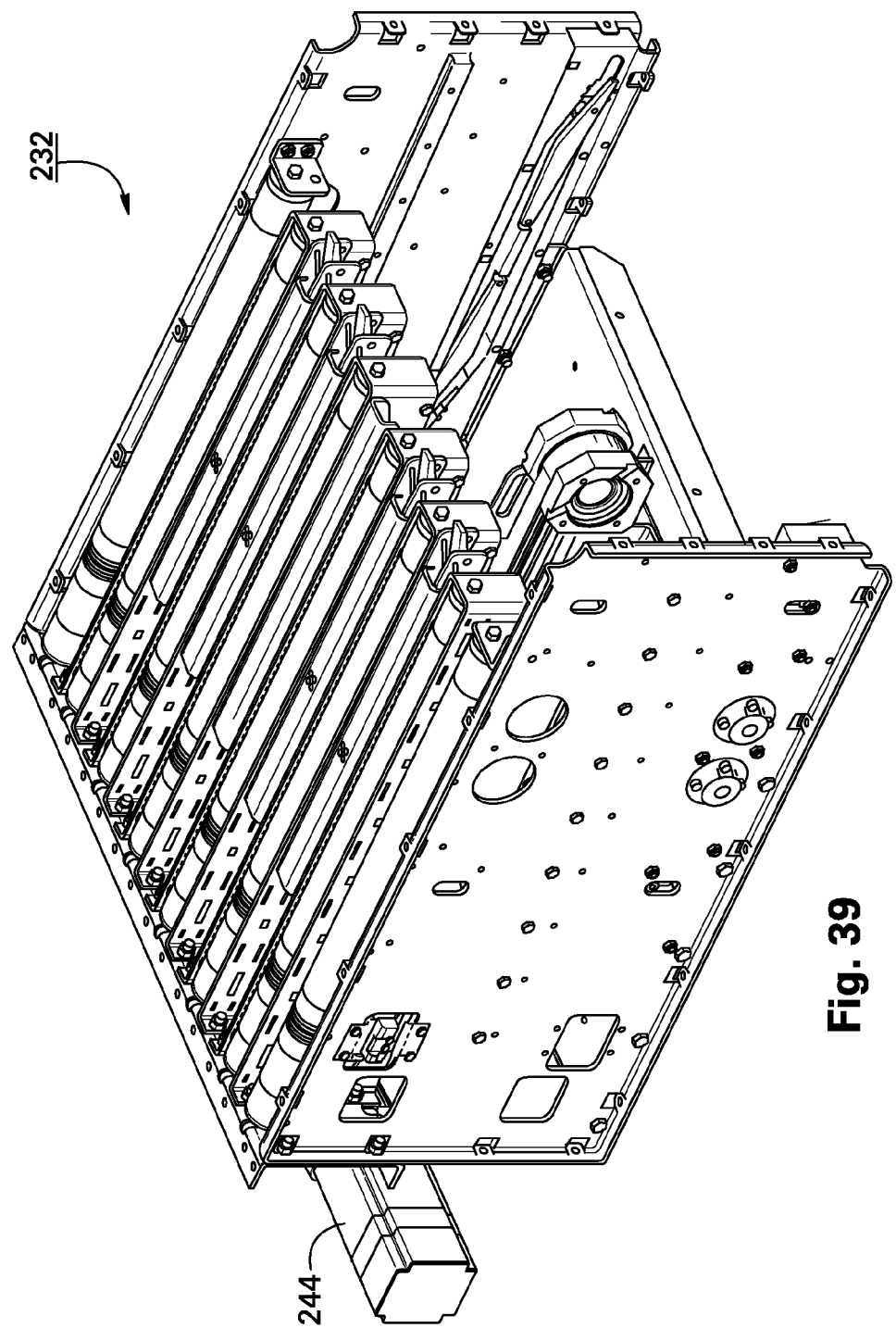
FIG. 39 is the same view as FIG. 26 of the picking station in FIG. 33.

In order to discharge processed product containers to take-away line 230, picking station 220 includes an extractor assembly 232 that is the same as extractor assembly 132 except that it includes a transfer mechanism 234 including a plurality of driven rollers 285 spaced apart the distance required for arms 238 of extractor mechanism 236 to extend between rollers 285 when extractor mechanism 236 is retracted (FIG. 37). Rollers 285 may be driven in the same fashion as rollers 200. In this manner, after a product container is retrieved by extractor mechanism 236 to transfer mechanism 234, rollers 285 are driven. Because transfer mechanism 234 is in takeaway line 230, propelling of rollers 285 causes the container to be moved down the takeaway line. Also, rollers 285 are driven to allow other containers to travel along line 230 past transfer mechanism 234. The skilled artisan would recognize that product containers could be supplied from behind the picking station as with picking station 120 and discharged laterally as with picking station 220, or vice versa. A takeaway line 230 made up of power rollers includes transfer devices, such as right angle transfers 203 at each order container-handling mechanism 224 to selectively transfer a container to that mechanism. A pop-up stop 204 may be positioned downstream of each right angle transfer to properly orient the container for transfer.

Figure 41:
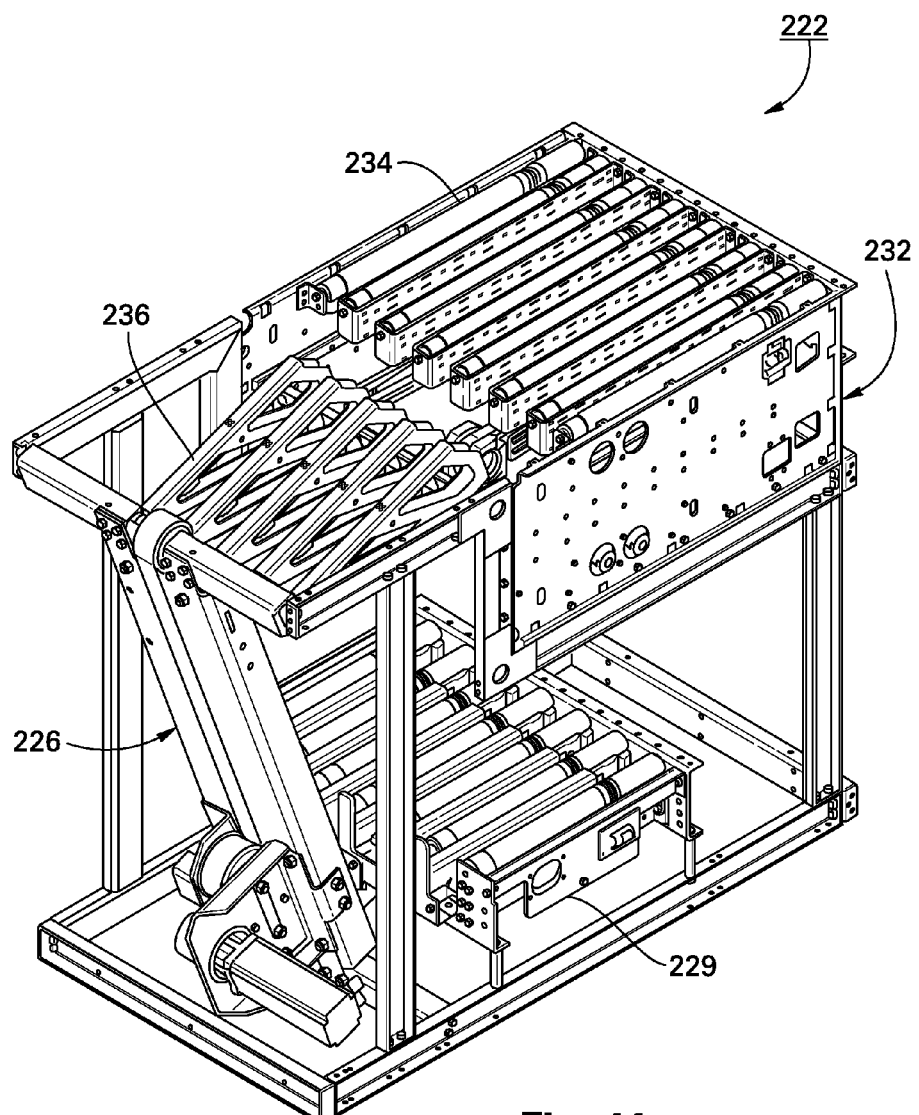
FIG. 41 is a perspective view taken from the front, top and right side of a container-handling mechanism of the picking station in FIG. 33 with the extractor mechanism in an extended position supporting a container (not shown)
Figure 42:
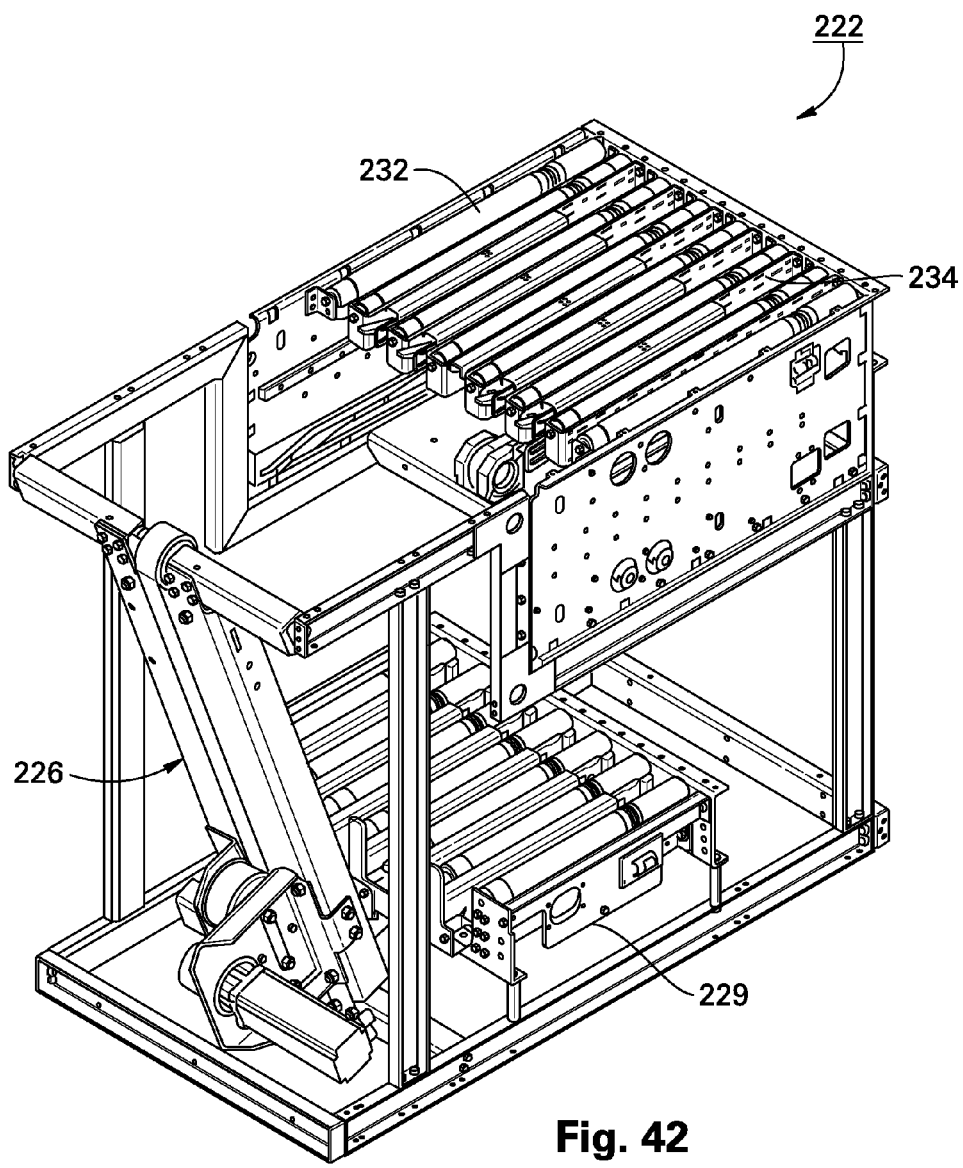
FIG. 42 is the same view as FIG. 41 with the extractor mechanism in a retracted position and the lift in a lowered position to raise a container (not shown)
Figure 43:
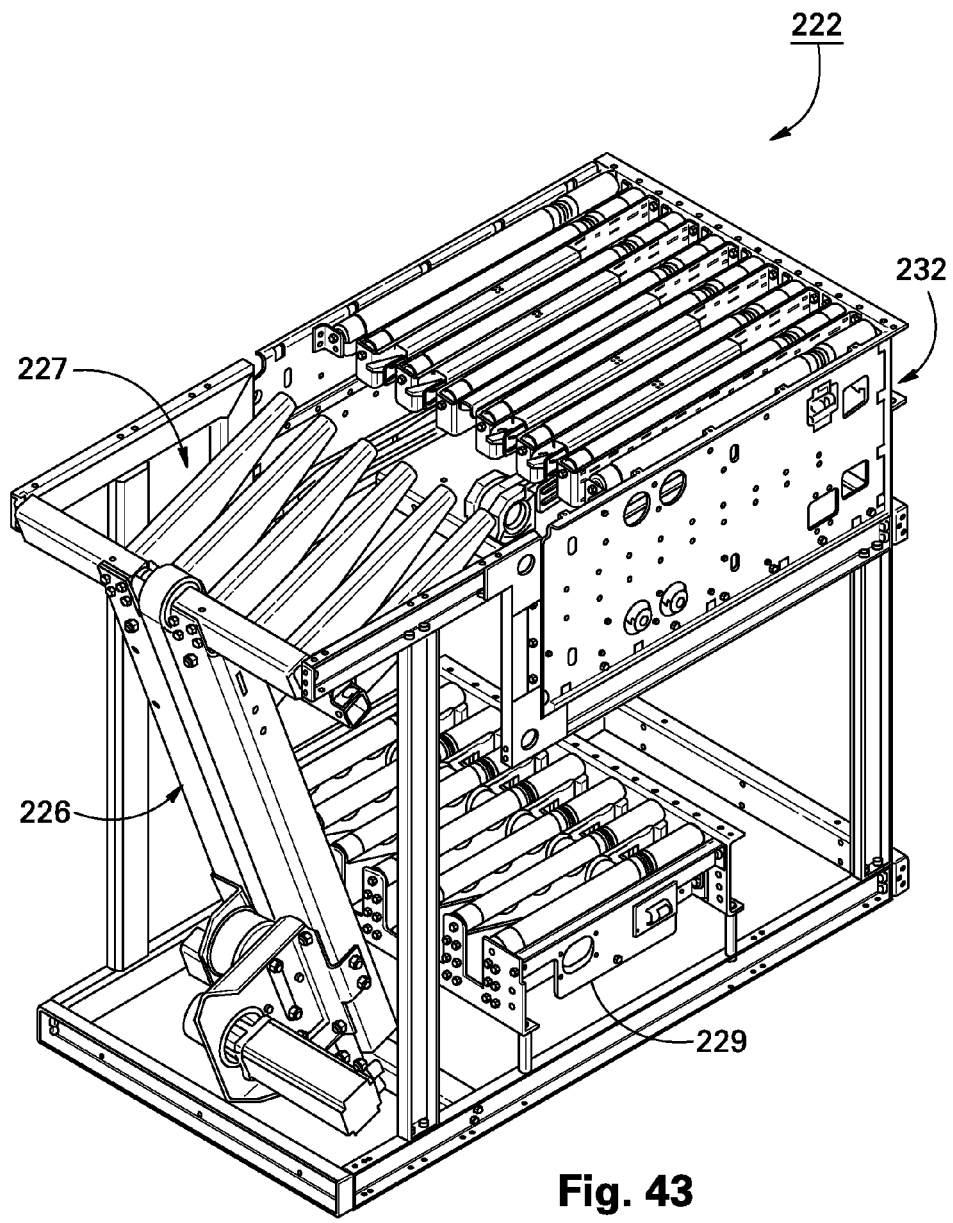
FIG. 43 is the same view as FIG. 41 with the lift in a raised position.
Figure 44:
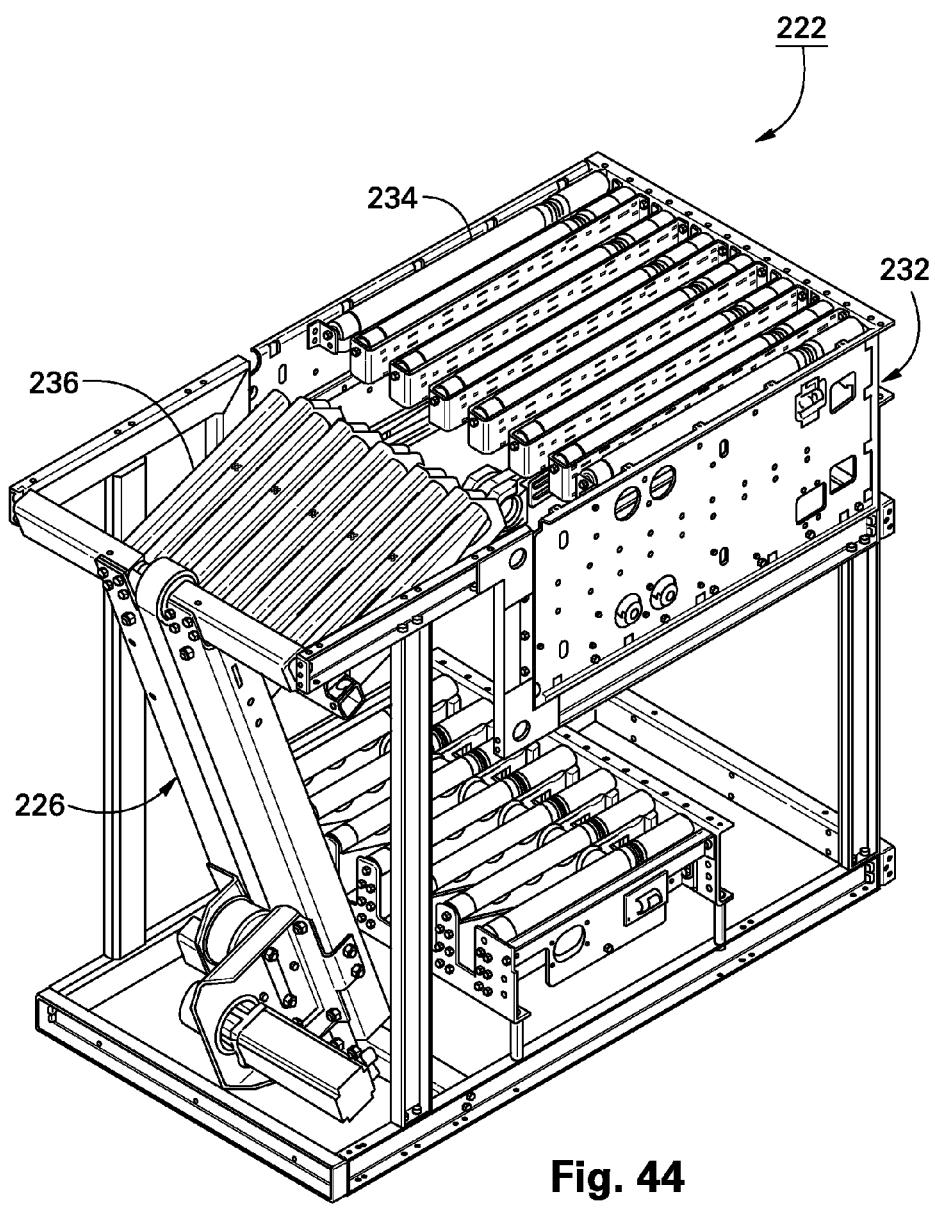
FIG. 44 if the same view as FIG. 41 with the lift in a raised position and the extractor mechanism extended.
Figure 45:
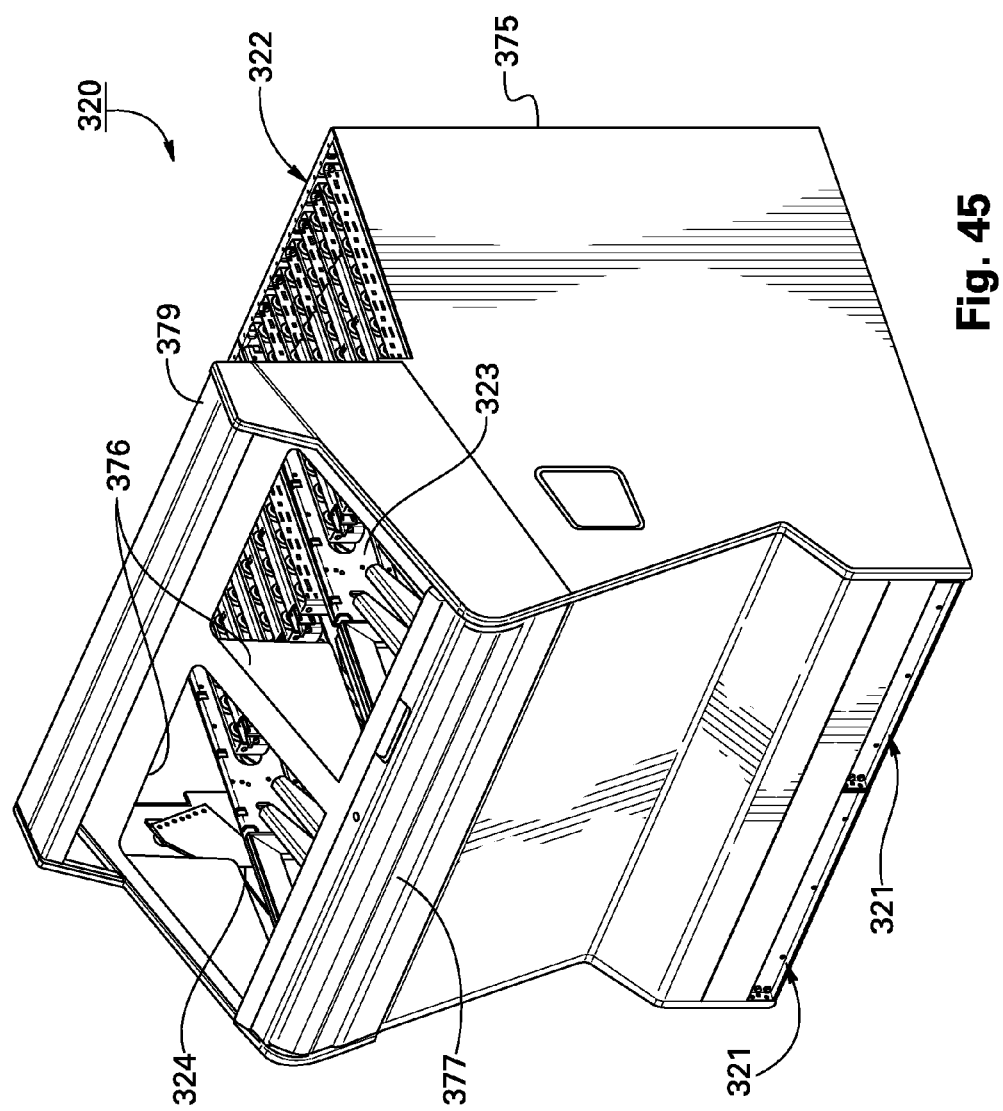
FIG. 45 is the same view as FIG. 1 of a one-to-one goods-to-person picking station.
Figure 46:
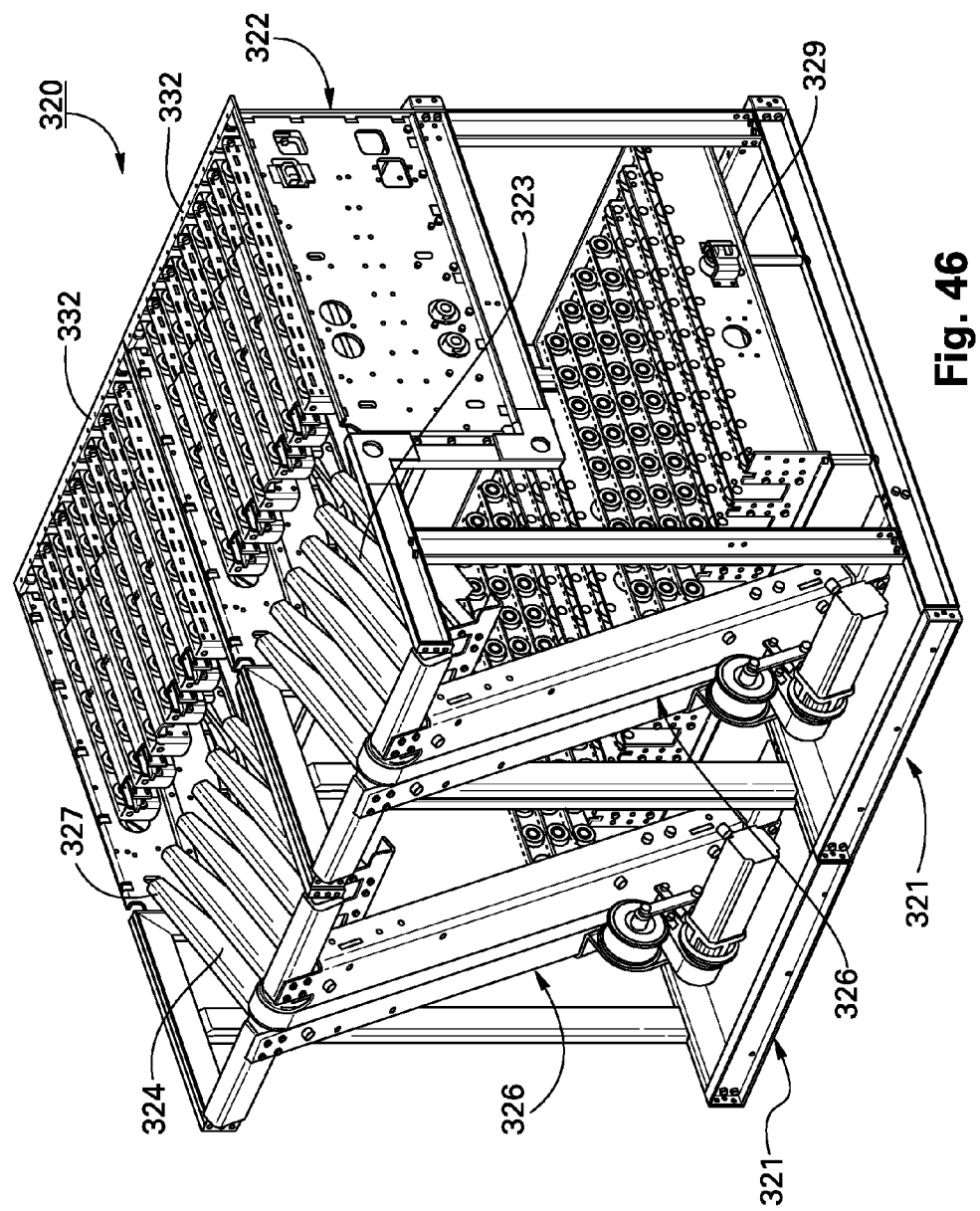
FIG. 46 is the same view as FIG. 45 with the cover removed to reveal internal details thereof.
Figure 47:
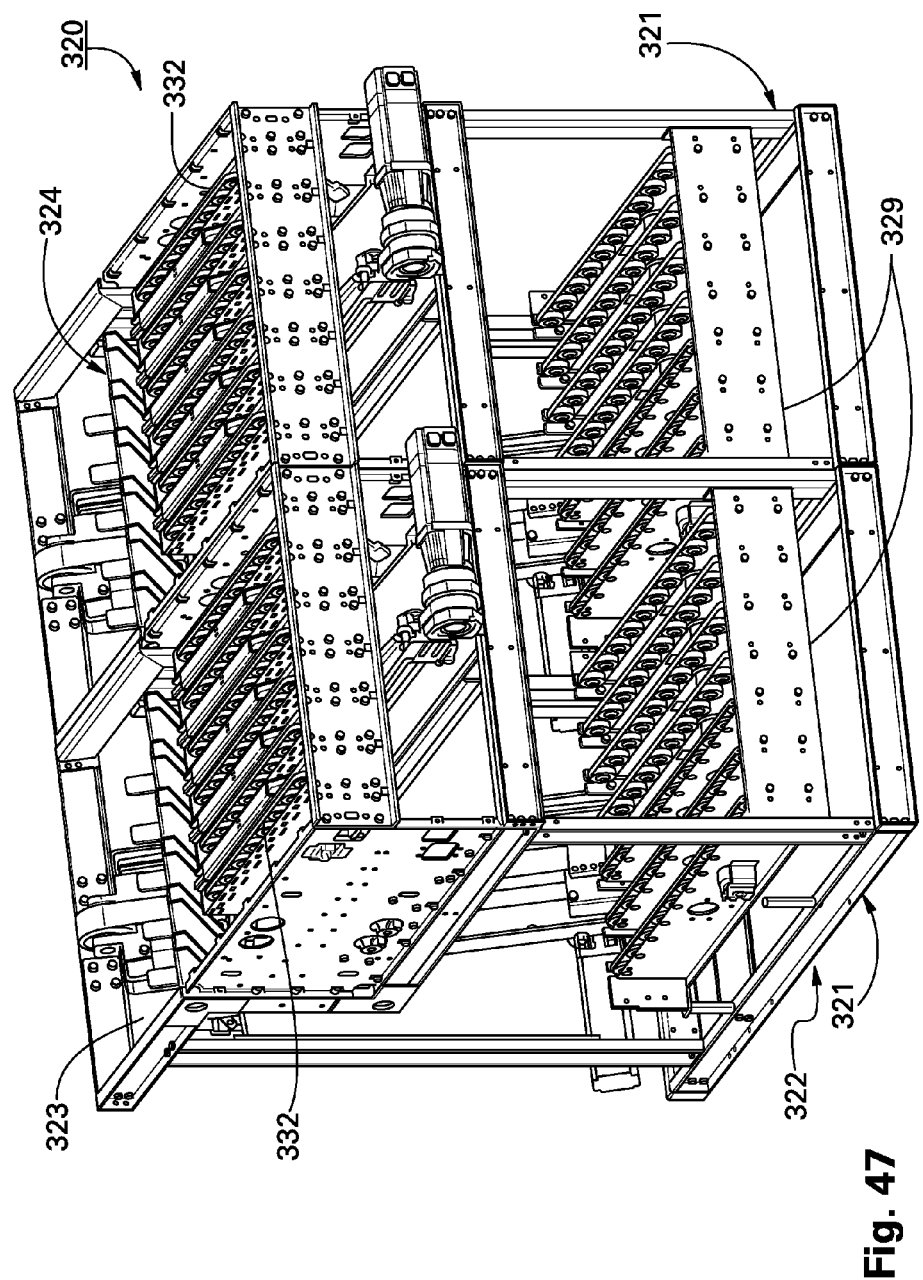
FIG. 47 is a perspective view taken from the rear, top and right side of the goods-to-person picking station in FIG. 45.
Figure 48:
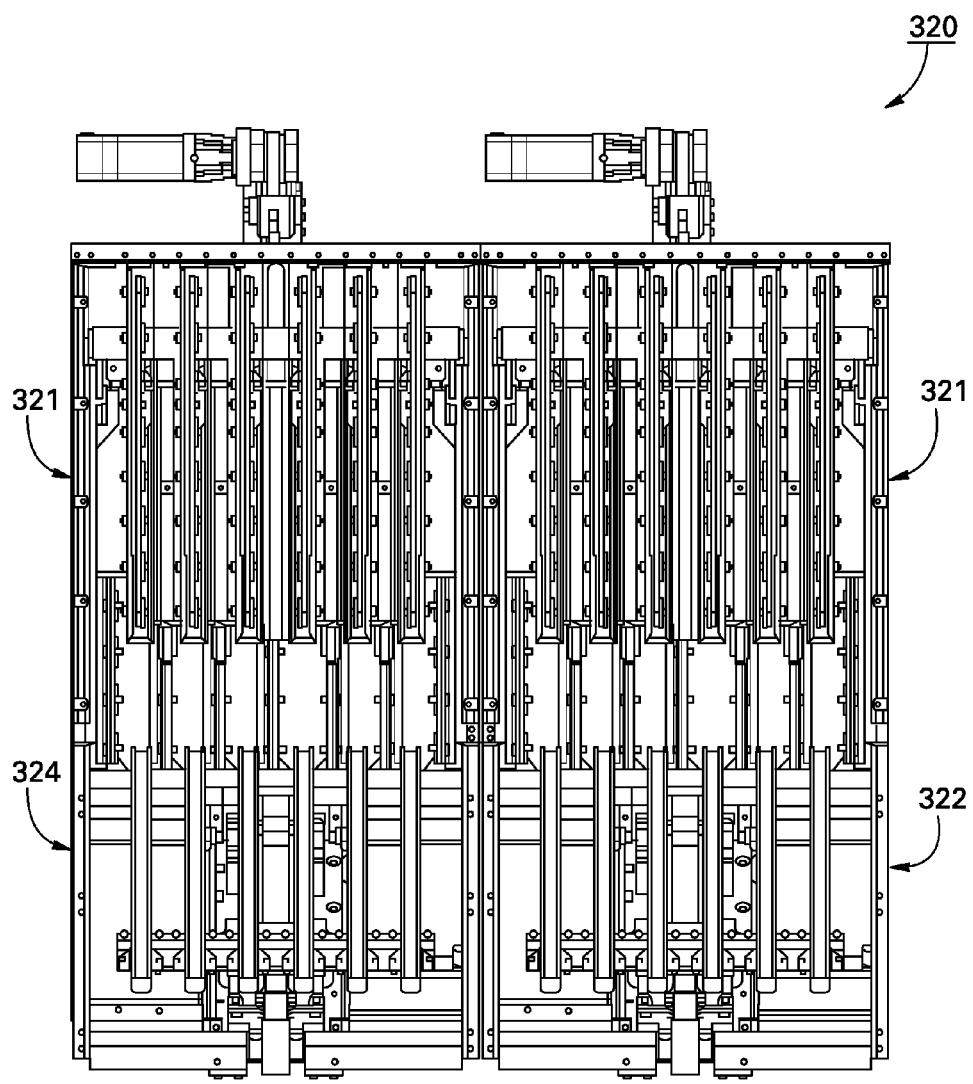
FIG. 48 is a top plan view of the goods-to-person picking station in FIG. 45.

Product container-handling mechanism 222 of picking station 220 operates in the same manner as handling mechanism 122 and is illustrated with respect to FIGS. 41-44. FIG. 41 illustrates the picking position with handling mechanism paused with extractor mechanism 236 extended to support a container (not shown). Also, the lift mechanism of elevator assembly 226 is lowered to be ready to lift a container (not shown) on feed bed 229. When the operator actuates a user interface to indicate that the picking step is complete, extractor mechanism 236 retracts the container to transfer mechanism 234 (FIG. 42) and, concurrently, the lift mechanism of elevator assembly 226 raises the next container (FIG. 43). Then, extractor mechanism 236 extends to support the new container while it is being processed by the operator and the lift mechanism of elevator assembly 226 is lowered to lift the next container (FIG. 44).

A goods-to-person picking station 320 includes a product container-handling mechanism 322 and an order container-handling mechanism 324 (FIGS. 45-48). Because there is one order container-handling mechanism paired with one product container-handling mechanism, picking station 320 is referred to as a one-to-one picking station. Picking station 320 includes two high-speed exchange mechanisms 321, one for product container-handling mechanism 322 and one for order container-handling mechanism 324. This allows both product containers and order containers to be presented to and removed from pick area 323 at a high speed. Each high-speed exchange mechanism 321 includes a container elevator assembly 326 and a container extractor assembly 332, each of which is the same as high-speed exchange 121. Picking station 320 also includes a shroud 375 that is vertically adjustable and pivots upwardly for maintenance in the same manner as shroud 175*a*. Picking station 320 also includes a pair of windows 376, each protected by a light curtain (not shown) and an overhead rail 379 that performs the same functions as rail 279.

Figure 49:
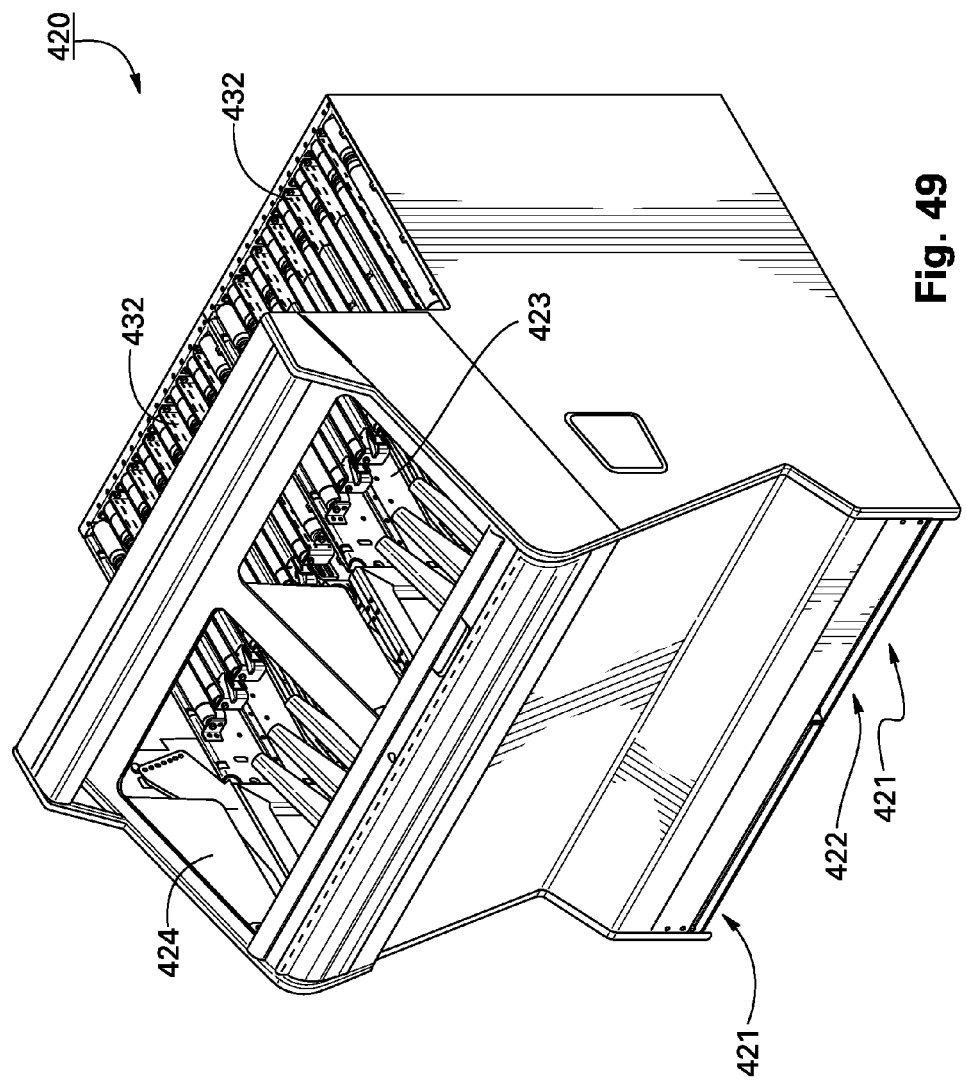
FIG. 49 is the same view as FIG. 1 of an alternative embodiment of a one-to-one goods-to-person picking station.
Figure 50:
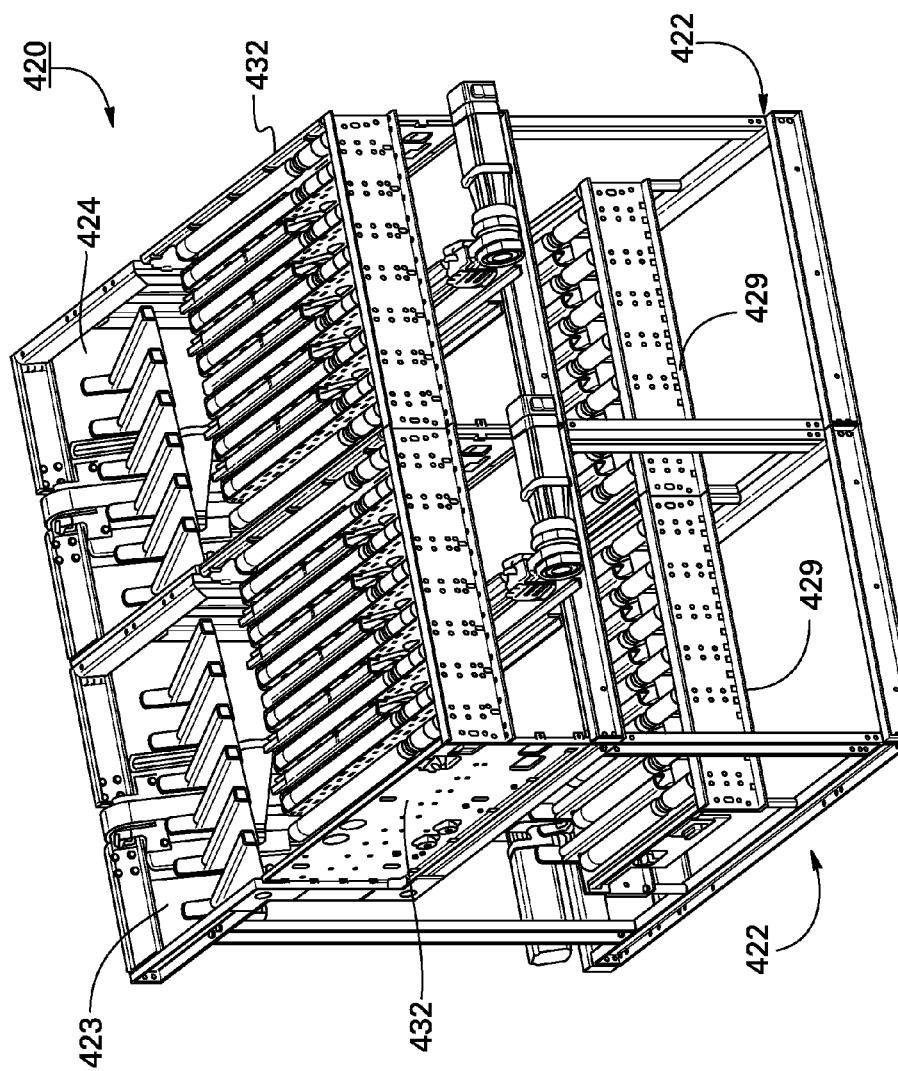
FIG. 50 is the same view as FIG. 47 of the goods-to-person picking station in FIG. 49.
Figure 51:
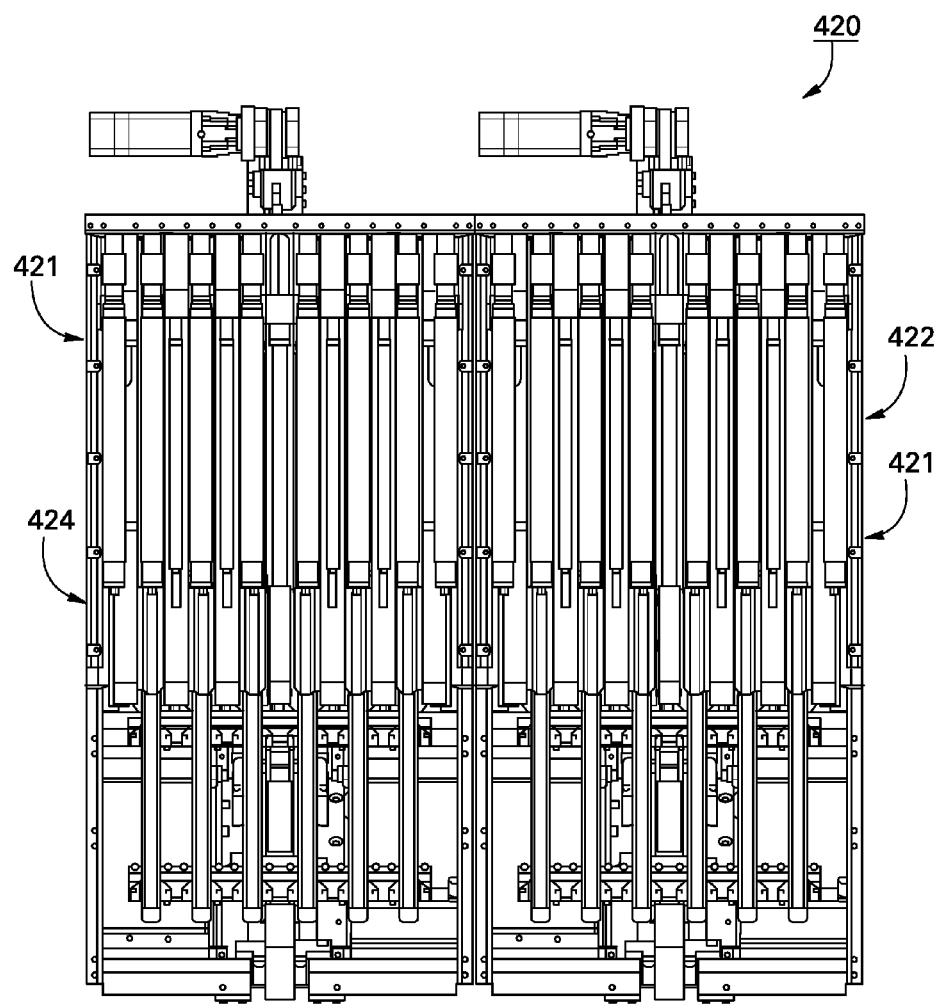
FIG. 51 is the same view as FIG. 48 of the goods-to-person picking station in FIG. 49.

In yet a further embodiment, a goods-to-person picking station 420 is a one-to-one picking station that is the same as picking station 320 except that each of product container-handling mechanism 422 and order container-handling mechanism 424 are made up of a high-speed exchange mechanism 421 that is the same as product container-handling mechanism 222 (FIGS. 49-51). As would be apparent to the skilled artisan, the various components of picking stations 320 and 420 could be interchanged for the application.

Figure 52:
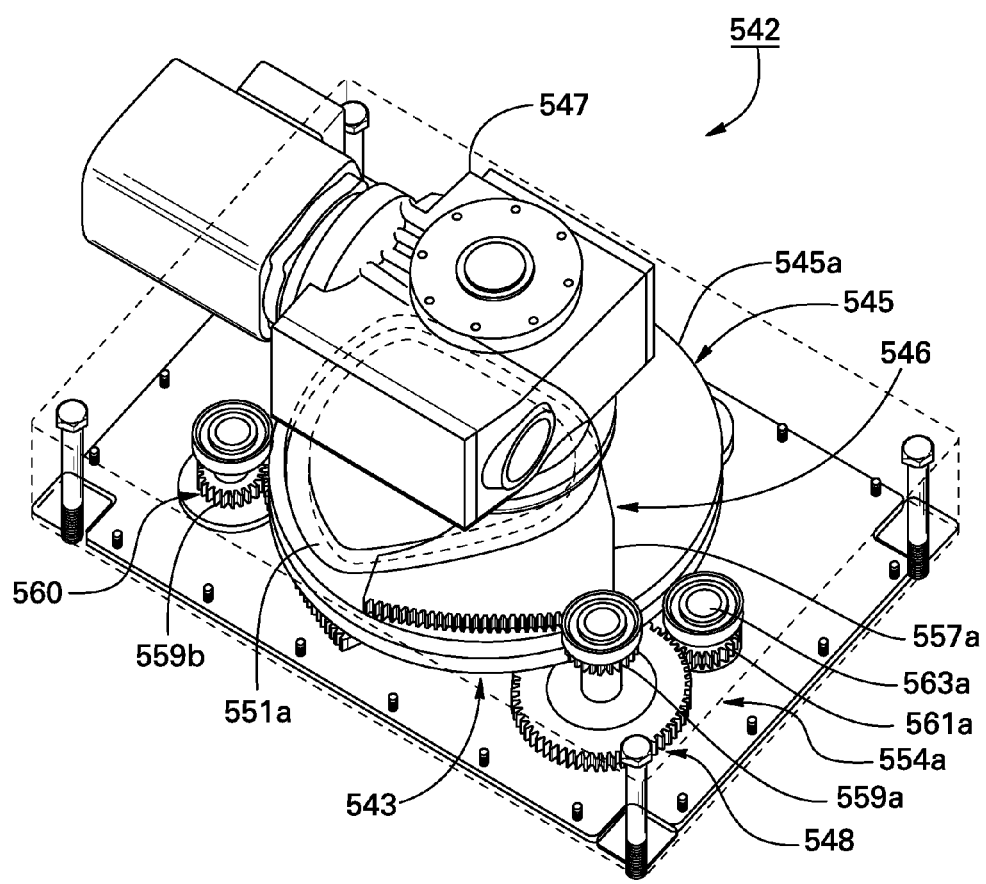
FIG. 52 is a perspective view taken from the front, bottom and right side of an alternative embodiment of a drive assembly.
Figure 53:
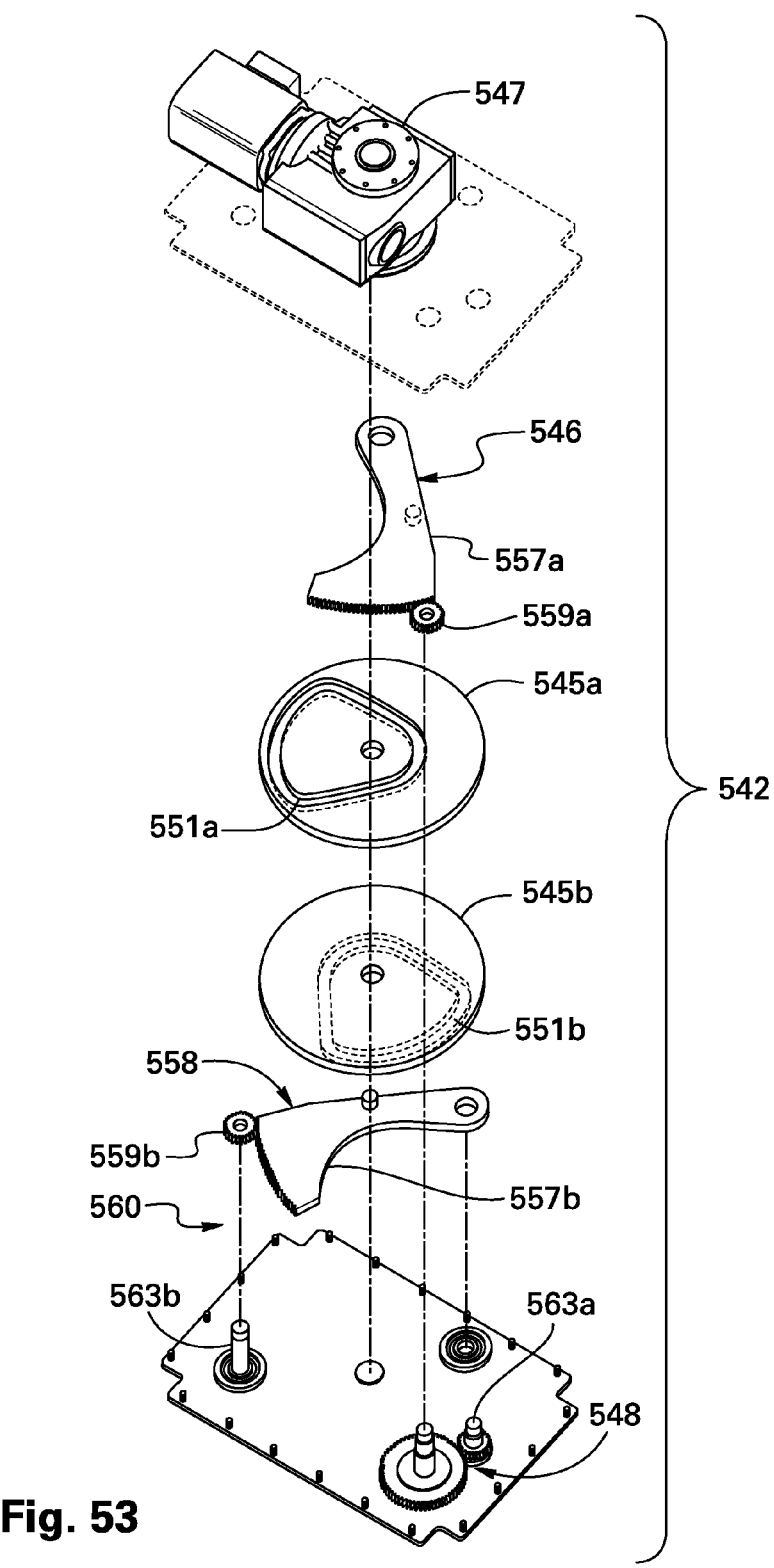
FIG. 53 is an exploded perspective view of the drive assembly in FIG. 52.
Figure 54:
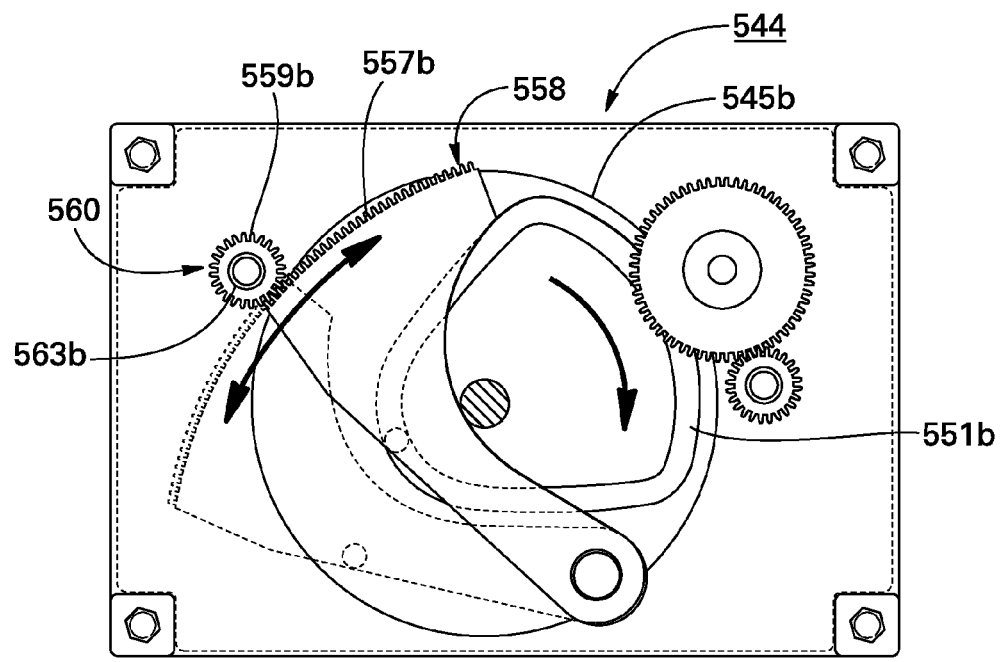
FIG. 54 is a plan view of an extractor drive portion of the drive assembly in FIG. 52.
Figure 55:
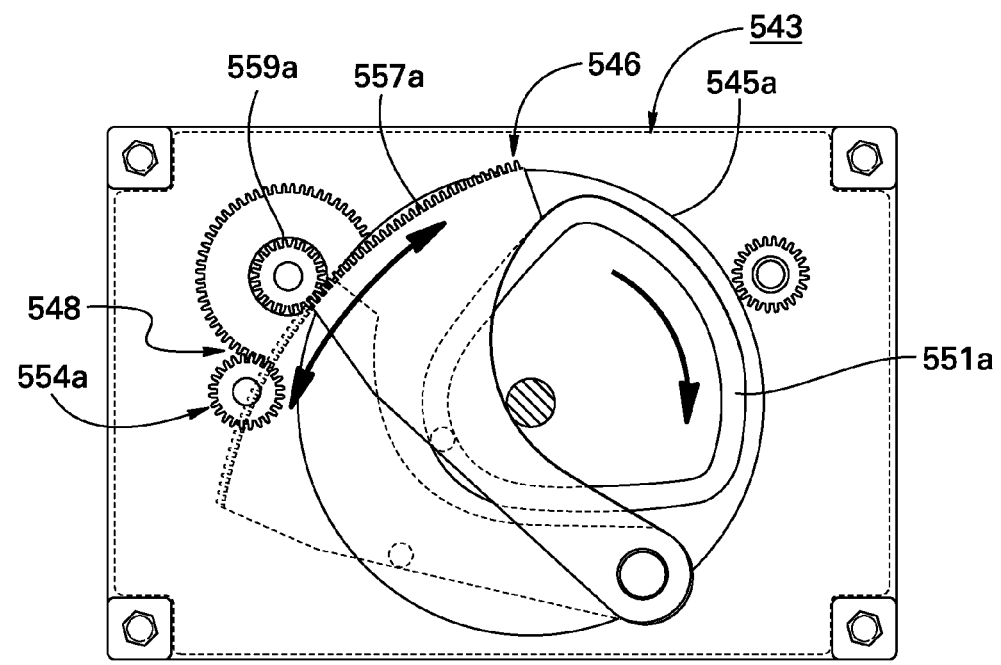
FIG. 55 is a plan view of an elevator drive portion of the drive assembly in FIG. 52.
Figure 56:
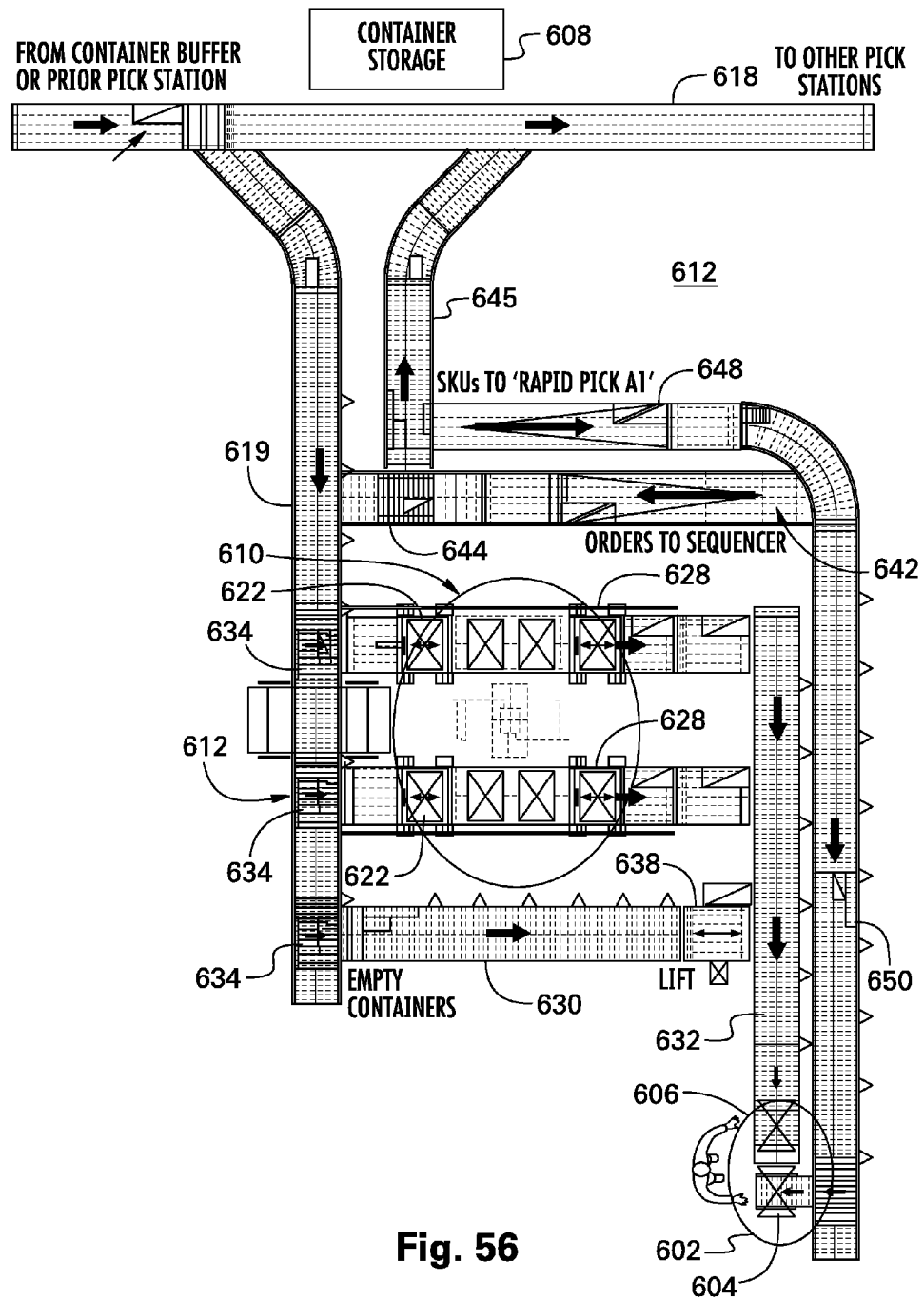
FIG. 56 is a top plan view of an order container-handling line layout including a portion of a product container-handling line.

In an alternative embodiment, a drive assembly 542 includes an elevator drive portion 543 and an extractor drive portion 544 that are operated in unison from a common cam assembly 545 and motor assembly 547 (FIGS. 52 and 53). Elevator drive portion 543 includes a cam 545*a* having a cam surface defined by a groove 551*a* and a cam follower 546. Cam follower 546 includes a segment gear 557*a* that has gear teeth at one end and is pivoted at an opposite end thereof. In this manner, as cam 545*a* rotates, segment gear 557*a* oscillates back and forth in response to the cam follower 546 following groove 551*a*. Elevator drive portion 543 further includes an elevator linkage 548 in the form of a circular gear 559*a* that is rotated by the oscillating motion of segment gear 557*a* and a motion-multiplying mechanism 554*a*. Motion-multiplying mechanism 554*a* is in the form of a speed-increase gear set 561*a* which drives an output shaft 563*a* at a higher speed than circular gear 559*a*. The rotary motion of output shaft 563*a* may be supplied via belts, or the like (not shown), to any of the container elevators previously described in order to operate the container elevators as described.

Extractor drive portion 544 includes a cam 545*b* having a cam surface defined by a groove 551*b* and a cam follower 558 that includes a segment gear 557*b* that has gear teeth at one end and is pivoted at an opposite end thereof. In this manner, as cam 545*b*, which is physically coupled to cam 545*a*, rotes, segment gear 557*b* oscillates back and forth in response to cam follower 558 in groove 551*b*. Extractor drive portion 544 further includes an extractor linkage 560 in the form of a circular gear 559*b* that is rotated by the oscillation motion of segment gear 557*b*. If necessary, a motion-multiplying mechanism may be used in extractor linkage 560. Circular gear 559*b* drives an output shaft 563*b* that may be supplied via belts, or the like (not shown), to any of the extractor assemblies previously described.

Drive assembly 542 operates in the same general manner described with respect to drive assembly 42. The use of segment gears coupled to cam followers allows the motion of the cams and cam followers to be converted to rotary motion which can be coupled to the container elevator assembly and extractor assembly without the use of cables and pulleys thereby improving reliability of the drive assembly. However, as described with relation to drive assembly 42, operation of the container elevator assembly is in complete unison with operation of the extractor assembly.

A picking system and method 600 includes a picking station, such as a one-to-one picking station 602, an order container-handling line 612 and a product container-handling line 614 (FIGS. 56-59). Picking system and method 600 further includes a container storage system 608, such as an automated three-dimensional warehouse of the type disclosed in U.S. Pat. Application Publication No. 2011/0008137 A1, or other known high volume storage systems, such as a unit-load system, an automated storage and retrieval system, or the like. Picking station 602 includes a product container-handling mechanism 604 that is rear feed and rear discharge, of the type previously described and an order container-handling mechanism 606 that is side feed and rear discharge that is a variation of the type previously described.

Other configurations of the picking station are possible. Order container-handling line 612 includes an order main line 618 that receives order containers, for example, from previous picking stations or from a buffer of empty containers and feeds processing order containers, for example, to downstream picking stations or to shipping. Product container-handling line 614 includes a product main line 620 that receives product containers, for example, from container storage 608 and returns processed product containers, for example, to storage 608. However, completed order containers may also be discharged to product main line 620 and buffered in storage 608 prior to dispatch to shipping. In the illustrated embodiment, order main line 618 is at a lower level and product main line 620 is at an upper level above order main line 618, but other arrangements are possible.

Figure 59:
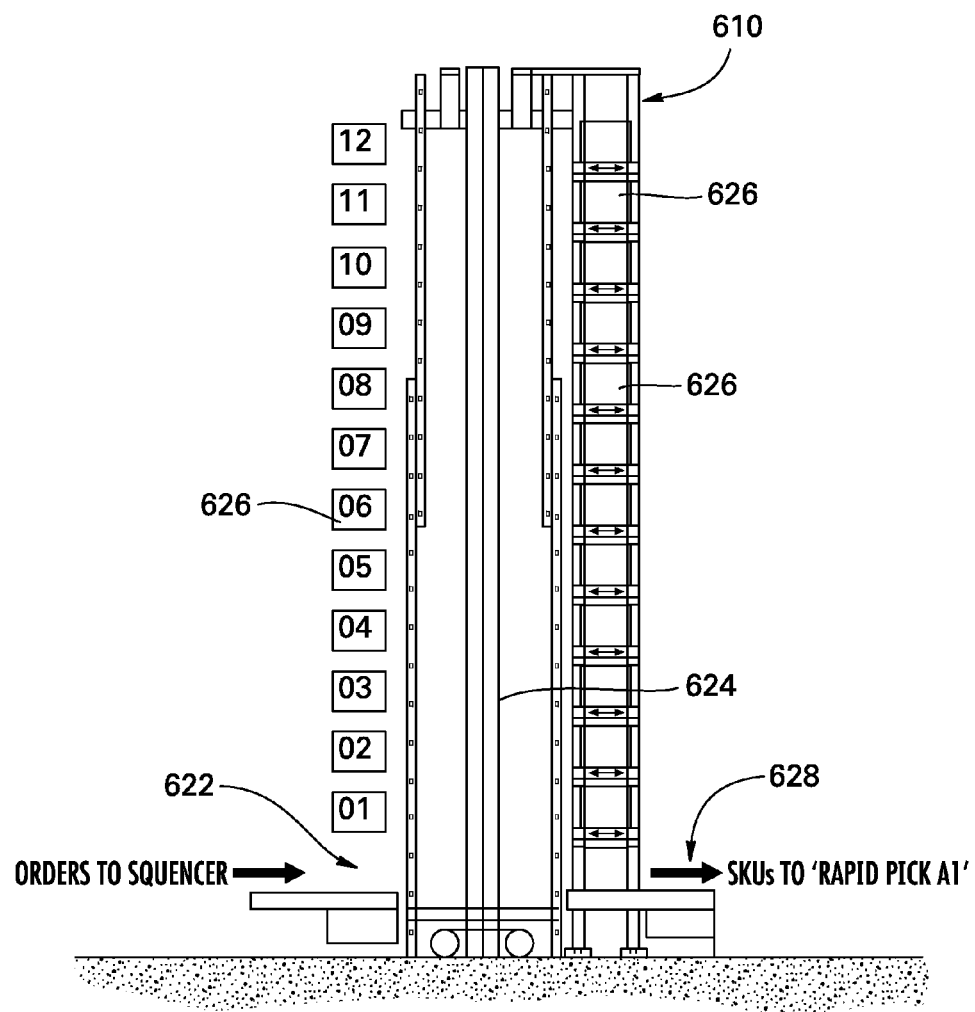
FIG. 59 is a side elevation of a sequencing tower used in the order container sequencing layout of FIG. 56.

Order container-handling line 612 includes an order container sequencer 610 of the type illustrated in FIG. 59. Sequencer 610 may take various forms, but is illustrated as having an input 622 which supplies a lift mechanism 624 which is capable of delivering an incoming container to any available storage location 626. In turn, lift 624 is capable of retrieving a container from any storage location 626 and delivering that container to an output 628. In this manner, sequencer 610 can sequence containers supplied in some fashion, such as a random fashion, to input 622 and deliver the containers in a desired sequence to output 628. Sequencer 610 may be supplied using the principles of the lift described in the above-referenced '137 patent application publication.

Order container-handling line 612 further includes a supply line 619, which feeds order containers from main line 618 via diverters 634 to either an empty container line 630 or to an input 622 of one portion of sequencer 610. Empty container line 630 supplies empty containers to a feed line 632, which, in turn, supplies containers to order container-handling mechanism 606. Empty order containers could also be supplied in sequence using sequencer 610. Order containers are arranged in a particular sequence required for the order by sequencer 610 and supplied in sequence via output 628 to feed 632 for order container-handling mechanism 606.

Figure 57:
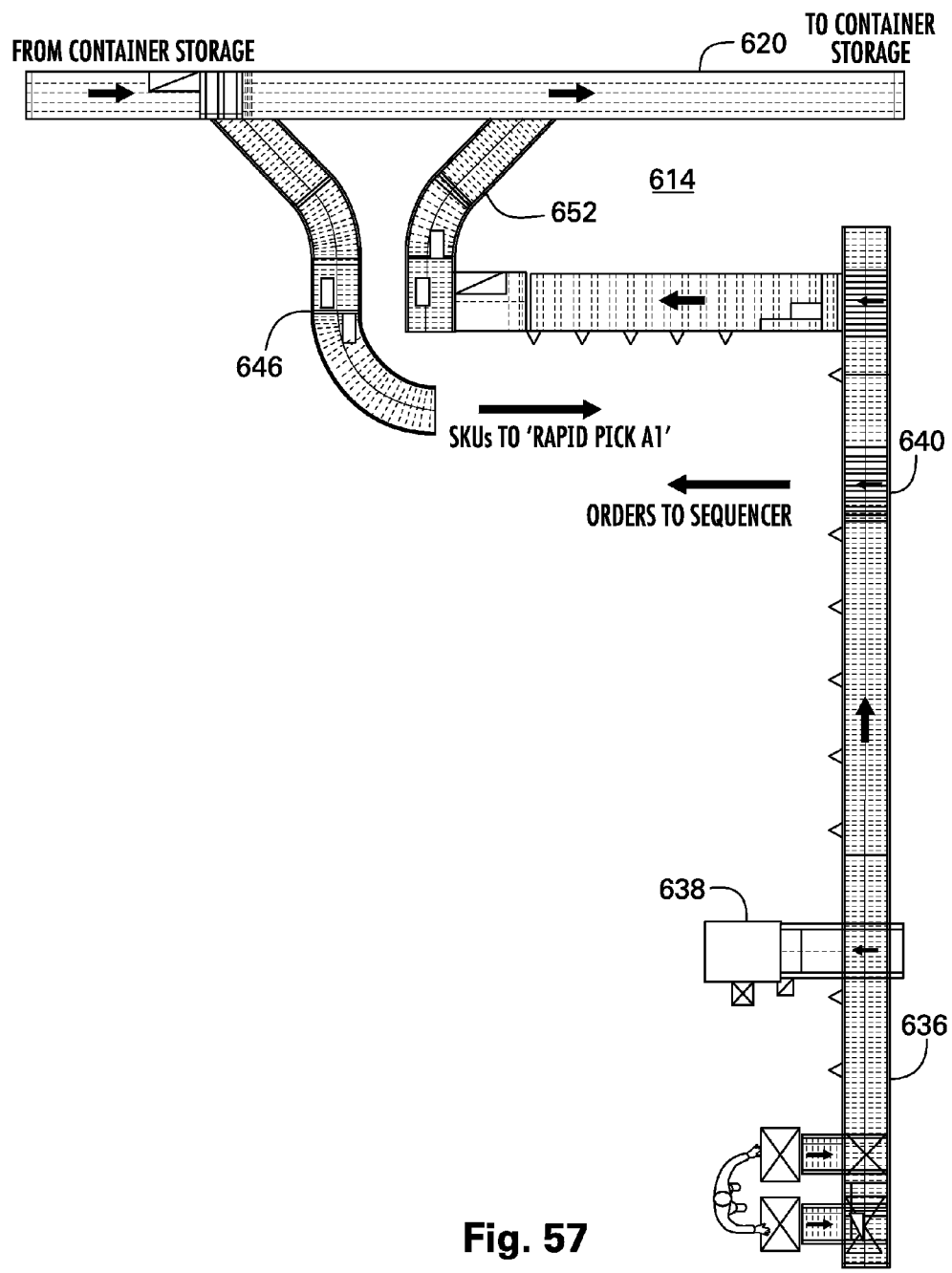
FIG. 57 is a top plan view of the product container-handling line layout including a portion of the order container-handling line.
Figure 58:
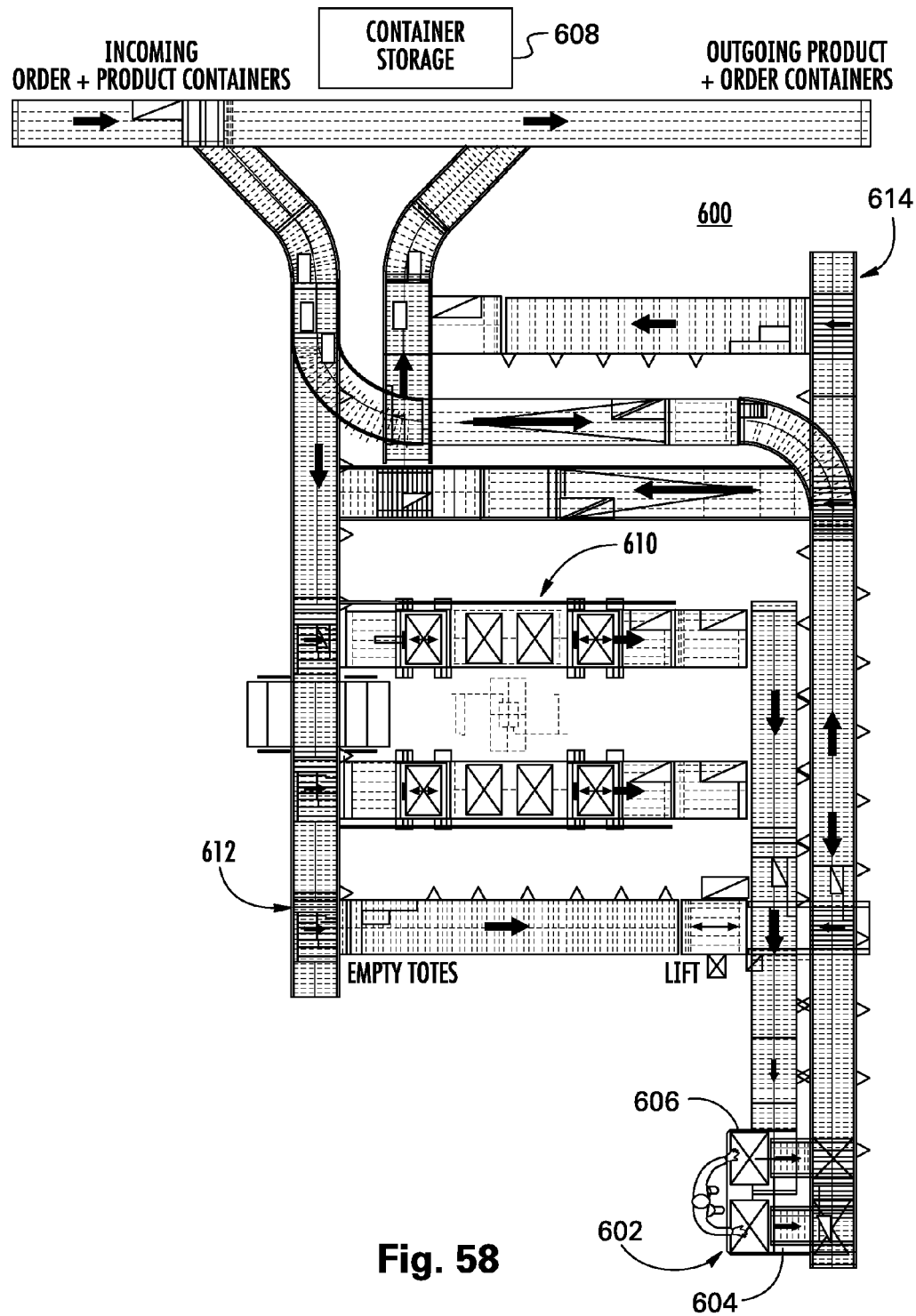
FIG. 58 is a top plan view showing the order container-handling line layout combined with the product container-handling line layout.

After an order container is processed at picking station 602, it is discharged by order container-handling mechanism 606 to a return line 636 that is shared with product container-handling line 614 at the upper level of picking station 602 (FIG. 57). From there, order containers which require quick return to pick station 602 can return to feed 632 via a lift 638. All other partially completed order containers which require additional picks from the same picking station can be returned to sequencer 610 via a transfer 640 and return line 642 which declines back to supply line 619. Completed order containers can be directed via a transfer and discharge line 645 back to main line 618 to be directed to another picking station.

Product containers retrieved from the container storage are diverted from product main line 620 to a supply line 646 (FIG. 57), then down a decline line 648 (FIG. 56) to a product container feed line 650 which supplies incoming product containers to product container-handling mechanism 604 at a lower level thereof. After the product container is processed, it is discharged to return line 636 at the upper level and returned at 652 to product main line 620 (FIG. 57).

Picking system and method 600 utilizes sequencer 610 to supply order containers to picking station 602 in a sequence required to process the orders. This allows container storage system 608 to supply order containers in any order, such as a random order. This relieves constraint on operation of container storage system 608 which greatly increases the throughput of container storage system 608 and, hence, picking system and method 600. Picking system and method 600 can be used for both batch picking and order picking techniques.

Various embodiments of a goods-to person picking station and method of picking goods from a product container and placing the goods in at least one order containers have been disclosed herein. It should be understood that the components of the embodiments can be combined with each other in order to form other picking stations and methods, even if the particular combinations are not explicitly disclosed herein. All such combinations are intended to be covered by the present claims. Other changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A goods-to-person picking station, comprising:
a product container-handling mechanism adapted to supply a product container to a pick area and at least one order container-handling mechanism juxtaposed with said product container-handling mechanism, said at least one order container-handling mechanism adapted to supply an order container to said pick area, whereby an operator can pick goods from a product container at the pick area and place the goods selectively to at least one order container at the pick area; and
said product container-handling mechanism comprising a product container elevator assembly and a product container extractor assembly, said elevator assembly having a lift mechanism that is adapted to elevate a product container from a feed area to the pick area, said extractor assembly adapted to transfer product container from the pick area;
wherein said extractor assembly comprises a transfer mechanism and an extractor mechanism, said extractor mechanism comprises a plurality of support arms that reciprocate between the pick area and the transfer mechanism, wherein said arms are selectively extendable to the pick area to support a product container and selectively retractable to the transfer mechanism extract the product container from the pick area and to deposit the product container to said transfer mechanism.

2. The picking system as claimed in claim 1 wherein said lift mechanism comprises a set of tines that are interleaved with said plurality of arms when said lift mechanism and said extractor mechanism are at the pick area.

3. The picking station as claimed in claim 2 wherein said extractor mechanism comprises at least one catch at an end of one of said arms opposite said transfer mechanism, said at least one catch providing unidirectional engagement with a product container at the pick area.

4. The picking station as claimed in claim 1 wherein said transfer mechanism is adapted to transfer a product container to a takeaway line at a same general elevation as the pick area.

5. The picking station as claimed in claim 1 wherein said extractor mechanism is adapted to approach a product container from below when approaching the pick area and to approach the transfer mechanism from above when moving toward said transfer mechanism.

6. The picking station as claimed in claim 5 wherein said extractor mechanism is guided by at least one track assembly, said at least one track assembly defining a first path when said extractor mechanism moves toward the pick area and a second path when said extractor mechanism moves toward said transfer mechanism.

7. The picking station as claimed in claim 1 wherein said at least one order container-handling mechanism comprising an order container elevator assembly and an order container extractor assembly, said order container elevator assembly having an order container lift mechanism that is adapted to elevate an order container from the feed area to the pick area, said order container extractor assembly adapted to transfer an order container from the pick area, wherein said order container extractor assembly comprises an order container transfer mechanism and an order container extractor mechanism, said order container extractor mechanism comprises a plurality of order container arms that reciprocate between the pick area and the order container transfer mechanism, wherein said order container arms are selectively extendable to the pick area to extract an order container from the pick area, said plurality of order container arms selectively retractable to said order container transfer mechanism to deposit the order container on the order container transfer mechanism.

8. A goods-to-person picking station, comprising:
a product container-handling mechanism adapted to supply a product container to a pick area and at least one order container-handling mechanism juxtaposed with said product container-handling mechanism, said at least one order container-handling mechanism adapted to supply an order container to said pick area, whereby an operator can pick goods from a product container at the pick area and place the goods selectively to at least one order container at the pick area; and
said product container-handling mechanism comprising a product container elevator assembly and a product container extractor assembly, said elevator assembly having a lift mechanism that is adapted to elevate a product container from a feed area to the pick area, said extractor assembly adapted to transfer a product container from the pick area;
wherein said extractor assembly comprises a transfer mechanism and an extractor mechanism, said extractor mechanism adapted to extracting a product container from the pick area to said transfer mechanism, wherein operation of said elevator assembly and said extractor assembly being coordinated in a manner that said elevator mechanism supports a product container in the pick area while said extractor mechanism extends from the transfer mechanism to the pick are, said extractor mechanism supports the product container in the pick area while said elevator assembly lowers to retrieve another product container from the feed area and said elevator mechanism elevates the another product container from the feed area to the pick area while said extractor mechanism retracts from the pick area to the transfer mechanism to extract the product container to said transfer mechanism.

9. The picking station as claimed in claim 8 wherein said elevator assembly and said extractor assembly are operated from a common drive assembly.

10. The picking station as claimed in claim 9 wherein said common drive assembly comprises at least one cam, a motor rotating said at least one control cam and a pair of cam followers coordinated in operation from said at least one cam, wherein one of said cam followers is adapted to operate said elevator assembly and the other of said cam followers is adapted to operate said extractor assembly.

11. The picking station as claimed in claim 10 wherein said at least one cam comprises a pair of coupled cams and wherein said elevator cam is adapted to follow one of said cams and said extractor cam follower is adapted to follow the other of said cams.

12. The picking station as claimed in claim 11 wherein each of said cams defines a cam surface formed as a groove in a rotating disc.

13. The picking station as claimed in claim 11 including an elevator linkage and an extractor linkage, said elevator linkage between said elevator cam follower and said elevator assembly and adapted to transfer motion of said elevator cam follower to said elevator assembly and said extractor linkage between said extractor cam follower and said extractor assembly and adapted to transfer motion of said extractor cam follower to said extractor assembly.

14. The picking station as claimed in claim 13 wherein said elevator linkage comprises an elevator segment gear moving in unison with said elevator cam follower and another gear engaging said elevator segment gear and wherein said extractor linkage comprises an extractor segment gear moving in unison with said extractor cam follower and another gear engaging said extractor segment gear.

15. The picking station as claimed in claim 14 wherein at least one of said elevator linkage and said extractor linkage comprises a motion-multiplying mechanism.

16. The picking station as claimed in claim 15 wherein said motion-multiplying mechanism comprises a speed increase gear set.

17. A goods-to-person container-handling mechanism, comprising:
a container elevator assembly and a container extractor assembly, said elevator assembly adapted to elevate a container from a feed area to a pick area, said extractor assembly adapted to transfer a container from the pick area;
wherein said extractor assembly comprises a transfer mechanism and an extractor mechanism, said extractor mechanism comprises a plurality of arms that reciprocate between the pick area and the transfer mechanism, wherein said arms are selectively extendable to the pick area to support a product container and selectively retractable to extract the container from the pick area and to deposit the container to said transfer mechanism.

18. The container-handling mechanism as claimed in claim 17 wherein said lift mechanism comprises a set of tines that are interleaved with said plurality of arms when said lift mechanism and said extractor mechanism are at the pick area.

19. The container-handling mechanism as claimed in claim 18 wherein said extractor mechanism comprises at least one catch at an end of one of said arms opposite said transfer mechanism, said at least one catch providing unidirectional engagement with a container at the pick area.

20. The container-handling mechanism as claimed in claim 18 wherein said transfer mechanism is adapted to transfer a container to a takeaway line at a same general elevation as the pick area.

21. The container-handling mechanism as claimed in claim 18 wherein said extractor mechanism is adapted to approach a product container from below when approaching the pick area and to approach the transfer mechanism from above when moving toward said transfer mechanism.

22. The container-handling mechanism as claimed in claim 21 wherein said extractor mechanism is guided by at least one track assembly, said at least one track assembly defining a first path when said extractor mechanism moves toward the pick area and a second path when said extractor mechanism moves toward said transfer mechanism.

23. A goods-to-person container-handling mechanism, comprising:
a container elevator assembly and a container extractor assembly, said elevator assembly adapted to elevate a container from a feed area to a pick area, said extractor assembly adapted to transfer a container from the pick area;
wherein said extractor assembly comprises a transfer mechanism and an extractor mechanism, said extractor mechanists adapted to extract a container from the pick area to said transfer mechanism wherein operation of said elevator assembly and said extractor assembly being coordinated in a manner that said elevator mechanism supports a container in the pick area while said extractor mechanism extends from the transfer mechanism, to the pick area, said extractor mechanism supports the container while said elevator assembly lowers to retrieve another container from the feed area and said elevator mechanism elevates the another product container from the feed area to the pick area while said extractor mechanism retracts from the pick area to the transfer mechanism to extract the product container to said transfer mechanism.

24. The container-handling mechanism as claimed in claim 23 wherein said elevator assembly and said extractor assembly are operated from a common drive assembly.

25. The container-handling mechanism as claimed in claim 24 wherein said common drive assembly comprises at least one cam and a pair of cam followers coordinated in operation from said at least one cam, one of said cam followers operating said elevator assembly and the other of said cam followers operating said extractor assembly.

26. The container-handling mechanism as claimed in claim 25 wherein said at least one cam comprises a pair of coupled cams and wherein said elevator cam follower follows one of said cams and said extractor cam follower follows the other of said cams.

27. The container-handling mechanism as claimed in claim 26 wherein each of said cams defines a cam surface formed as an undercut in a rotating disc.

28. The container-handling mechanism as claimed in claim 26 including an elevator linkage and an extractor linkage, said elevator linkage between said elevator cam follower and said elevator assembly for transferring motion of said elevator cam follower to said elevator assembly and said extractor linkage between said extractor cam follower and said extractor assembly for transferring motion of said extractor cam follower to said extractor assembly.

29. The container-handling mechanism as claimed in claim 28 wherein said elevator linkage comprises an elevator segment gear moving in unison with said elevator cam follower and another gear engaging said elevator segment gear and wherein said extractor linkage comprises an extractor segment gear moving in unison with said extractor cam follower and another gear engaging said extractor segment gear.

30. The container-handling mechanism as claimed in claim 29 wherein at least one of said elevator linkage and said extractor linkage comprises a motion-multiplying mechanism.

31. The container-handling mechanism as claimed in claim 30 wherein said motion-multiplying mechanism comprises a speed increase gear set.

32. A method of picking goods from a product container and placing the goods in at least one order container, said method comprising:
supplying a product container to a pick area product container-handing mechanism and supplying at least one order container to said pick area with at least one order container-handling mechanism juxtaposed with said product container-handling mechanism, said product container-handling mechanism comprising a product container elevator assembly and a product container extractor assembly, wherein said extractor assembly comprises a transfer mechanism and an extractor mechanism, said extractor mechanism comprising a plurality of support arms that reciprocate between the pick area and the transfer mechanism; and
elevating a product container from a feed area to a pick area with said elevator and transferring a product container from the pick area with said extractor assembly;
wherein said transferring comprises selectively extending said arms to the pick area to support the product container and selectively retracting said arms to the transfer mechanism and depositing the product container to said transfer mechanism.

33. A goods-to-person picking system, comprising:
a product container-handling line adapted to supply a product container to a product container-handling mechanism wherein said product container-handling mechanism is adapted to supply the product container to a pick area, wherein said product container-handling mechanism comprising a product container elevator assembly and a product container extractor assembly, said elevator assembly having a lift mechanism that is adapted to elevate a product container from a feed area to the pick area, said extractor assembly adapted to transfer a product container from the pick area, and wherein said extractor assembly comprises a transfer mechanism and an extractor mechanism, said extractor mechanism adapted to extracting a product container from the pick area to said transfer mechanism;
an order container-handling line adapted to supply an order container to an order container-handling mechanism wherein said order container-handling mechanism is adapted to supply the order container to the pick area, wherein said order container-handling mechanism comprising an order container elevator assembly and an order container extractor assembly, said order container elevator assembly having an order container lift mechanism that is adapted to elevate an order container from a feed area to the pick area, said order container extractor assembly adapted to transfer an order container from the pick area, wherein said order container extractor assembly comprises an order container transfer mechanism and an order container extractor mechanism, said order container extractor mechanism adapted to extracting an order container from the pick area to said order container transfer mechanism; and
an order container supply system comprising an order container sequencer, said order container sequencer adapted to arrange order containers in a sequence prior to supplying the orders containers to the order container-handling mechanism.

34. The picking system as claimed in claim 33 including a container storage area adapted to store and retrieve product containers and wherein said product container-handling line is adapted to retrieve product containers from said container storage area.

35. A method of picking goods from a product container and placing the goods in an order container, said method comprising:
supplying a product container to a product container-handling mechanism with a product container-handling line and supplying a product container to a pick area with the product container-handling mechanism wherein said product container-handling mechanism comprising a product container elevator assembly and a product container extractor assembly, said elevator assembly having a lift mechanism that is adapted to elevate a product container from a feed area to the pick area, said extractor assembly adapted to transfer a product container from the pick area, and wherein said extractor assembly comprises a transfer mechanism and an extractor mechanism, said extractor mechanism adapted to extracting a product container from the pick area to said transfer mechanism;

supplying an order container to an order container-handling mechanism with an order container-handling line and supplying an order container to the pick area with the order container-handling mechanism, wherein said order container-handling mechanism comprising an order container elevator assembly and an order container extractor assembly, said order container elevator assembly having an order container lift mechanism that is adapted to elevate an order container from a feed area to the pick area, said order container extractor assembly adapted to transfer an order container from the pick area, wherein said order container extractor assembly comprises an order container transfer mechanism and an order container extractor mechanism, said order container extractor mechanism adapted to extracting an order container from the pick area to said order container transfer mechanism;

manually transferring product from a product container to an order container at the pick area; and arranging the order containers in a particular sequence at the order container-handling line with a sequencer prior to providing the order containers to the order container-handling mechanism.

\* \* \* \* \*

UNITED STATES PATENT AND TRADEMARK OFFICE
CERTIFICATE OF CORRECTION

PATENT NO.         : 8,713,899 B2
APPLICATION NO.    : 13/030650
DATED              : May 6, 2014
INVENTOR(S)        : Philipp J. Hortig et al.

It is certified that error appears in the above-identified patent and that said Letters Patent is hereby corrected as shown below:

In the claims,

Column 16:
Line 45, Claim 1, Insert --to-- after "mechanism"

Column 17:
Line 47, Claim 8, "are," should be --area,--

Column 19:
Line 10, Claim 23, "mechanists" should be --mechanism--

Signed and Sealed this
Twenty-eighth Day of April, 2015

Michelle K. Lee
*Director of the United States Patent and Trademark Office*